United States Patent
Goyal et al.

(10) Patent No.: US 10,929,175 B2
(45) Date of Patent: Feb. 23, 2021

(54) SERVICE CHAINING HARDWARE ACCELERATORS WITHIN A DATA STREAM PROCESSING INTEGRATED CIRCUIT

(71) Applicant: Fungible, Inc., Santa Clara, CA (US)

(72) Inventors: Rajan Goyal, Saratoga, CA (US); Satyanarayana Lakshmipathi Billa, Sunnyvale, CA (US)

(73) Assignee: Fungible, Inc., Santa Clara, CA (US)

( * ) Notice: Subject to any disclaimer, the term of this patent is extended or adjusted under 35 U.S.C. 154(b) by 76 days.

(21) Appl. No.: 16/198,607

(22) Filed: Nov. 21, 2018

(65) Prior Publication Data

US 2020/0159568 A1   May 21, 2020

(51) Int. Cl.
*G06F 9/48* (2006.01)
*G06F 9/50* (2006.01)

(52) U.S. Cl.
CPC .......... *G06F 9/4843* (2013.01); *G06F 9/5027* (2013.01); *G06F 2209/483* (2013.01); *G06F 2209/503* (2013.01)

(58) Field of Classification Search
CPC .............................. G06F 9/4843; G06F 9/5027
USPC ........................................................ 718/104
See application file for complete search history.

(56) References Cited

U.S. PATENT DOCUMENTS

| | | |
|---|---|---|
| 5,301,324 A | 4/1994 | Dewey et al. |
| 5,828,860 A | 10/1998 | Miyaoku et al. |
| 6,021,473 A | 2/2000 | Davis et al. |
| 6,055,579 A | 4/2000 | Goyal et al. |
| 6,314,491 B1 | 11/2001 | Freerksen et al. |
| 6,842,906 B1 * | 1/2005 | Bowman-Amuah ... G06F 9/465 718/104 |

(Continued)

FOREIGN PATENT DOCUMENTS

| | | |
|---|---|---|
| EP | 1079571 A2 | 2/2001 |
| EP | 1489796 A2 | 12/2004 |

(Continued)

OTHER PUBLICATIONS

Deutsch, "DEFLATE Compressed Data Format Specification version 1.3," IETF Network Working Group, RFC 1951, May 1996, 15 pp.

(Continued)

*Primary Examiner* — John Q Chavis
(74) *Attorney, Agent, or Firm* — Shumaker & Sieffert, P.A.

(57) ABSTRACT

This disclosure describes techniques that include establishing a service chain of operations that are performed on a network packet as a sequence of operations. In one example, this disclosure describes a method that includes storing, by a data processing unit integrated circuit, a plurality of work unit frames in a work unit stack representing a plurality of service chain operations, including a first service chain operation, a second service chain operation, and a third service chain operation; executing, by the data processing unit integrated circuit, the first service chain operation, wherein executing the first service chain operation generates operation data; determining, by the data processing unit integrated circuit and based on the operation data, whether to perform the second service chain operation; and executing, by the data processing unit integrated circuit, the third service chain operation after skipping the second service chain operation.

27 Claims, 20 Drawing Sheets

(56) References Cited

U.S. PATENT DOCUMENTS

| | | | |
|---|---|---|---|
| 6,901,451 B1 | 5/2005 | Miyoshi et al. | |
| 6,901,500 B1 | 5/2005 | Hussain et al. | |
| 6,993,630 B1 | 1/2006 | Williams et al. | |
| 7,035,914 B1 | 4/2006 | Payne et al. | |
| 7,289,964 B1 | 10/2007 | Bowman-Amuah | |
| 7,486,678 B1 | 2/2009 | Devanagondi et al. | |
| 7,664,110 B1 | 2/2010 | Lovett et al. | |
| 7,822,731 B1 | 10/2010 | Yu et al. | |
| 7,843,907 B1 | 11/2010 | Abou-Emara et al. | |
| 8,560,757 B2 | 10/2013 | Pangbom et al. | |
| 8,599,863 B2 | 12/2013 | Davis | |
| 8,625,427 B1 | 1/2014 | Terry et al. | |
| 8,737,410 B2 | 5/2014 | Davis et al. | |
| 8,850,101 B2 | 9/2014 | Pangborn et al. | |
| 8,850,125 B2 | 9/2014 | Pangborn et al. | |
| 8,966,152 B2 | 2/2015 | Bouchard et al. | |
| 9,065,860 B2 | 6/2015 | Pangborn et al. | |
| 9,262,225 B2 | 2/2016 | Davis et al. | |
| 9,294,304 B2 | 3/2016 | Sindhu | |
| 9,294,398 B2 | 5/2016 | DeCusatis et al. | |
| 9,405,550 B2 | 8/2016 | Biran et al. | |
| 9,569,366 B2 | 2/2017 | Pangborn et al. | |
| 9,632,936 B1 | 4/2017 | Zuckerman et al. | |
| 9,853,901 B2 | 12/2017 | Kampmann et al. | |
| 9,876,735 B2 | 1/2018 | Davis et al. | |
| 9,946,671 B1 | 4/2018 | Tawri et al. | |
| 10,135,731 B2 | 11/2018 | Davis et al. | |
| 10,140,245 B2 | 11/2018 | Davis et al. | |
| 10,304,154 B2 | 5/2019 | Appu et al. | |
| 10,387,179 B1 | 8/2019 | Hildebrant et al. | |
| 10,425,707 B2 | 9/2019 | Sindhu et al. | |
| 10,540,288 B2 | 1/2020 | Noureddine et al. | |
| 10,565,112 B2 | 2/2020 | Noureddine et al. | |
| 10,645,187 B2 | 5/2020 | Goyal et al. | |
| 2002/0015387 A1 | 2/2002 | Houh | |
| 2002/0049859 A1 | 4/2002 | Bruckert et al. | |
| 2002/0094151 A1 | 7/2002 | Li | |
| 2002/0118415 A1 | 8/2002 | Dasylva et al. | |
| 2002/0126634 A1 | 9/2002 | Mansharamani et al. | |
| 2002/0126671 A1 | 9/2002 | Ellis et al. | |
| 2003/0043798 A1 | 3/2003 | Pugel | |
| 2003/0091271 A1 | 5/2003 | Dragone | |
| 2004/0236912 A1 | 11/2004 | Glasco | |
| 2005/0166086 A1 | 7/2005 | Watanabe | |
| 2006/0029323 A1 | 2/2006 | Nikonov et al. | |
| 2006/0056406 A1 | 3/2006 | Bouchard et al. | |
| 2006/0112226 A1 | 5/2006 | Hady et al. | |
| 2006/0277421 A1 | 12/2006 | Balestriere | |
| 2007/0073966 A1 | 3/2007 | Corbin | |
| 2007/0172235 A1 | 7/2007 | Snider et al. | |
| 2007/0192545 A1 | 8/2007 | Gara et al. | |
| 2007/0198656 A1* | 8/2007 | Mazzaferri | G06F 9/54 709/218 |
| 2007/0255906 A1 | 11/2007 | Handgen et al. | |
| 2008/0002702 A1 | 1/2008 | Bajic et al. | |
| 2008/0138067 A1 | 6/2008 | Beshai | |
| 2008/0244231 A1 | 10/2008 | Kunze et al. | |
| 2009/0024836 A1 | 1/2009 | Shen et al. | |
| 2009/0083263 A1 | 3/2009 | Felch et al. | |
| 2009/0135832 A1 | 5/2009 | Fan et al. | |
| 2009/0228890 A1 | 9/2009 | Vaitovirta et al. | |
| 2009/0234987 A1 | 9/2009 | Lee et al. | |
| 2009/0285228 A1 | 11/2009 | Bagepalli et al. | |
| 2009/0303880 A1 | 12/2009 | Maltz et al. | |
| 2010/0061391 A1 | 3/2010 | Sindhu et al. | |
| 2010/0318725 A1 | 12/2010 | Kwon | |
| 2011/0055827 A1 | 3/2011 | Lin et al. | |
| 2011/0113184 A1 | 5/2011 | Chu | |
| 2011/0173392 A1 | 7/2011 | Gara et al. | |
| 2011/0202658 A1 | 8/2011 | Okuno et al. | |
| 2011/0225594 A1 | 9/2011 | Iyengar et al. | |
| 2011/0228783 A1 | 9/2011 | Flynn et al. | |
| 2011/0238923 A1 | 9/2011 | Hooker et al. | |
| 2011/0289179 A1 | 11/2011 | Pekcan et al. | |
| 2011/0289180 A1 | 11/2011 | Sonnier et al. | |
| 2011/0289279 A1 | 11/2011 | Sonnier et al. | |
| 2012/0030431 A1 | 2/2012 | Anderson et al. | |
| 2012/0036178 A1* | 2/2012 | Gavini | H04L 67/2804 709/203 |
| 2012/0096211 A1 | 4/2012 | Davis et al. | |
| 2012/0207165 A1 | 8/2012 | Davis | |
| 2012/0254587 A1 | 10/2012 | Biran et al. | |
| 2012/0314710 A1 | 12/2012 | Shikano | |
| 2013/0003725 A1 | 1/2013 | Hendel et al. | |
| 2013/0024875 A1 | 1/2013 | Wang et al. | |
| 2013/0028083 A1 | 1/2013 | Yoshida et al. | |
| 2013/0088971 A1 | 4/2013 | Anantharam et al. | |
| 2013/0145375 A1 | 6/2013 | Kang | |
| 2013/0191443 A1 | 7/2013 | Gan et al. | |
| 2013/0346789 A1* | 12/2013 | Brunel | H04L 65/1006 714/4.11 |
| 2014/0023080 A1 | 1/2014 | Zhang et al. | |
| 2014/0040909 A1 | 2/2014 | Winser et al. | |
| 2014/0044128 A1 | 2/2014 | Suresh et al. | |
| 2014/0059537 A1 | 2/2014 | Kamble et al. | |
| 2014/0187317 A1 | 7/2014 | Kohler et al. | |
| 2014/0258479 A1 | 9/2014 | Tenginakai et al. | |
| 2014/0310467 A1 | 10/2014 | Shalf et al. | |
| 2014/0359044 A1 | 12/2014 | Davis et al. | |
| 2015/0019702 A1 | 1/2015 | Kancherla | |
| 2015/0037032 A1 | 2/2015 | Xu et al. | |
| 2015/0117860 A1 | 4/2015 | Braun | |
| 2015/0143045 A1 | 5/2015 | Han et al. | |
| 2015/0143073 A1 | 5/2015 | Winser et al. | |
| 2015/0163171 A1 | 6/2015 | Sindhu et al. | |
| 2015/0180603 A1 | 6/2015 | Darling et al. | |
| 2015/0186313 A1 | 7/2015 | Sodhi et al. | |
| 2015/0244617 A1 | 8/2015 | Nakil et al. | |
| 2015/0278148 A1 | 10/2015 | Sindhu et al. | |
| 2015/0278984 A1 | 10/2015 | Koker et al. | |
| 2015/0280939 A1 | 10/2015 | Sindhu | |
| 2015/0281128 A1 | 10/2015 | Sindhu | |
| 2015/0324205 A1 | 11/2015 | Eisen et al. | |
| 2015/0325272 A1 | 11/2015 | Murphy | |
| 2015/0334034 A1 | 11/2015 | Smedley et al. | |
| 2015/0334202 A1 | 11/2015 | Frydman et al. | |
| 2015/0378776 A1* | 12/2015 | Lippett | G06F 9/5027 718/101 |
| 2015/0381528 A9 | 12/2015 | Davis et al. | |
| 2016/0056911 A1 | 2/2016 | Ye et al. | |
| 2016/0062800 A1 | 3/2016 | Stanfill et al. | |
| 2016/0092362 A1 | 3/2016 | Barron et al. | |
| 2016/0164625 A1 | 6/2016 | Gronvall et al. | |
| 2016/0210159 A1 | 7/2016 | Wilson et al. | |
| 2016/0239415 A1 | 8/2016 | Davis et al. | |
| 2016/0241430 A1 | 8/2016 | Yadav et al. | |
| 2016/0337723 A1 | 11/2016 | Graves | |
| 2016/0364333 A1 | 12/2016 | Brown et al. | |
| 2016/0364334 A1 | 12/2016 | Asaro et al. | |
| 2016/0380885 A1 | 12/2016 | Jani et al. | |
| 2017/0031719 A1 | 2/2017 | Clark et al. | |
| 2017/0060615 A1 | 3/2017 | Thakkar et al. | |
| 2017/0061566 A1 | 3/2017 | Min et al. | |
| 2017/0068639 A1 | 3/2017 | Davis et al. | |
| 2017/0235581 A1 | 8/2017 | Nickolls et al. | |
| 2017/0286143 A1 | 10/2017 | Wagner et al. | |
| 2017/0286157 A1 | 10/2017 | Hasting et al. | |
| 2017/0346766 A1 | 11/2017 | Dutta | |
| 2018/0011739 A1 | 1/2018 | Pothula et al. | |
| 2018/0024771 A1 | 1/2018 | Miller et al. | |
| 2018/0115494 A1 | 4/2018 | Bhatia et al. | |
| 2018/0152317 A1 | 5/2018 | Chang et al. | |
| 2018/0239702 A1 | 8/2018 | Farahani et al. | |
| 2018/0287818 A1 | 10/2018 | Goel et al. | |
| 2018/0287965 A1 | 10/2018 | Sindhu et al. | |
| 2018/0288505 A1 | 10/2018 | Sindhu et al. | |
| 2018/0293168 A1 | 10/2018 | Noureddine et al. | |
| 2018/0300928 A1 | 10/2018 | Koker et al. | |
| 2018/0307494 A1 | 10/2018 | Ould-Ahmed-Vall et al. | |
| 2018/0307535 A1 | 10/2018 | Suzuki et al. | |
| 2018/0322386 A1 | 11/2018 | Sridharan et al. | |
| 2018/0357169 A1 | 12/2018 | Lai | |
| 2019/0005176 A1 | 1/2019 | Illikkal et al. | |
| 2019/0012278 A1 | 1/2019 | Sindhu et al. | |

(56) References Cited

U.S. PATENT DOCUMENTS

| | | |
|---|---|---|
| 2019/0012350 A1 | 1/2019 | Sindhu et al. |
| 2019/0013965 A1 | 1/2019 | Sindhu et al. |
| 2019/0018806 A1 | 1/2019 | Koufaty et al. |
| 2019/0042292 A1 | 2/2019 | Palermo et al. |
| 2019/0042518 A1 | 2/2019 | Marolia et al. |
| 2019/0095333 A1 | 3/2019 | Heirman et al. |
| 2019/0102311 A1 | 4/2019 | Gupta et al. |
| 2019/0104057 A1 | 4/2019 | Goel et al. |
| 2019/0104206 A1 | 4/2019 | Goel et al. |
| 2019/0104207 A1 | 4/2019 | Goel et al. |
| 2019/0158428 A1 | 5/2019 | Gray et al. |
| 2019/0188079 A1 | 6/2019 | Kohli |
| 2019/0243765 A1 | 8/2019 | Noureddine et al. |
| 2020/0021664 A1 | 1/2020 | Goyal et al. |
| 2020/0119903 A1 | 4/2020 | Thomas |
| 2020/0145680 A1 | 5/2020 | Dikshit et al. |
| 2020/0159568 A1 | 5/2020 | Goyal et al. |
| 2020/0159859 A1 | 5/2020 | Beckman et al. |

FOREIGN PATENT DOCUMENTS

| | | |
|---|---|---|
| EP | 1501246 A2 | 1/2005 |
| EP | 2289206 A2 | 3/2011 |
| EP | 2928134 A2 | 7/2015 |
| WO | 2009114554 A2 | 9/2009 |
| WO | 2013184846 A1 | 12/2013 |
| WO | 2014178854 A1 | 11/2014 |
| WO | 2016037262 A1 | 3/2016 |
| WO | 2019014268 A1 | 1/2019 |

OTHER PUBLICATIONS

U.S. Appl. No. 16/035,416, filed Jul. 13, 2018, by Goyal et al.
U.S. Appl. No. 16/195,209, filed Nov. 19, 2018, by Beckman et al.
U.S. Appl. No. 16/179,472, filed Nov. 2, 2018, by Dikshit et al.
U.S. Appl. No. 16/169,736, filed Oct. 24, 2018, by Goyal et al.
U.S. Appl. No. 16/157,265, filed Oct. 11, 2018, by Thomas et al.
"QFX10000 Switches System Architecture," White Paper, Juniper Networks, Apr. 2015, 15 pp.
Adya et al., "Cooperative Task Management without Manual Stack Management," Proceedigns of the 2002 Usenix Annual Technical Conference, Jun. 2002, 14 pp.
Al-Fares et al., "Hedera: Dynamic Flow Scheduling for Data Center Networks," NSDI'10 Proceedings of the 7th USENIX Conference on Networked Systems Design and Implementation, Apr. 28-30, 2010, 15 pp.
Alizadeh et al., "CONGA: Distributed Congestion-Aware Load Balancing for Datacenters," SIGCOMM '14 Proceedings of the 2014 ACM Conference on SIGCOMM, Aug. 17-22, 2014, pp. 503-514.
Bakkum et al., "Accelerating SQL Database Operations on a GPU with CUDA," Proceedings of the 3rd Workshop on Genral-Purpose Computation on Graphics Processing Units, Mar. 14, 2010, 10 pp.
Banga et al., "Better operating system features for faster network servers," ACM Sigmetrics Performance Evaluation Review, vol. 26, Issue 3, Dec. 1998, 11 pp.
Barroso et al., "Attack of the killer Microseconds," Communications of the ACM, vol. 60, No. 4, Apr. 2017, 7 pp.
Benson et al., "MicroTE: Fine Grained Traffic Engineering for Data Centers," CoNEXT '11 Proceedings of the Seventh Conference on emerging Networking EXperiments and Technologies Article No. 8, Dec. 6-9, 2011, 12 pp.
Benson et al., "Network Traffic Characteristics of Data Centers in the Wild," IMC '10 Proceedings of the 10th ACM SIGCOMM Conference on Internet Measurement, Nov. 1-30, 2010, pp. 267-280.
Ford et al., "TCP Extensions for Multipath Operation with Multiple Addresses," Internet Engineering Task Force (IETF), RFC 6824, Jan. 2013, 64 pp.
Friedman et al., "Programming with Continuations," Technical Report 151, Nov. 1983, 14 pp.
Gay et al., "The nesC Language: A Holistic Approach to Networked Embedded Systems," accessed from http://nescc.sourceforge.net, last updated Dec. 14, 2004, 11 pp.
Halbwachs et al., "The Synchronous Data Flow Programming Language LUSTRE," Proceedings of the IEEE, vol. 79, No. 9, Sep. 1991, 16 pp.
Haynes et al., "Continuations and Coroutines," Technical Report No. 158, Jun. 1984, 19 pp.
Hewitt, "Viewing Control Structures as Patterns of Passing Messages," Massachusetts Institute of Technology, Artificial Intelligence Laboratory, Dec. 1976, 61 pp.
Hseush et al., Data Path Debugging: Data-Oriented Debugging for a Concurrent Programming Language, PADD 88 Proceedings of the 1988 ACM SIGPLAN and SIGOPS workshop on Parallel and distributed debugging, May 5-6, 1988, 12 pp.
Huang et al., "Erasure Coding in Windows Azure Storage," 2012 USENIX Annual Technical Conference, Jun. 13-15, 2012, 12 pp.
Hurson, "Advances in Computers, Volume 92," Jan. 13, 2014, Academic Press, XP055510879, 94-95 pp.
Isen et al., "ESKIMO—Energy Savings using Semantic Knowledge of Inconsequential Memory Occupancy for DRAM subsystem," 42nd Annual IEEE/ACM International Symposium on Microarchitecture (MICRO), Dec. 12-16, 2009, 10 pp.
Kahn et al., "Actors as a Special Case of Concurrent Constraint Programming," ECOOP/OOPSLA '90 Proceedings, Oct. 21-25, 1990, 10 pp.
Kaminow, "Optical Integrated Circuits: A Personal Perspective," Journal of Lightwave Technology, vol. 26, No. 9, May 1, 2008, pp. 994-1004.
Kandula et al., "Dynamic Load Balancing Without Packet Reordering," SIGCOMM Computer Communication Review, vol. 37, No. 2, Apr. 2007, pp. 53-62.
Kandula et al., "The Nature of Datacenter Traffic: Measurements & Analysis," IMC '09 Proceedings of the 9th ACM SIGCOMM conference on Internet measurement, Nov. 4-6, 2009, pp. 202-208.
Kelly et al., A Block Diagram Compiler, The Bell System Technical Journal, Dec. 7, 1960, 10 pp.
Kounavis et al., "Programming the data path in network processor-based routers," Software- Practice and Experience, Oct. 21, 2003, 38 pp.
Larus et al., "Using Cohort Scheduling to Enhance Server Performance," Usenix Annual Technical Conference, Jun. 2002, 12 pp.
Levis et al., "Tiny OS: An Operating System for Sensor Networks," Ambient Intelligence, Jan. 2005, 34 pp.
Lin et al., A Parameterized Dataflow Language Extension for Embedded Streaming Systems, 2008 International Conference on Embedded Computer Systems: Architectures, Modeling, and Simulation, Jul. 21-24, 2008, 8 pp.
Wang et al., "A Spatial and Temporal Locality-Aware Adaptive Cache Design with Network Optimization for Tiled Many-Core Architectures," IEEE Transactions on Very Large Scale Integration (VLSI) Systems, vol. 25. No. 9, Sep. 2017.
Mishra et al., "Thread-based vs Event-based Implementation of a Group Communication Service," Proceedings of the First Merged International Parallel Processing Symposium and Symposium on Parallel and Distributed Processing, Mar. 30-Apr. 3, 1998, 5 pp.
Raiciu et al., "Improving Datacenter Performance and Robustness with Multipath TCP," ACM SIGCOMM Computer Communication Review—SIGCOMM '11, vol. 41, No. 4, Aug. 2011, pp. 266-277.
Schroeder et al., "Flash Reliability in Production: The Expected and the Unexpected," 14th USENIX Conference on File and Storage Technologies (FAST '16), Feb. 22-25, 2016, 15 pp.
Varela et al., "The Salsa Programming Language 2.0.0alpha Release Tutorial," Tensselaer Polytechnic Institute, Nov. 2009, 52 pp.
Von Behren et al., "Why Events Are a Bad Idea (for high-concurrency servers)," Proceedings of HotOS IX, May 2003, 6 pp.
Welsh et al., "SEDA: An Architecture for Well-Conditioned, Scalable Internet Services," Eighteenth Symposium on Operating Systems Principles, Oct. 21-24, 2001, 14 pp.

(56) References Cited

OTHER PUBLICATIONS

Zhu et al., "Congestion Control for Large-Scale RDMA Deployments," SIGCOMM '15 Proceedings of the 2015 ACM Conference on Special Interest Group on Data Communication, Aug. 17-21, 2015, pp. 523-536.
U.S. Appl. No. 16/746,344, filed Jan. 17, 2020, by Noureddine et al.
Office Action from U.S. Appl. No. 16/197,179, dated Mar. 10, 2020, 14 pp.
Office Action from U.S. Appl. No. 16/031,945, dated Jan. 24, 2020, 14 pp.
International Search Report and Written Opinion of International Application No. PCT/US2019/062630, dated Feb. 17, 2020, 20 pp.
Amendment in Response to Office Action dated Jan. 24, 2020, from U.S. Appl. No. 16/031,945, filed Apr. 24, 2020, 15 pp.
Notice of Allowance from U.S. Appl. No. 16/031,945, dated May 1, 2020, 6 pp.
Response to Office Action dated Mar. 10, 2020, from U.S. Appl. No. 16/197,179, filed Jun. 10, 2020, 15 pp.
U.S. Appl. No. 16/939,617, filed Jul. 20, 2020, naming inventors Sindhu et al.
Notice of Allowance from U.S. Appl. No. 16/197,179, dated Sep. 2, 2020, 17 pages.

\* cited by examiner

SERVICE CHAINING HARDWARE ACCELERATORS WITHIN A DATA STREAM PROCESSING INTEGRATED CIRCUIT

TECHNICAL FIELD

This disclosure relates to processing packets of information, for example, in the fields of networking, storage, and cryptography

BACKGROUND

In a typical computer network, a large collection of interconnected servers provides computing and/or storage capacity for execution of various applications. A data center is one example of a large-scale computer network and typically hosts applications and services for subscribers, i.e., customers of the data center. The data center may, for example, host all of the infrastructure equipment, such as compute nodes, networking and storage systems, power systems, and environmental control systems. In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy.

Many devices within a computer network, e.g., storage/compute servers, firewalls, intrusion detection devices, switches, routers or other network attached devices, often use general purpose processors, including multi-core processing systems, to process data, such as network or storage data. However, general purpose processing cores and multi-processing systems are normally not designed for high-capacity network and storage workloads of modern networks and can be relatively poor at performing packet stream processing.

SUMMARY

This disclosure describes techniques that include establishing a service chain of operations that are performed on a stream data unit as a sequence of operations within a data processing unit (DPU) integrated circuit. As described herein, each service chain of operations performed on a stream data unit by the DPU may be, for example, a set of operations provided by hardware-based accelerators within the DPU integrated circuit and or a multiple core processor system within the DPU integrated circuit. In some examples, a work unit (WU) stack data structure is used to establish and control processing of the service chain of operations. The accelerators may perform some operations in the service chain, while other operations may be performed by cores (or virtual processors within the cores) of the multiple core processor system. The accelerators may be hardware devices optimized for a specific task or set of tasks. Such accelerators may have multithreaded and/or parallel execution capabilities so that, for example, throughput demands may be achieved through parallel processing. As described herein, the WU stack data structure may provide certain technical benefits, such as enabling definition and construction of data stream processing service chains using a run-to-completion programming model of a data plane operating system executed by the multiple core processor system and the set of specialized hardware-based accelerators of the DPU, while enabling use of familiar programming constructs (e.g., call/return and long-lived stack-based variables) within an event-driven execution model.

In some examples, the service chain of operations may be modified during runtime, so that the sequence, order, or other aspects of the pipeline of operations may change during runtime. The changes to the service chain of operations may be based on or prompted by the results of processing during the service chain. Alternatively, or in addition, the changes to the service chain may be based on resource availability and/or allocation constraints.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
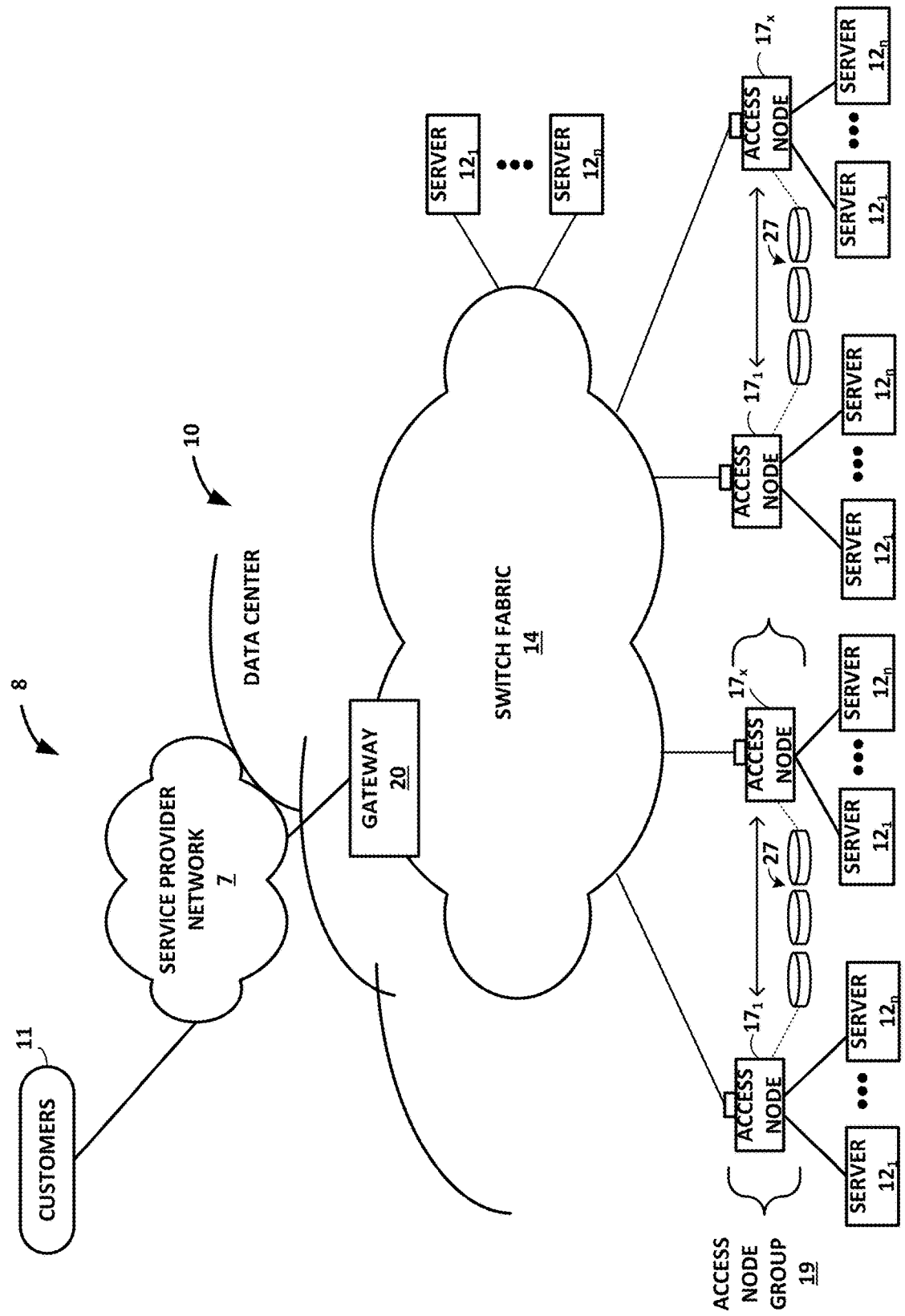
FIG. 1A is a block diagram illustrating an example system including one or more network devices configured to efficiently process a series of work units in a multiple core processor system, in accordance with the techniques of this disclosure.

FIG. 1A is a block diagram illustrating an example system 8 including one or more network devices configured to efficiently process a series of work units in a multiple core processor system. As described herein, techniques for caching and prefetching data from non-coherent memory may provide technical benefits that include improving the efficiency and utilization of processing cores within access nodes 17 in FIG. 1A. Access nodes may also be referred to as data processing units (DPUs), or devices including DPUs, in this disclosure. In the example of FIG. 1A, various data structures and processing techniques are described with respect to access nodes 17 within a data center 10. Other devices within a network, such as routers, switches, servers, firewalls, gateways and the like, having multiple core processor systems may readily be configured to utilize the data processing techniques described herein.

Data center 10 represents an example of a system in which various techniques described herein may be implemented. In general, data center 10 provides an operating environment for applications and services for customers 11 coupled to the data center by service provider network 7 and gateway device 20. Data center 10 may, for example, host infrastructure equipment, such as compute nodes, networking and storage systems, redundant power supplies, and environmental controls. Service provider network 7 may be coupled to one or more networks administered by other providers, and may thus form part of a large-scale public network infrastructure, e.g., the Internet. In other examples, service provider network 7 may be a data center wide-area network (DC WAN), private network or other type of network.

In some examples, data center 10 may represent one of many geographically distributed network data centers. In the example of FIG. 1A, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In the illustrated example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1A, each of servers 12 is coupled to switch fabric 14 by an access node 17 for processing streams of information, such as network packets or storage packets. Although not shown in FIG. 1A, any of access nodes 17 may similarly provide a network front-end to one or more storage systems for processing streams of data units written to and read from the storage units. In example implementations, access nodes 17 may be configurable to operate in a standalone network appliance having one or more access nodes. For example, access nodes 17 may be arranged into multiple different access node groups 19, each including any number of access nodes up to, for example, x access nodes $17_1$-$17_x$. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19, including its set of access nodes 17 and storage devices 27, and the set of servers 12 supported by the access nodes 17 of that access node group 19 may be referred to herein as a network storage compute unit.

As further described herein, in one example, each access node 17 is a highly programmable I/O processor (referred to as a data processing unit, or DPU) specially designed for offloading certain functions from servers 12. In one example, each access node 17 includes a number of internal processor clusters, each including two or more processing cores and equipped with hardware engines (also referred to herein as accelerators) that offload cryptographic functions, compression and decompression, regular expression (RegEx) processing, data storage functions, and networking operations. In this way, each access node 17 includes components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Additional example details of various example DPUs are described in U.S. Pat. No. 16/031,945, filed Jul. 10, 2018 entitled "Data Processing Unit for Steam Processing," U.S. Pat. No. 16/031,921, filed Jul. 10, 2018 entitled "Data Processing Unit for Compute Nodes and Storage Nodes," U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of each of these applications being incorporated herein by reference.

In accordance with the techniques of this disclosure, any or all of access nodes 17 may include an accelerator unit. That is, one or more computing devices may include an access node including one or more accelerator units, according to the techniques of this disclosure. Any or all of access nodes 17 may be configured to apply one or more service chains of operations that are performed on stream data units. As described herein, a service chain of operations performed on a stream data unit by the access node may be, for example, a set of using operations provided by the hardware-based accelerators within the access node and/or operations implemented by software executing on a multiple core processor system within the access node. For example, as further described in connection with FIG. 5A through FIG. 5F and elsewhere, one or more network, computing and/or storage devices may include or be coupled to an access node that includes, for example, one or more RegEx accelerator units, one or more compression accelerator units, one or more JPEG accelerator units, one or more data durability accelerator units, and/or one or more security accelerator units, according to the techniques of this disclosure.

The accelerator unit(s) of any of access nodes 17, according to the techniques of this disclosure, may be configured to process payloads of packets during various services as the packets are exchanged by access nodes 17, e.g., between access nodes 17 via switch fabric 14 and/or between servers 12. That is, as packets are exchanged between the devices, either for networking or data storage and retrieval, the access node may perform an evaluation service on payloads of the packet. For example, the access node may provide evaluation services in the form of intrusion detection, intrusion prevention, intrusion detection and prevention (IDP), anti-virus scanning, search, indexing, or the like. The access node may use one or more accelerator units to identify patterns in payload data, such as virus definitions, attempted intrusions, search strings, indexing strings, or the like. The patterns may be defined according to respective regular expressions.

In the example of FIG. 1A, each access node 17 provides connectivity to switch fabric 14 for a different group of servers 12 and may be assigned respective IP addresses and provide routing operations for the servers 12 coupled thereto. Access nodes 17 may interface with and utilize switch fabric 14 so as to provide full mesh (any-to-any) interconnectivity such that any of servers 12 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. More details on the example data center network architecture and interconnected access nodes illustrated in FIG. 1A are available in U.S. patent application Ser. No. 15/939,227, filed Mar. 28, 2018, entitled "Non-Blocking Any-to-Any Data Center Network with Packet Spraying Over Multiple Alternate Data Paths," the entire content of which is incorporated herein by reference.

Various example architectures of access nodes 17 are described below with respect to FIGS. 2, 3, 4A, and 4B. With respect to either example, the architecture of each access node 17 comprises a multiple core processor system that represents a high performance, hyper-converged network, storage, and data processor and input/output hub. The architecture of each access node 17 is optimized for high-performance and high-efficiency stream processing.

In general, a stream, also referred to as a data stream, may be viewed as an ordered, unidirectional sequence of computational objects, referred to as stream data units (e.g., packets, as one example) that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of blocks, words, or bytes read from a storage device. A stream of one type may be transformed into another type as a result of processing. Independent of the stream type, stream manipulation requires efficient fragment manipulation. An application executing on one of access nodes 17 may operate on a stream in three broad ways: the first is protocol processing, which consists of operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 17 can safely access different windows within the stream.

As described herein, data processing units of access nodes 17 may process stream information by managing "work units." In general, a Work Unit (WU) is a container that is associated with a stream state and used to describe (i.e. point to) data within a stream (stored in memory) along with any associated meta-data and operations to be performed on the data. In the example of FIG. 1A, streams of data units may dynamically originate within a peripheral unit of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within access nodes 17, work units may be executed by processor cores, hardware blocks, I/O interfaces, or other computational processing units. For instance, a processor core of an access node 17 executes a work unit by accessing the respective portion of the stream from memory and performing one or more computations in accordance with the work unit. A component of the one of access nodes 17 may receive, execute or generate work units. A succession of work units may define how the access node processes a flow, and smaller flows may be stitched together to form larger flows.

For purposes of example, DPUs of or within each access node 17 may execute a multi-tasking operating system, such as a general-purpose operating system (e.g., Linux or other flavor of Unix) that provides a control plane for the DPU. In addition, each DPU may execute a special-purpose run-to-completion data plane operating system, that provides an execution environment for run-to-completion data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of the data plane operating system executed by the multiple core processor system when processing a stream data unit and, if needed, the invocation of any hardware-based accelerators. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING IN A MULTICORE SYSTEM", filed Feb. 2, 2018, the entire contents of both being incorporated herein by reference.

As described herein, the data processing units for access nodes 17 includes one or more specialized hardware-based accelerators configured to perform acceleration for various data-processing functions, thereby offloading tasks from the processing units when processing work units. That is, each accelerator is programmable by the processing cores, and one or more accelerators may be logically chained together to operate on stream data units, such as by providing cryptographic functions, compression and regular expression (RegEx) processing, data storage functions and networking operations. This disclosure describes a programmable, hardware-based accelerator unit configured to apply and evaluate regular expressions against high-speed data streams.

In accordance with one or more aspects of the present disclosure, one or more access nodes 17 may establish a pipeline of operations that are performed on a packet. For instance, one of access nodes 17 (e.g., access node 17-1) may create a WU stack and arrange WU frames within the WU stack based on the programmed sequence of operations. In such an example, the WU stack may represent a service chain of operations to be performed by a number of processing nodes (e.g., virtual processors, host units, networking units, and/or accelerators) of access node 17-1. In some examples, the WU stack operates as a last-in-first-out stack, so WU frames associated with nodes that are performed first may be stored at the top of the WU stack, and those that are performed last may be stored at the bottom of the WU stack.

In some examples, one or more access nodes 17 may modify the sequence, order, or other aspects of the pipeline of operations during runtime. For instance, access node 17-1 may, when processing a service chain, skip one or more stages of the pipeline or service chain within a WU stack, or follow varying paths through the service chain, based on the results of processing performed by other nodes within the service chain. Further, access node 17-1 may skip stages that it determines are not necessary, or access node 17-1 may follow different paths of the service chain, based on the results of processing performed by nodes within the service chain.

Figure 1B:
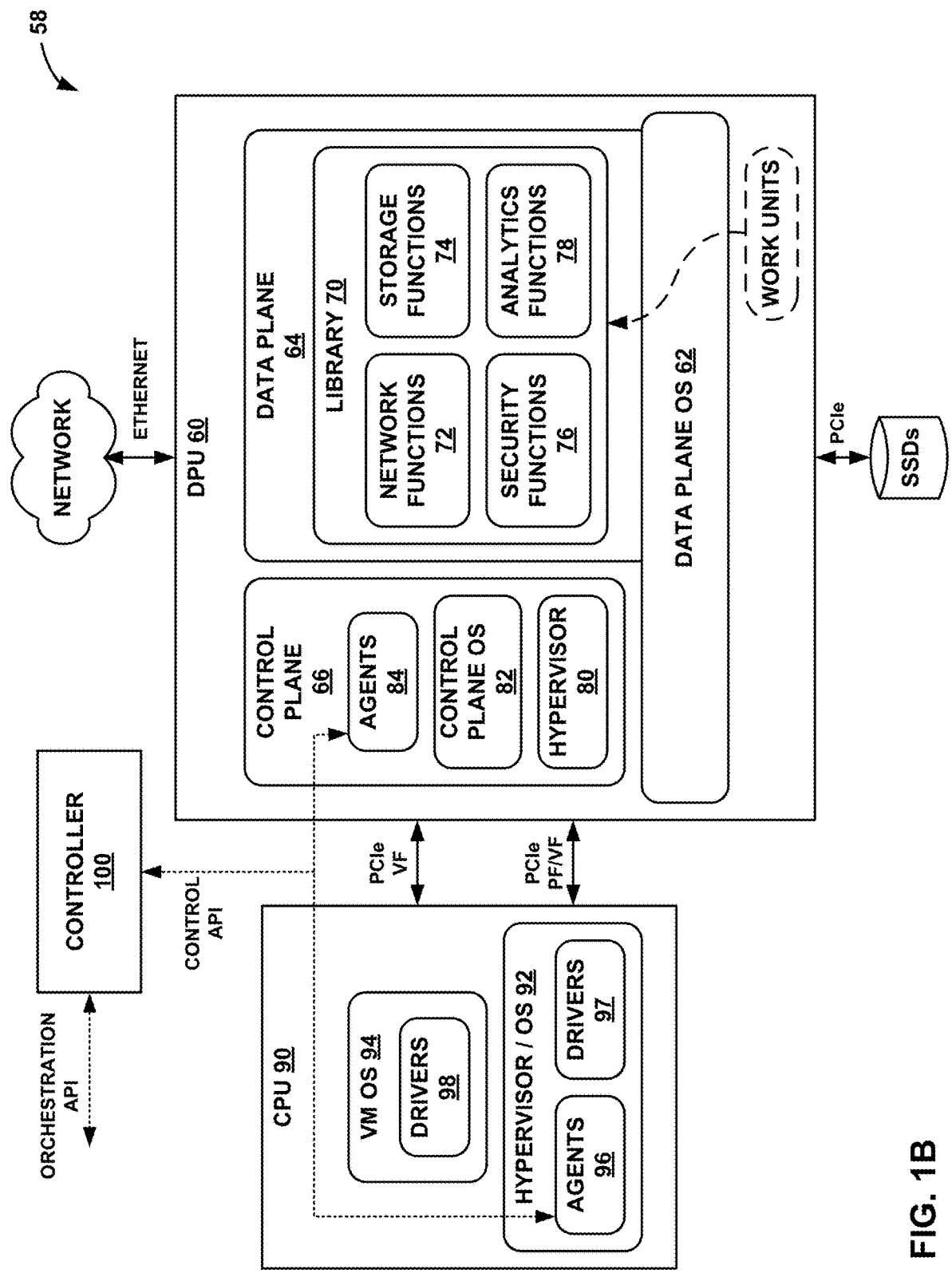
FIG. 1B is a block diagram illustrating a system having an example data processing unit including a run-to-completion data plane operating system configured to process work units, in accordance with the techniques of this disclosure.

FIG. 1B is a block diagram illustrating a system 58 having a data processing unit (DPU) 60 including a run-to-completion data plane operating system (OS) 62 configured to process work units, in accordance with the techniques of this disclosure. In the illustrated example of FIG. 1B, system 58 also includes CPU 90 communicatively coupled to DPU 60. Each of DPU 60 and CPU 90 generally represents a hardware chip implemented in digital logic circuitry. In some examples, DPU 60 and CPU 90 may be hosted on a same computing device such that system 58 may operate substantially similar to compute node 30A of FIG. 1B. DPU 60 may operate substantially similar to any of the DPUs of the devices 17 of FIG. 1A. CPU 90 may operate substantially similar to any of the CPUs of the devices 12 of FIG. 1A.

DPU 60 is a highly programmable I/O processor with a plurality of processing cores (as discussed below, e.g., with respect to FIG. 1C). In the illustrated example of FIG. 1B, DPU 60 includes a network interface (e.g., an Ethernet interface) to connect directly to a network, and a plurality of host interfaces (e.g., PCI-e interfaces) to connect directly to one or more application processors (e.g., CPU 90) and one or more storage devices (e.g., SSDs). DPU 60 also includes a run-to-completion data plane operating system (OS) 62 executing on two or more of the plurality of processing cores. Data plane OS 62 provides data plane 64 as an execution environment for a run-to-completion software function invoked on data plane OS 62 to process a work unit. As described above, the work unit is associated with one or more stream data units (e.g., packets of a packet flow), and specifies the software function for processing the stream data units and one of the plurality of processing cores for executing the software function.

The software function invoked to process the work unit may be one of a plurality of software functions for processing stream data included in a library 70 provided by data plane OS 62. In the illustrated example, library 70 includes network functions 72, storage functions 74, security functions 76, and analytics functions 78. Network functions 72 may, for example, include network I/O data processing functions related to Ethernet, network overlays, networking protocols, encryption, and firewalls. Storage functions 74 may, for example, include storage I/O data processing functions related to NVME (non-volatile memory express), compression, encryption, replication, erasure coding, and pooling. Security functions 76 may, for example, include security data processing functions related to encryption, regular expression processing, and hash processing. Analytics functions 78 may, for example, include analytical data processing functions related to a customizable pipeline of data transformations.

In general, data plane OS 62 is a low level, run-to-completion operating system running on bare metal of DPU 62 that runs hardware threads for data processing and manages work units. As described in more detail below, data plane OS 62 includes the logic of a queue manager to manage work unit interfaces, enqueue and dequeue work units from queues, and invoke a software function specified by a work unit on a processing core specified by the work unit. In the run-to-completion programming model, data plane OS 62 is configured to dequeue a work unit from a queue, process the work unit on the processing core, and return the results of processing the work unit to the queues.

DPU 60 also includes a multi-tasking control plane operating system executing on one or more of the plurality of processing cores. In some examples, the multi-tasking control plane operating system may comprise Linux, Unix, or a special-purpose operating system. In some examples, as illustrated in FIG. 1B, data plane OS 62 provides a control plane 66 including a control plane software stack executing on data plane OS 62. As illustrated, the control plane software stack includes a hypervisor 80, a multi-tasking control plane OS 82 executing on hypervisor 80, and one or more control plane service agents 84 executing on control plane OS 82. Hypervisor 80 may operate to isolate control plane OS 82 from the work unit and data processing performed on data plane OS 62. Control plane service agents 84 executing on control plane OS 82 comprise application level software configured to perform set up and tear down of software structures to support work unit processing performed by the software function executing on data plane OS 62. In the example of data packet processing, control plane service agents 84 are configured to set up the packet flow for data packet processing by the software function on data plane OS 62, and tear down the packet flow once the packet processing is complete. In this way, DPU 60 comprises a highly programmable processor that can run application level processing while leveraging the underlying work unit data structure for highly parallelized stream processing.

In another example, instead of running on top of data plane OS 62, the multi-tasking control plane operating system may run on one or more independent processing cores that are dedicated to the control plane operating system and different than the processing cores executing data plane OS 62. In this example, if an independent processing core is dedicated to the control plane operating system at the hardware level, a hypervisor may not be included in the control plane software stack. Instead, the control plane software stack running on the independent processing core may include the multi-tasking control plane operating system and one or more control plane service agents executing on the control plane operating system.

CPU 90 is an application processor with one or more processing cores optimized for computing-intensive tasks. In the illustrated example of FIG. 1B, CPU 90 includes a plurality of host interfaces (e.g., PCI-e interfaces) to connect directly to DPU 60. CPU 90 includes a hypervisor/OS 92 that supports one or more service agents 96 and one or more drivers 97. As illustrated in FIG. 1B, CPU 90 may also include a virtual machine (VM) OS 94 executing on top of hypervisor/OS 92 that supports one or more drivers 98. Application level software, such as agents 96 or drivers 97 executing on OS 92 or drivers 98 executing on VM OS 94, of CPU 90 may determine which data processing tasks to offload from CPU 90 to DPU 60. For example, hypervisor/OS 92 of CPU 90 may offload data processing tasks to DPU 60 using physical functions (PFs) and/or virtual functions (VFs) of PCIe links. VM OS 94 of CPU 90 may offload data processing tasks to DPU 60 using VFs of PCIe links.

In the illustrated example of FIG. 1B, system 58 also includes a controller 100 in communication with both DPU 60 and CPU 90 via a control application programming interface (API). Controller 100 may provide a high-level controller for configuring and managing application level software executing on a control plane operating system of each of DPU 60 and CPU 90. For example, controller 100 may configure and manage which data processing tasks are to be offloaded from CPU 90 to DPU 60. In some examples, controller 100 may comprise a software-defined networking (SDN) controller, which may operate substantially similar to a controller that may be included in FIG. 1A. In some examples, controller 100 may operate in response to configuration input received from a network administrator via an orchestration API.

Data plane OS 62 of DPU 60 is configured to receive stream data units for processing on behalf of the application level software executing on hypervisor/OS 92 of CPU 90. In the example of packet processing, the stream data units may comprise data packets of packet flows. In this example, the received packet flows may include any of networking packet flows, storage packet flows, security packet flow, analytics packet flows, or any combination thereof. Data plane OS 62 executing on one of the processing cores of DPU 60 may receive each of the packet flows in the form of one or more work units from a networking unit, host unit, or another one of the processing cores (as discussed below, e.g., with respect to FIG. 1C) of DPU 60. Each of the work units for a received packet flow may be associated with one or more data packets of the packet flow. Upon receipt of the packet flow, data plane OS 62 performs a lookup in a flow table to determine that the packet flow is legitimate, and maps the entire packet flow to one of the processing cores of DPU 60 for serialized processing of the packets of the packet flow. The flow table may comprise a hardware implemented flow table that is updated and maintained with legitimate packet flows by control plane 66, and used to assign processing cores to packet flows.

In the case where the received packet flow is not recognized by data plane OS 62, e.g., the packet flow is not yet set up in the flow table, data plane OS 62 may send the packet flow through the slow path in control plane 66 for set up. Control plane service agents 84 executing on control plane OS 82 then determine that the packet flow is legitimate, and send an instruction to data plane OS 62 to set up the packet flow in the flow table.

Once the packet flow is set up by control plane service agents 84, data plane OS 62 may assign the packet flow to a particular processing core of DPU 60 that can do stream processing for the packet flow. As one example, data plane OS 62 may execute a queue manager configured to receive a work unit associated with one or more data packets of the packet flow, enqueue the work unit to a work unit queue associated with the processing core for the packet flow, dequeue the work unit from the work unit queues to the processing core, and invoke the software function specified by the work unit on the processing core for processing the work unit.

Data plane OS 62 also provides interfaces to one or more hardware accelerators of DPU 62 (as discussed below, e.g., with respect to FIG. 1C) configured to perform acceleration for various data processing functions. Data plane OS 62 may use the hardware accelerators to process one or more portions of the packet flow, i.e., one or more work units, arranged as a work unit (WU) stack. In the WU stack, a first work unit includes an identifier of a subsequent work unit within the WU stack for further processing of the packets upon completion of the first work unit. To perform stream processing for the packet flow, a hardware accelerator is configured to perform one or more hardware commands included in the WU stack as input parameters of the first work unit, and upon completion of the one or more hardware commands, proceed to the subsequent work unit within the WU stack identified by the first work unit.

As described herein, the DPU utilizes fine-grain work units, work unit queues, and a queue manager executed on the data plane operating system of each processing core to serialize packet processing such that data packets of a same packet flow are processed by a same processing core. In this way, the DPU is capable of processing any type of packet flow with fine granularity between processing cores and low processing overhead. For comparison, other multi-core systems may communicate using shared memory and locking to ensure coherency in memory. The locking schemes may be an order of magnitude larger grain than the work unit scheme described herein. For example, the processing overhead associated with the work unit scheme is less than 100 clock cycles. Processing overhead may include the number of cycles to implement a work unit and the number of cycles to dequeue and deploy the work unit to a given processing core for processing. Serializing packet processing on the given run-to-completion hardware thread to maintain synchronization, as described herein, results in roughly the same overhead as the locking schemes used in conventional multi-core systems.

Figure 1C:
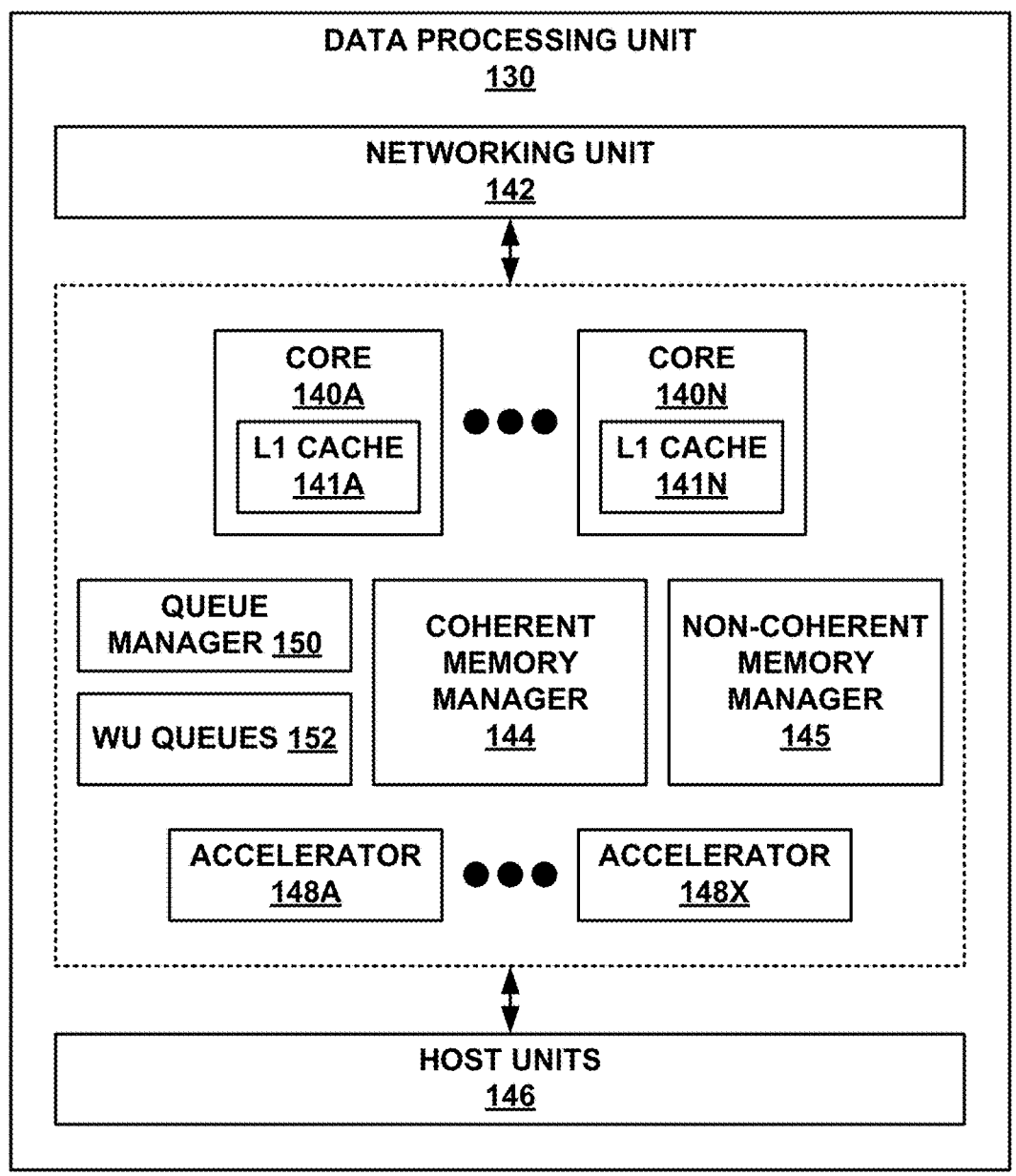
FIG. 1C is a block diagram illustrating hardware components of an example data processing unit, in accordance with the techniques of this disclosure.

FIG. 1C is a block diagram illustrating hardware components of an example data processing unit 130, in accordance with the techniques of this disclosure. DPU 130 generally represents a hardware chip implemented in digital logic circuitry. DPU 130 may operate substantially similar to any of the DPUs of the devices 17 of FIG. 1A. Thus, DPU 130 may be communicatively coupled to a CPU, a GPU, one or more network devices, server devices, random access memory, storage media (e.g., solid state drives (SSDs)), a data center fabric, or the like, e.g., via PCI-e, Ethernet (wired or wireless), or other such communication media.

In the illustrated example of FIG. 1C, DPU 130 includes a plurality of programmable processing cores 140A-140N ("cores 140"). DPU 130 may operate substantially similar to DPU 60 of FIG. 1B with the run-to-completion data plane OS 62 executing on each of cores 140. Each of cores 140 includes a respective one of level 1 caches 141A-N ("caches 141"). Caches 141 may include L1 buffer caches for caching non-coherent data, such as stream data units (e.g., packets or other data for stream processing). L1 buffer caches may store data for short-term caching, such that the data is available for fast access.

DPU 130 also includes a networking unit 142, a coherent memory manager 144, a non-coherent memory manager 145, one or more host units 146, a plurality of accelerators 148A-148X ("accelerators 148"), a queue manager 150, and a plurality of work unit (WU) queues 152. Although not illustrated in FIG. 1C, each of cores 140, networking unit 142, coherent memory manger 144, non-coherent memory manager 145, host units 146, accelerators 148, queue manager 150, and WU queues 152 are communicatively coupled to each other.

In this example, DPU 130 represents a high performance, hyper-converged network, storage, and data processor and input/output hub. For example, networking unit 142 may be configured to send and receive stream data units with one or more external devices, e.g., network devices. Networking unit 142 may perform network interface card functionality, packet switching, and the like, and may use large forwarding tables and offer programmability. Networking unit 142 may expose network interface (e.g., Ethernet) ports for connectivity to a network, such as network 7 and/or switch fabric 14 of FIG. 1A. Each of host units 146 may expose one or more host interface (e.g., PCI-e) ports to send and receive stream data units with application processors (e.g., an x86 processor of a server device or a local CPU or GPU of the device hosting DPU 130) and/or data storage devices (e.g., SSDs). DPU 130 may further include one or more high bandwidth interfaces for connectivity to off-chip external memory (not illustrated in FIG. 1C).

Each of accelerators 148 may be configured to perform acceleration for various data processing functions, such as lookups, matrix multiplication, cryptography, compression, regular expression processing, or the like. For example, accelerators 148 may comprise hardware implementations of lookup engines, matrix multipliers, cryptographic engines, compression engines, regular expression interpreters, or the like.

Queue manager 150 is configured to maintain and manipulate WU queues 152. At least one of WU queues 152 may be associated with each of cores 140 and configured to store a plurality of work units enqueued for processing on the respective one of the cores 140. In some examples, each of cores 140 may have a dedicated one of WU queues 152 that stores work units for processing by the respective one of cores 140. In other examples, each of cores 140 may have two or more dedicated WU queues 152 that store work units of different priorities for processing by the respective one of cores 140. As illustrated in FIG. 1C, queue manager 150 and WU queues 152 are both physically centralized with respect to cores 140. WU queues 152, however, may be logically decentralized.

Data processing unit 130 may utilize two types of on-chip memory or memory devices, namely coherent cache memory and non-coherent buffer memory (not shown in FIG. 1C). Coherent memory manager 144 is configured to control access to the coherent cache memory, and non-coherent memory manager 145 is configured to control access to the non-coherent buffer memory. In this way, any of the components of data processing unit 130 (i.e., cores 140, networking unit 142, host units 146, accelerators 148, queue manager 150, and WU queues 152) and any number of external devices (e.g., network devices, servers, external storage devices, or the like) may access the coherent cache memory via coherent memory manager 144 and access the non-coherent buffer memory via non-coherent memory manager 145. Memory managers 144, 145 may be configured to perform a number of operations to perform memory management in accordance with the present disclosure. More details on the bifurcated memory system of the DPU are available in U.S. patent application Ser. No. 15/949,892, filed Apr. 10, 2018, and titled "Relay Consistent Memory Management in a Multiple Processor System," the entire content of which is incorporated herein by reference.

Cores 140 may comprise one or more of MIPS (microprocessor without interlocked pipeline stages) cores, ARM (advanced RISC (reduced instruction set computing) machine) cores, PowerPC (performance optimization with enhanced RISC—performance computing) cores, RISC-V (RISC five) cores, or complex instruction set computing (CISC or x86) cores. Each of cores 140 may be programmed to process one or more events or activities related to a given packet flow such as, for example, a networking packet flow, a storage packet flow, a security packet flow, or an analytics packet flow. Each of cores 140 may be programmable using a high-level programming language, e.g., C, C++, or the like.

In some examples, the plurality of cores 140 executes instructions for processing a plurality of events related to each data packet of a packet flow, received by networking unit 142 or host units 146, in a sequential manner in accordance with one or more work units associated with the data packets. As described above, work units are sets of data exchanged between cores 140 and networking unit 142 or host unit 146 where each work unit may represent one or more of the events related to a given data packet. More specifically, a work unit is associated with one or more data packets, and specifies a software function for processing the data packets and further specifies one of cores 140 for executing the software function.

In general, to process a work unit, the one of cores 140 specified by the work unit is configured to retrieve the data packets associated with the work unit from a memory, and execute the software function specified by the work unit to process the data packets. For example, the one of cores 140 may retrieve the data packets from the non-coherent memory buffer via non-coherent memory manager 145, and cache the data packets in the one of caches 141 within the respective one of cores 140.

In a more detailed example, receiving a work unit is signaled by receiving a message in a work unit receive queue (e.g., one of WU queues 152). Each of WU queues 152 is associated with one of cores 140 and is addressable in the header of the work unit message. Upon receipt of the work unit message from networking unit 142, one of host units 146, or another one of cores 140, queue manager 150 enqueues a work unit in the one of WU queues 152 associated with the one of cores 140 specified by the work unit. After queue manager 150 dequeues the work unit from the one of WU queues 152, queue manager 150 delivers the work unit to the one of cores 140. Queue manager 150 then invokes the software function specified by the work unit on the one of cores 140 for processing the work unit.

To process the work unit, the one of cores 140 receives the work unit from the one of WU queues 152. The one of cores 140 then fetches the packets associated with the work unit from the one of caches 141 within the respective one of cores 140, and executes the invoked software function to process the packets. The one of cores 140 then outputs the corresponding results of processing the work unit back to WU queues 152. For example, upon processing the work unit, the one of cores 140 may generate a new work unit message by executing stored instructions to addresses mapped to a work unit transmit queue (e.g., another one of WU queues 152). The stored instructions write the contents of the message to the queue. The release of a work unit message from the one of cores 140 may be interlocked with (gated by) flushing of dirty data from the associated one of caches 141.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A, may process a first event of the plurality of events. Moreover, first core 140A may provide to a second one of plurality of cores 140, e.g., core 140B, a first work unit of the one or more work units. Furthermore, second core 140B may process a second event of the plurality of events in response to receiving the first work unit from first core 140B.

Figure 2:
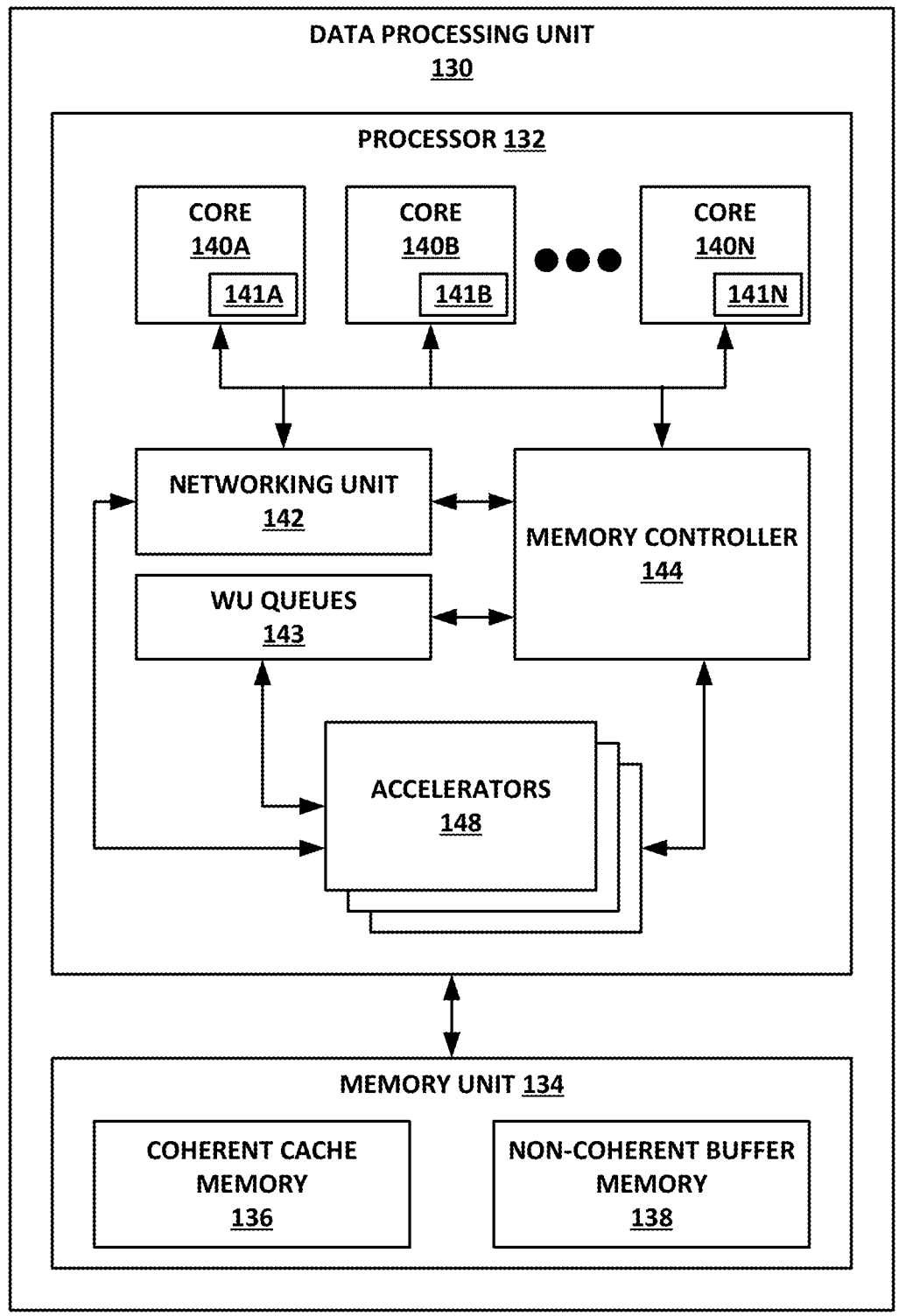
FIG. 2 is a block diagram illustrating an example data processing unit (DPU) including two or more processing cores, in accordance with the techniques of this disclosure.

FIG. 2 is a block diagram illustrating an example data processing unit (DPU) 130 including two or more processing cores, in accordance with the techniques of this disclosure. DPU 130 generally represents a hardware chip implemented in digital logic circuitry and may be used in any computing or network device. DPU 130 may operate substantially similar to and generally represent any of access nodes 17 of FIG. 1A. Thus, DPU 130 may be communicatively coupled to one or more network devices, server devices (e.g., servers 12), random access memory, storage media (e.g., solid state drives (SSDs)), a data center fabric (e.g., switch fabric 14), or the like, e.g., via PCI-e, Ethernet (wired or wireless), or other such communication media. Moreover, DPU 130 may be implemented as one or more application-specific integrated circuit (ASIC), may be configurable to operate as a component of a network appliance or may be integrated with other DPUs within a device.

In the illustrated example of FIG. 2, DPU 130 includes a multi-core processor 132 having a plurality of programmable processing cores 140A-140N ("cores 140") coupled to an on-chip memory unit 134. Each of cores 140 includes a level 1 cache 141 (level 1 caches 141a, 141b, and 141n are associated with cores 140a, 140b, and 140n, respectively).

Memory unit 134 may include two types of memory or memory devices, namely coherent cache memory 136 and non-coherent buffer memory 138. Processor 132 also includes a networking unit 142, work unit (WU) queues 143, a memory controller 144, and accelerators 148. As illustrated in FIG. 2, each of cores 140, networking unit 142, WU queues 143, memory controller 144, memory unit 134, and accelerators 148 are communicatively coupled to each other. Processor 132 of DPU 130 further includes one or more accelerators 148 configured to perform acceleration for various data-processing functions, such as look-ups, matrix multiplication, cryptography, compression, regular expressions, virus scanning, or the like.

In this example, DPU 130 represents a high performance, hyper-converged network, storage, and data processor and input/output hub. For example, networking unit 142 may be configured to receive one or more data packets from and transmit one or more data packets to one or more external devices, e.g., network devices. Networking unit 142 may perform network interface card functionality, packet switching, and the like, and may use large forwarding tables and offer programmability. Networking unit 142 may expose Ethernet ports for connectivity to a network, such as switch fabric 14 of FIG. 1A. DPU 130 may also include one or more interfaces for connectivity to host devices (e.g., servers) and data storage devices, e.g., solid state drives (SSDs) via PCIe lanes. DPU 130 may further include one or more high bandwidth interfaces for connectivity to off-chip external memory.

Processor 132 further includes accelerators 148 configured to perform acceleration for various data-processing functions, such as look-ups, matrix multiplication, cryptography, compression, regular expressions, or the like. For example, accelerators 148 may comprise hardware implementations of look-up engines, matrix multipliers, cryptographic engines, compression engines, or the like. The functionality of different accelerators is described is more detail below with respect to FIG. 5A through FIG. 5F.

Memory controller 144 may control access to on-chip memory unit 134 by cores 140, networking unit 142, and any number of external devices, e.g., network devices, servers, external storage devices, or the like. Memory controller 144 may be configured to perform a number of operations to perform memory management in accordance with the present disclosure. For example, memory controller 144 may be capable of mapping accesses from one of the cores 140 to either of coherent cache memory 136 or non-coherent buffer memory 138. More details on the bifurcated memory system included in the DPU are available in U.S. Provisional Patent Application No. 62/483,844, filed Apr. 10, 2017, and titled "Relay Consistent Memory Management in a Multiple Processor System," the entire content of which is incorporated herein by reference.

Cores 140 may comprise one or more microprocessors without interlocked pipeline stages (MIPS) cores, reduced instruction set computing (RISC) cores, advanced RISC machine (ARM) cores, performance optimization with enhanced RISC—performance computing (PowerPC) cores, RISC Five (RISC-V) cores, or complex instruction set computing (CISC or x86) cores. Each of cores 140 may be programmed to process one or more events or activities related to a given data packet such as, for example, a networking packet or a storage packet. Each of cores 140 may be programmable using a high-level programming language, e.g., C, C++, or the like.

Each of level 1 caches 141 may include a plurality of cache lines logically or physically divided into cache segments. Each of level 1 caches 141 may be controlled by a load/store unit also included within the core. The load/store unit may include logic for loading data into cache segments and/or cache lines from non-coherent buffer memory 138 and/or memory external to DPU 130. The load/store unit may also include logic for flushing cache segments and/or cache lines to non-coherent buffer memory 138 and/or memory external to DPU 130. In some examples, the load/store unit may be configured to prefetch data from main memory during or after a cache segment or cache line is flushed.

As described herein, processor cores 140 may be arranged as processing pipelines, and such processing cores may employ techniques to encourage efficient processing of such work units and high utilization of processing resources. For instance, any of processing cores 140 (or a processing unit within a core) may, in connection with processing a series of work units retrieved from WU queues 143, access data and cache the data into a plurality of segments of level 1 cache 141 associated with the processing core. In some examples, a processing core 140 may process a work unit and cache data from non-coherent memory 138 in a segment of the level 1 cache 141. As described herein, concurrent with execution of work units by cores 140, a load store unit of memory controller 144 may be configured to prefetch, from non-coherent memory 138, data associated with work units within WU queues 143 that are expected to be processed in the future, e.g., the WUs now at the top of the WU queues and next in line to be processed. For each core 140, the load store unit of memory controller 144 may store the prefetched data associated with the WU to be processed by the core into a standby segment of the level 1 cache 141 associated with the processing core 140.

In some examples, the plurality of cores 140 executes instructions for processing a plurality of events related to each data packet of one or more data packets, received by networking unit 142, in a sequential manner in accordance with one or more work units associated with the data packets. As described above, work units are sets of data exchanged between cores 140 and networking unit 142 where each work unit may represent one or more of the events related to a given data packet.

As one example use case, stream processing may be divided into work units executed at a number of intermediate processors between source and destination. Depending on the amount of work to be performed at each stage, the number and type of intermediate processors that are involved may vary. In processing a plurality of events related to each data packet, a first one of the plurality of cores 140, e.g., core 140A may process a first event of the plurality of events. Moreover, first core 140A may provide to a second one of plurality of cores 140, e.g., core 140B a first work unit of the one or more work units. Furthermore, second core 140B may process a second event of the plurality of events in response to receiving the first work unit from first core 140B.

As another example use case, transfer of ownership of a memory buffer between processing cores may be mediated by a work unit message delivered to one or more of processing cores 140. For example, the work unit message may be a four-word message including a pointer to a memory buffer. The first word may be a header containing information necessary for message delivery and information used for work unit execution, such as a pointer to a function for execution by a specified one of processing cores 140. Other words in the work unit message may contain parameters to be passed to the function call, such as pointers to data in memory, parameter values, or other information used in executing the work unit.

In one example, receiving a work unit is signaled by receiving a message in a work unit receive queue (e.g., one of WU queues 143). The one of WU queues 143 is associated with a processing element, such as one of cores 140, and is addressable in the header of the work unit message. One of cores 140 may generate a work unit message by executing stored instructions to addresses mapped to a work unit transmit queue (e.g., another one of WU queues 143). The stored instructions write the contents of the message to the queue. The release of a work unit message may be interlocked with (gated by) flushing of the core's dirty cache data and in some examples, prefetching into the cache of data associated with another work unit for future processing.

Figure 3:
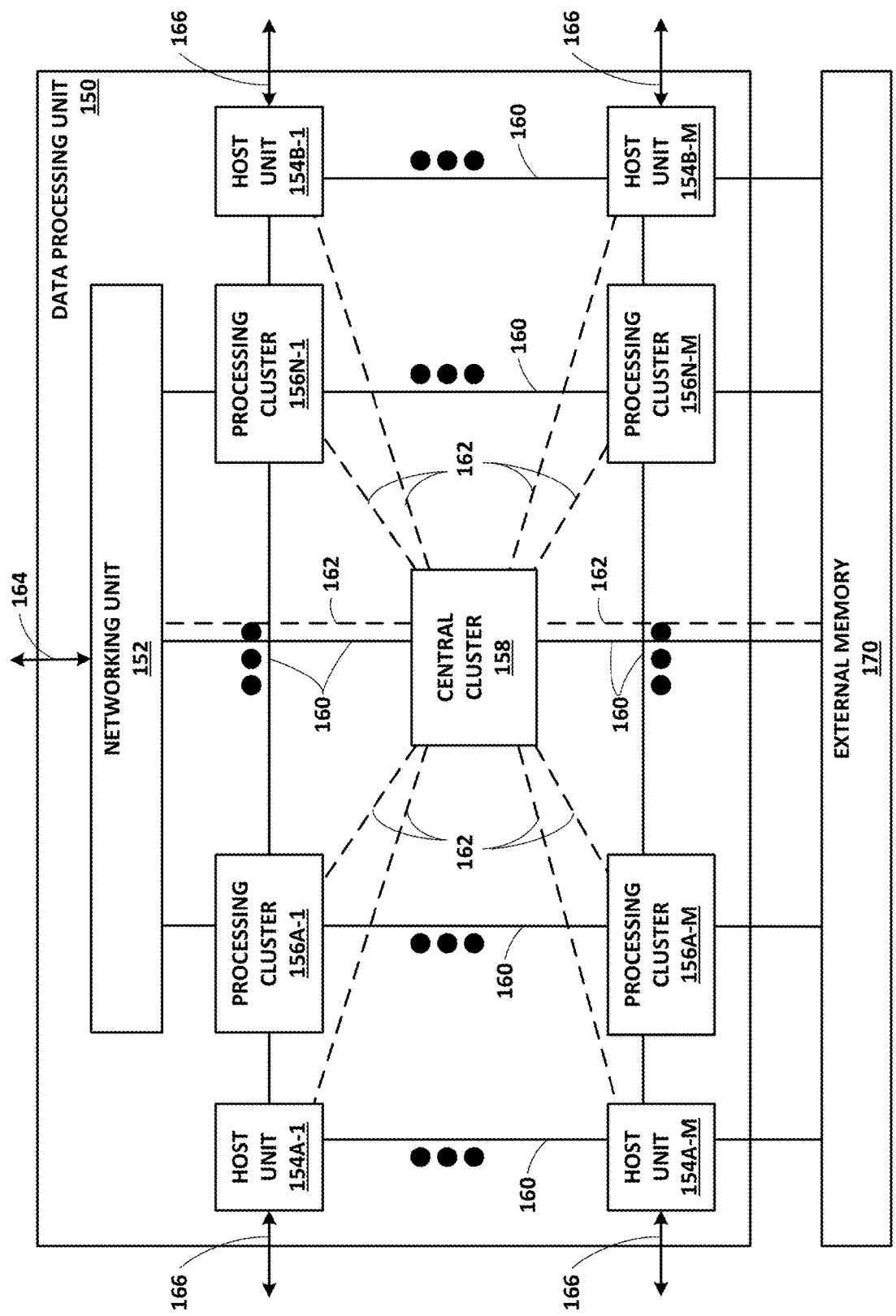
FIG. 3 is a block diagram illustrating another example of a DPU including two or more processing clusters, in accordance with the techniques of this disclosure.

FIG. 3 is a block diagram illustrating one example of a DPU 150 including a networking unit, at least one host unit, and two or more processing clusters. DPU 150 may operate substantially similar to any of the access nodes 17 of FIG. 1A. Thus, DPU 150 may be communicatively coupled to a data center fabric (e.g., switch fabric 14), one or more server devices (e.g., servers 12), storage media (e.g., SSDs), one or more network devices, random access memory, or the like, e.g., via PCI-e, Ethernet (wired or wireless), or other such communication media in order to interconnect each of these various elements. DPU 150 generally represents a hardware chip implemented in digital logic circuitry. As various examples, DPU 150 may be provided as an integrated circuit mounted on a motherboard of a computing, networking and/or storage device or installed on a card connected to the motherboard of the device.

In general, DPU 150 represents a high performance, hyper-converged network, storage, and data processor and input/output hub. As illustrated in FIG. 3, DPU 150 includes networking unit 152, processing clusters 156A-1 to 156N-M (processing clusters 156), host units 154A-1 to 154B-M (host units 154), and central cluster 158, and is coupled to external memory 170. Each of host units 154, processing clusters 156, central cluster 158, and networking unit 152 may include a plurality of processing cores, e.g., MIPS cores, ARM cores, PowerPC cores, RISC-V cores, or CISC or x86 cores. External memory 170 may comprise random access memory (RAM) or dynamic random access memory (DRAM).

As shown in FIG. 3, host units 154, processing clusters 156, central cluster 158, networking unit 152, and external memory 170 are communicatively interconnected via one or more specialized network-on-chip fabrics. A set of direct links 162 (represented as dashed lines in FIG. 3) forms a signaling network fabric that directly connects central cluster 158 to each of the other components of DPU 150, that is, host units 154, processing clusters 156, networking unit 152, and external memory 170. A set of grid links 160 (represented as solid lines in FIG. 3) forms a data network fabric that connects neighboring components (including host units 154, processing clusters 156, networking unit 152, and external memory 170) to each other in a two-dimensional grid.

Networking unit 152 has Ethernet interfaces 164 to connect to the switch fabric, and interfaces to the data network formed by grid links 160 and the signaling network formed by direct links 162. Networking unit 152 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 152, which are coupled to respective grid links 160. The DMA engines of networking unit 152 are configured to fetch packet data for transmission. The packet data may be in on-chip or off-chip buffer memory (e.g., within buffer memory of one of processing clusters 156 or external memory 170), or in host memory.

Host units 154 each have PCI-e interfaces 166 to connect to servers and/or storage devices, such as SSD devices. This allows DPU 150 to operate as an endpoint or as a root. For example, DPU 150 may connect to a host system (e.g., a server) as an endpoint device, and DPU 150 may connect as a root to endpoint devices (e.g., SSD devices). Each of host units 154 may also include a respective hardware DMA engine (not shown). Each DMA engine is configured to fetch data and buffer descriptors from host memory, and to deliver data and completions to host memory.

DPU 150 provides optimizations for stream processing. DPU 150 executes an operating system that facilitates run-to-completion processing, which may eliminate interrupts, thread scheduling, cache thrashing, and associated costs. For example, an operating system may run on one or more of processing clusters 156. Central cluster 158 may be configured differently from processing clusters 156, which may be referred to as stream processing clusters. In one example, central cluster 158 executes the operating system kernel (e.g., Linux kernel) as a control plane. Processing clusters 156 may function in run-to-completion thread mode of a data plane software stack of the operating system. That is, processing clusters 156 may operate in a tight loop fed by work unit queues associated with each processing core in a cooperative multi-tasking fashion.

DPU 150 operates on work units (WUs) that associate a buffer with an instruction stream to reduce dispatching overhead and allow processing by reference to minimize data movement and copy. The stream-processing model may structure access by multiple processors (e.g., processing clusters 156) to the same data and resources, avoid simultaneous sharing, and therefore, reduce contention. A processor may relinquish control of data referenced by a work unit as the work unit is passed to the next processor in line. Central cluster 158 may include a central dispatch unit responsible for work unit queuing and flow control, work unit and completion notification dispatch, and load balancing and processor selection from among processing cores of processing clusters 156 and/or central cluster 158.

As described above, work units are sets of data exchanged between processing clusters 156, networking unit 152, host units 154, central cluster 158, and external memory 170. Each work unit may be represented by a fixed length data structure, or message, including an action value and one or more arguments. In one example, a work unit message includes four words, a first word having a value representing an action value and three additional words each representing an argument. The action value may be considered a work unit message header containing information necessary for message delivery and information used for work unit execution, such as a work unit handler identifier, and source and destination identifiers of the work unit. The other arguments of the work unit data structure may include a frame argument having a value acting as a pointer to a continuation work unit to invoke a subsequent work unit handler, a flow argument having a value acting as a pointer to state that is relevant to the work unit handler, and a packet argument having a value acting as a packet pointer for packet and/or block processing handlers.

In some examples, one or more processing cores of processing clusters 180 may be configured to execute program instructions using a work unit (WU) stack. In general, a work unit (WU) stack is a data structure to help manage event driven, run-to-completion programming model of an operating system typically executed by processing clusters 156 of DPU 150, as further described in U.S. Patent Application Ser. No. 62/589,427, filed Nov. 21, 2017, the entire content of which is incorporated herein by reference.

As described herein, in some example implementations, load store units within processing clusters 156 may, concurrent with execution of work units by cores within the processing clusters, identify work units that are enqueued in WU queues for future processing by the cores. In some examples, WU queues storing work units enqueued for processing by the cores within processing clusters 156 may be maintained as hardware queues centrally managed by central cluster 158. In such examples, load store units may interact with central cluster 158 to identify future work units to be executed by the cores within the processing clusters. The load store units prefetch, from the non-coherent memory portion of external memory 170, data associated with the future work units. For each core within processing clusters 156, the load store units of the core may store the prefetched data associated with the WU to be processed by the core into a standby segment of the level 1 cache associated with the processing core.

FIG. 4 is a block diagram illustrating another example processing cluster 180 including a plurality of programmable processing cores 182A-182N. Each of processing clusters 156 of DPU 150 of FIG. 3 may be configured in a manner substantially similar to that shown in FIG. 4. In the example of FIG. 4, processing cluster 180 includes cores 182A-182N ("cores 182"), a memory unit 183 including a coherent cache memory 184 and a non-coherent buffer memory 186, a cluster manager 185 including WU queue manager 187 for maintaining (e.g., within hardware registers of processing cluster 180) and manipulating WU queues 188, and accelerators 189A-189X ("accelerators 189"). Each of cores 182 includes L1 buffer cache 198 (i.e., core 182 includes L1 buffer cache 198A and in general, core 182N includes L1 buffer cache 198N). In some examples, cluster manager 185 is alternatively located within central cluster 158, and/or WU queues 188 are alternatively maintained within central cluster 158 (e.g., within hardware registers of central cluster 158).

An access node or DPU (such as access nodes 17 of FIG. 1A, DPU 130 of FIG. 2, or DPU 150 of FIG. 3) may support two distinct memory systems: a coherent memory system and a non-coherent buffer memory system. In the example of FIG. 4, coherent cache memory 184 represents part of the coherent memory system while non-coherent buffer memory 186 represents part of the non-coherent buffer memory system. Cores 182 may represent the processing cores discussed with respect to DPU 150 of FIG. 3. Cores 182 may share non-coherent buffer memory 186. As one example, cores 182 may use non-coherent buffer memory 186 for sharing streaming data, such as network packets.

In general, accelerators 189 perform acceleration for various data-processing functions, such as table lookups, matrix multiplication, cryptography, compression, regular expressions, or the like. That is, accelerators 189 may comprise hardware implementations of lookup engines, matrix multipliers, cryptographic engines, compression engines, regular expression interpreters, or the like. For example, accelerators 189 may include a lookup engine that performs hash table lookups in hardware to provide a high lookup rate. The lookup engine may be invoked through work units from external interfaces and virtual processors of cores 182, and generates lookup notifications through work units. Accelerators 189 may also include one or more cryptographic units to support various cryptographic processes. Accelerators 189 may also include one or more compression units to perform compression and/or decompression.

An example process by which a processing cluster 180 processes a work unit is described here. Initially, cluster manager 185 of processing cluster 180 may queue a work unit (WU) in a hardware queue of WU queues 188. When cluster manager 185 "pops" the work unit from the hardware queue of WU queues 188, cluster manager 185 delivers the work unit to one of accelerators 189, e.g., a lookup engine. The accelerator 189 to which the work unit is delivered processes the work unit and determines that the work unit is to be delivered to one of cores 182 (in particular, core 182A, in this example) of processing cluster 180. Thus, the one of accelerators 189 forwards the work unit to a local switch of the signaling network on the DPU, which forwards the work unit to be queued in a virtual processor queue of WU queues 188.

After cluster manager 185 pops the work unit from the virtual processor queue of WU queues 188, cluster manager 185 delivers the work unit via a core interface to core 182A, in this example. An interface unit of core 182A then delivers the work unit to one of the virtual processors of core 182A.

Core 182A processes the work unit, which may involve accessing data, such as a network packet or storage packet, in non-coherent memory 156A and/or external memory 170. Core 182A may first look for the corresponding data in cache 198A, and in the event of a cache miss, may access the data from non-coherent memory 156A and/or external memory 170. In some examples, while processing the work unit, core 182A may store information (i.e., the network packet or data packet) associated with the work unit in an active segment of cache 198A. Further, core 182A may, while processing the work unit, prefetch data associated with a second work unit into a different, standby segment of cache 198A. When core 182A completes processing of the work unit, core 182A initiates (or causes initiation of) a cache flush for the active segment, and may also initiate prefetching of data associated with a third work unit (to be processed later) into that active segment. Core 182A (or a virtual processor within core 182A) may then swap the active segment and the standby segment so that the previous standby segment becomes the active segment for processing of the next work unit (i.e., the second work unit). Because data associated with the second work unit was prefetched into this now active segment, core 182A (or a virtual processor within core 182A) may be able to more efficiently process the second work unit. Core 182A then outputs corresponding results (possibly including one or more work unit messages) from performance of the work unit back through the interface unit of core 182A.

As described herein, in some example implementations, load store units within memory unit 183 may, concurrent with execution of work units by cores 182 within the processing cluster 180, identify work units that are enqueued in WU queues 188 for future processing by the cores. The load store units prefetch, from a non-coherent memory portion of external memory 170, data associated with the future work units and store the prefetched data associated with the WUs to be processed by the cores into a standby segment of the level 1 cache associated with the particular processing cores.

Figure 4A:
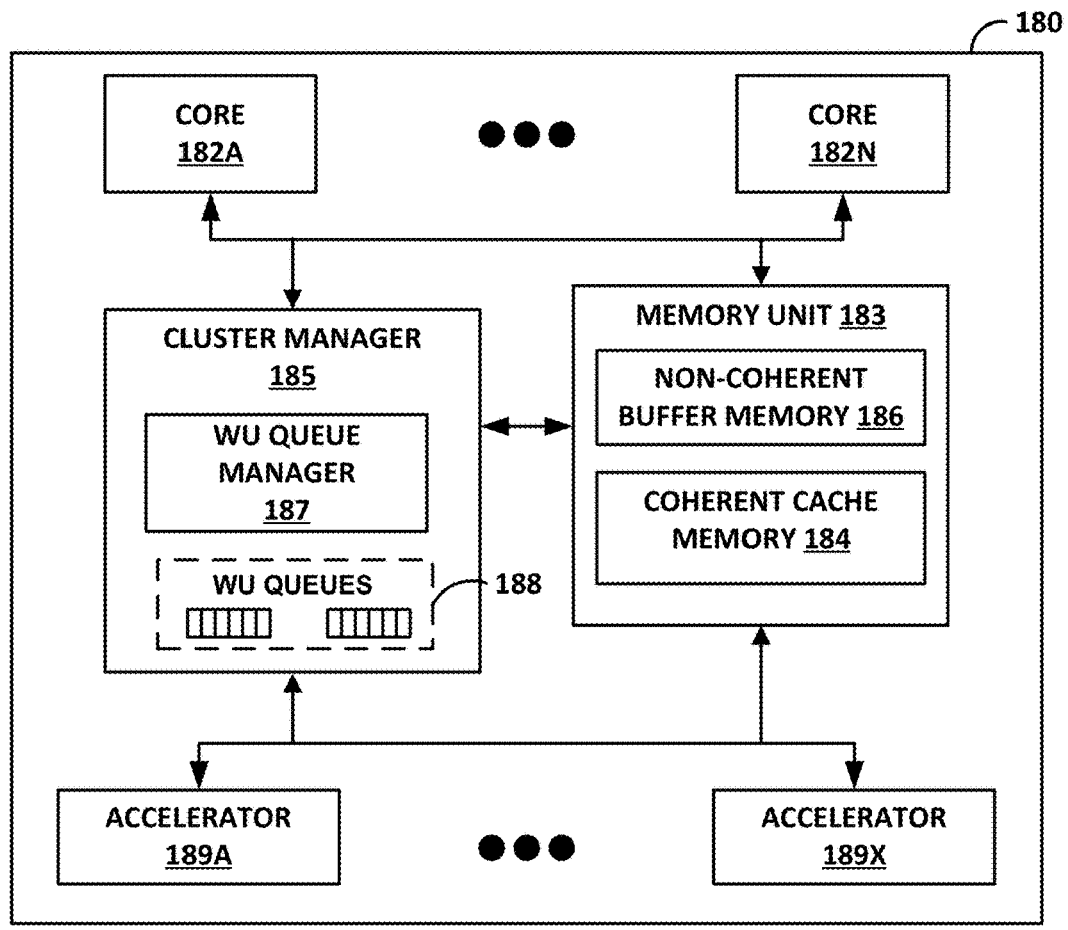
FIG. 4A is a block diagram illustrating an example processing cluster including two or more processing cores, in accordance with the techniques of this disclosure.

Executing a service chain in the system of FIG. 3 and FIG. 4A may be performed by processing a series of work units. For instance, access node 150 may create a WU stack and arrange WU frames within the WU stack based on the desired or programmed sequence of operations. In such an example, the WU stack may represent a service chain of operations to be performed by one or more of processing cores 182, or one or more of accelerators 189. The service chain may be performed by any of processing clusters 156 of access nodes 150 (each of processing clusters 156 may be represented by processing cluster 180 of FIG. 4A) so that the service chain may be executed across multiple processing clusters 156 within access node 150. Further, the service chain may include operations performed by networking unit 152 and one or more of host units 154, so such a service chain may be executed across processing clusters as well as other devices.

While processing the service chain access node 150 may modify the sequence, order, or other aspects of the pipeline of operations during runtime. For instance, access node 150 may skip one or more stages of the pipeline or service chain, or follow alternative paths through the service chain based on the results of processing performed by other nodes within the service chain. Further, some aspects of the service chain may be performed in parallel. In one such example, where a stage of the service chain is to be performed by one or more of accelerators 189, a scheduler within an accelerator 189 may cause the accelerator to operate in parallel (e.g., through use of multiple threads or use of multiple modules or devices within the accelerator). In some cases, performing some stages of a service chain in a parallel manner may help maintain a desired throughput.

Figure 4B:
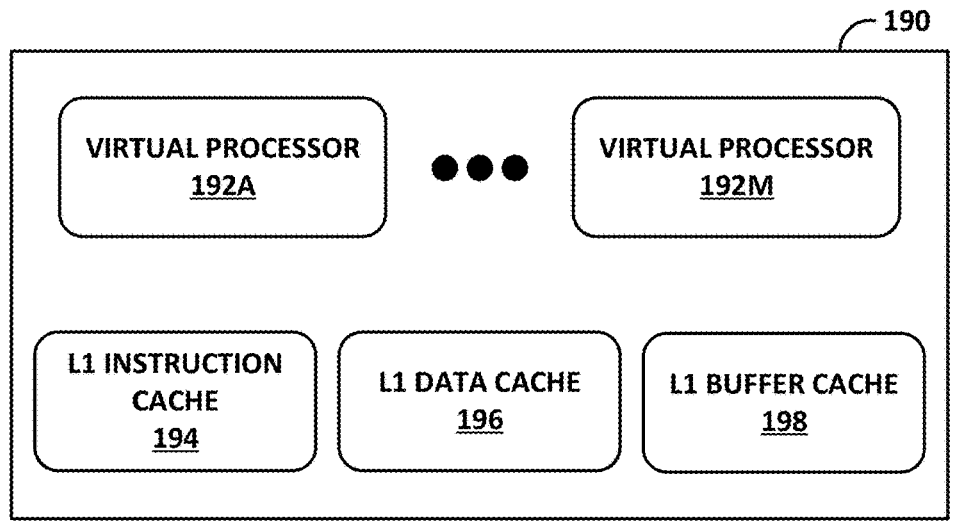
FIG. 4B is a block diagram illustrating an example processing core of a processing cluster.

FIG. 4B is a block diagram illustrating components of an example programmable processing core 190 of a processing cluster. Each of cores 182 of FIG. 4A may include components substantially similar to those of core 190 of FIG. 4B. In this example, core 190 is configured with one or more hardware threads referred to as Virtual Processors (VPs) 192A-192M ("VPs 192"). Core 190 also includes a level 1 (L1) instruction cache 194 and a L1 data cache 196. When each of cores 182 of FIG. 4A includes an L1 data cache similar to L1 data cache 196, the L1 data caches of cores 182 may share L2 coherent cache memory 184 of FIG. 4A. Core 190 also includes a L1 buffer cache 198, which may be smaller than L1 data cache 196. Core 190 may use L1 buffer cache 198 for non-coherent data, such as packets or other data for software managed through the stream processing mode. L1 buffer cache 198 may store data for short-term caching, such that the data is available for fast access. When one of virtual processors 192, such as virtual processor 192A, accesses memory, virtual processor 192A uses L1 data cache 196 or L1 buffer cache 198, based on the physical memory address issued by a memory management unit (not shown).

More details on access nodes, including their operation and example architectures, are available in U.S. Provisional Patent Application No. 62/530,691, filed Jul. 10, 2017, entitled "Data Processing Unit for Computing Devices," and U.S. Provisional Patent Application No. 62/559,021, filed Sep. 15, 2017, entitled "Access Node for Data Centers," the entire content of each of which is incorporated herein by reference.

FIG. 5A through FIG. 5F illustrate example accelerators that may be included within data processing units and/or access nodes, in accordance with one or more aspects of this disclosure. The accelerators illustrated in FIG. 5A through FIG. 5F may correspond to one or more of accelerators 148 of FIG. 2 and/or one or more of accelerators 189 of FIG. 4A. In some examples, each accelerator is implemented as a specialized hardware-based accelerator configured to perform acceleration for various data-processing functions, thereby offloading tasks from the processing units when processing work units. Each accelerator may be programmable by the processing cores, and one or more accelerators may be logically chained together to operate on stream data units, such as by providing cryptographic functions, compression and regular expression (RegEx) processing, data storage functions and networking operations. Further, some of all of the accelerators may be programmable or configured to operate on one or more data packets to generate accelerator data or other data for use in processing a packet, or in a service chain of operations as described herein.

Figure 5A:
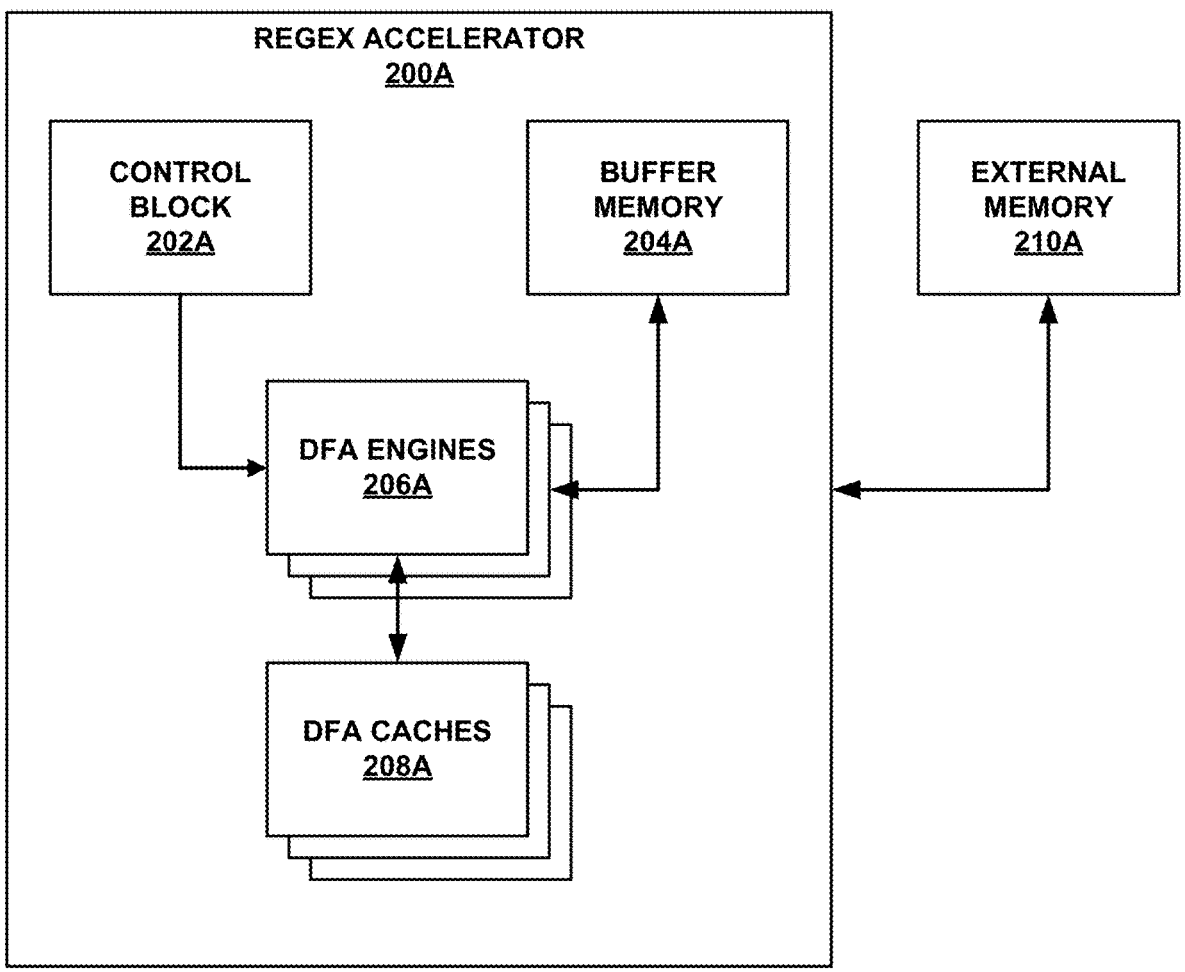
FIG. 5A is a block diagram illustrating an example regular expression (RegEx) accelerator, in accordance with the techniques of this disclosure.

FIG. 5A is a block diagram illustrating an example regular expression (RegEx) accelerator 200A. RegEx accelerator 200A may correspond to one of accelerators 148 of FIG. 2 or one of accelerators 189 of FIG. 4A. In this example, RegEx accelerator 200A includes control block 202A, on-chip memory dedicated for RegEx accelerator 200A, referred to as buffer memory 204A, deterministic finite automata (DFA) engines 206A, and DFA caches 208A, which operate as high-speed on-chip cache memory for caching select DFA arcs. As shown in FIG. 5A, RegEx accelerator 200A is also in communication with external memory 210A. External memory 210A is so named because external memory 210A is external to RegEx accelerator 200A, i.e., off chip, and generally has longer memory access cycles. For example, external memory 210A may correspond to memory unit 134 of FIG. 2 (e.g., non-coherent buffer memory 138 of FIG. 2), external memory 170 of FIG. 3, or non-coherent buffer memory 186 of FIG. 4.

In general, control block 202A represents a processing unit (implemented in circuitry) that controls operation of other components of RegEx accelerator 200A. For example, control block 202A may receive work units from external components (such as processing cores) to traverse a DFA (representing a regular expression) for target input data (e.g., a payload of a packet). In particular, one or more cores of a processing cluster, such as cores 182 of processing cluster 180 in FIG. 4, issue an instruction to load, and control block 202A loads, a DFA graph (or in some cases, multiple DFA graphs) that was previously compiled from a corresponding regular expression by a compiler. In this way, each DFA graph generated by the compiler corresponds to at least a portion of a regular expression and is a data structure representing the pattern and/or rule matching criteria set forth within the regular expression.

In general, a DFA graph includes a set of nodes directly linked by arcs, where each node in the graph represents a state and each arch represents transitions between states based on criteria specified for the respective arc. Each node of a DFA graph may contain one or more arcs directionally linking the node to itself and/or other nodes within the DFA graph. When compiling one or more regular expressions into one or more DFA graphs, the compiler may generate one or more of the nodes in a form of a hash table having a set of hash buckets for storing data indicative of the state transitions represented by the arcs originating from the node. Input, such as symbols within payloads of stream data, are hashed to hash buckets to determine whether the input results in a state transition for the given node. Moreover, the compiler may arrange each hash bucket in the form of a set of slots, and data representative of the arcs of the DFA may be stored in the slots of hash buckets.

In some examples, after a compiler compiles regular expressions into DFA graphs, a loader may allocate data for the DFA graph to on-chip buffer memory 204A and/or external memory 210A, and may optimize the structure of the data based on the particular memory to which the data will be stored when used for stream processing. In some examples, the loader allocates data for nodes of the DFA graph by traversing the DFA graph in a breadth-first manner starting from a root of the DFA graph so as to allocate the nodes of the DFA that are closer to the root first to buffer memory 204A and then to external memory 210A once buffer memory 204A is full or a pre-determined amount of buffer memory 204A will be utilized by the portion of the DFA graph allocated to the buffer memory.

After compilation, the loader stores data representing the DFA graph initially in external memory 210A or a different computer-readable storage medium for loading when needed for stream processing. In some examples, control block 202A may receive work units including instructions to retrieve at least a portion of a DFA graph from external memory 210A allocated and structurally arranged for buffer memory 204A by the loader following compilation of the regular expression. In response, control block 202A may retrieve the designated portion of the DFA graph from external memory 210A and store the portion of the DFA graph to one or more of buffer memory 204A, and in some cases may preload certain nodes into high-speed, on-chip DFA caches 208A, which may operate as L1 caches. Likewise, after one or more searches have been conducted, control block 202A may receive work units including instructions to clear one or more of DFA caches 208A and/or unload portions of DFAs from buffer memory 204A. Furthermore, control block 202A may receive work units including instructions to initiate a search, e.g., indicating a payload to be searched using a loaded DFA graph. In some examples, a single work unit may represent both a command to load a DFA and to perform a search using the loaded DFA.

More details on regular expression (RegEx) accelerator 200A, including further descriptions of accelerator 200A as illustrated in FIG. 5A, are available in U.S. patent application Ser. No. 16/035,416, filed Jul. 13, 2018, entitled "ARC CACHING FOR DETERMINISTIC FINITE AUTOMATA OF REGULAR EXPRESSION ACCELERATOR," the entire content of which is incorporated herein by reference.

Each of DFA engines 206A includes one or more hardware threads configured to execute respective search processes according to a DFA graph. Each of the threads may include, for example, one or more respective memories (e.g., registers, caches, or the like) for storing a current node of a corresponding DFA graph and a current position of a payload data being inspected. That is, the threads may store data representing a current node locator and a payload offset. The current node locator may correspond to a value stored by a thread including a memory type (e.g., buffer memory 204A or external memory 210A), address, and mode (size and layout) of the current node.

DFA engines 206A also include respective processing units for comparing a current symbol of the payload data to labels for arcs from the current node of the DFA graph. The threads of each of DFA engines 206A may share a common processing unit, or the threads may each include a corresponding processing unit. In general, the processing unit determines a node to which to transition from the current node (i.e., the node to which the arc having a label matching the current symbol of the payload data points). More particularly, given a current node locator and an input byte (i.e., the value of a current symbol of the payload data), the processing unit reads the node from the memory location indicated by the current node locator and determines an arc of the node (if any) having a label that is the same as the input byte. If the processing unit finds such an arc, the processing unit provides the next node locator for the next input byte. On the other hand, if no such arc is found, the processing unit may reinitialize the next node locator to the start node (i.e., a root of the DFA graph).

The processing unit or the thread of the corresponding one of DFA engines 206A may then update the current node locator and the payload offset. The processing unit may continue this evaluation until either the entire set of payload data has been examined without finding a match, or a resulting node of the DFA graph is a matching node. In response to reaching a matching node, the thread of the one of DFA engines 206A may return data indicating that a match has been identified.

Before evaluating payload data, DFA engines 206A may preload at least a portion of a DFA graph into buffer memory 204A from external memory 210A or a different computer-readable medium based on the memory allocation specified by the compiler for each nodes. DFA engines 206A may preload a portion of the DFA graph into memory of a thread of the one of DFA engines 206A. In particular, DFA engines 206A may be configured to receive a DFA LOAD work unit, including instructions to direct the DFA engine to load at least a portion of a DFA graph (e.g., a root of the DFA graph, and/or other portions of the DFA graph) into buffer memory 204A and/or memory of one of the threads of the DFA engines 206A. The at least portion of the DFA graph may include a root node of the DFA graph and/or data representing one or more nodes and/or arcs of the nodes of the DFA graph. Likewise, DFA engines 206A may be configured to unload a loaded portion of a DFA graph from the thread memory and/or from buffer memory 204A, e.g., in response to a DFA UNLOAD work unit. The DFA UNLOAD work unit may include instructions indicating that one or more loaded arcs of a DFA graph are to be removed from thread memory and/or buffer memory 204A, and/or to unlock and clear a root buffer for a DFA graph from the thread memory and/or buffer memory 204A.

To perform a search, DFA engines 206A may receive a DFA SEARCH work unit including instructions to cause DFA engines 206A to select an idle thread of DFA engines 206A to be used to search payload data against a DFA graph, at least a portion of which may have been previously loaded in response to a DFA LOAD work unit. To perform the search, DFA engines 206A may provide to the idle thread: data representing locations of the DFA graph (including a root of the graph, a base address of a portion of the DFA graph loaded into buffer memory 204A, and a base address of a portion of the DFA graph in external memory 210A), a node from which to start the DFA graph traversal, addresses of payload buffers to be processed in a work unit stack frame, and an address and size of a result buffer in the work unit stack frame.

Accordingly, a thread and a processing unit of one of DFA engines 206A may perform a search in response to a DFA SEARCH work unit. In particular, the processing unit may retrieve a current symbol from payload data of the work unit stack frame, as indicated by the DFA SEARCH work unit, and ultimately output an indication of whether a match occurred to the result buffer in the work unit stack frame.

Each of DFA engines 206A correspond to respective, private DFA cache memories 208A. DFA cache memories 208A may serve two purposes: cache arc data (e.g., recently traversed arcs from a node for which data is stored in external memory 210A), and cache root buffer data (e.g., caching pre-loaded root data from external memory 210A for parallel lookups in response to arc cache misses). An entire one of DFA cache memories 208A may be used as an arc cache, where each cache line holds one node arc. DFA engines 206A may load these node arcs and evict these node arcs dynamically in the arc cache when they are accessed and traversed by a respective DFA thread.

Figure 5B:
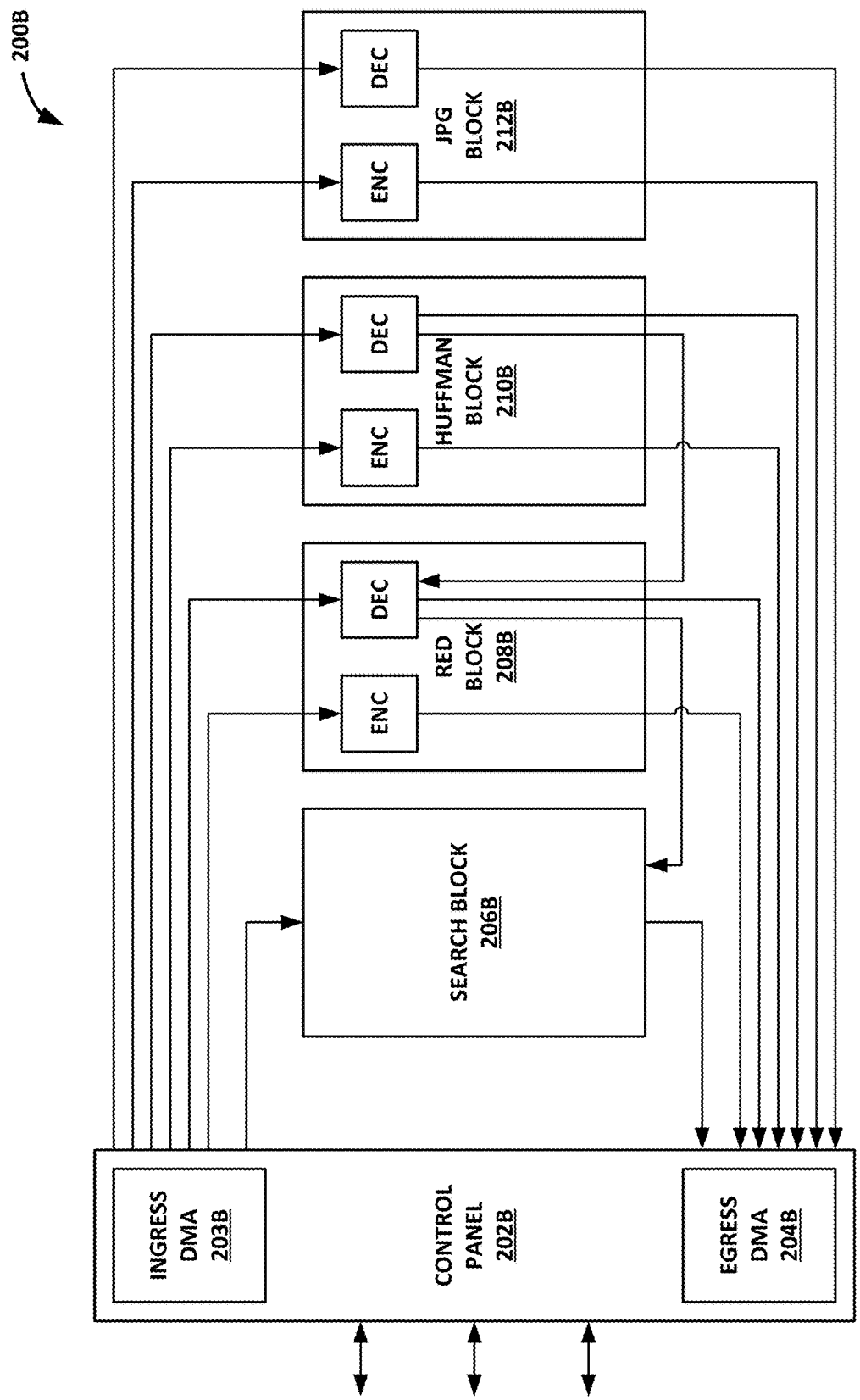
FIG. 5B block diagram illustrating an example data compression accelerator

FIG. 5B is a block diagram illustrating an example data compression accelerator 200B. For example, data compression accelerator 200B may correspond to one of accelerators 148 of FIG. 2 or one of accelerators 189 of FIG. 4A. In some examples, data compression accelerator 200B may be included in each of processing clusters 156 of data processing unit 150 from FIG. 3 for local, hardware-based execution of compression work units generated by software executing on the processing cores of the respective cluster Data compression accelerator 200B is configured to accelerate the computationally intensive data compression and decompression operations conventionally performed by software running on general-purpose processors. As illustrated in FIG. 5B, in this example, data compression accelerator 200B includes a control panel 202B, a search block 206B, a range encode/decode (RED) block 208B, a Huffman encode/decode block 210B, and a JPG re-encode/decode block 212B, each of which represent different hardware circuitry within, for example, an integrated circuit device. With these components, data compression accelerator 200B may support DEFLATE compression and decompression used by gzip and zlib, support Lempel-Ziv-Markov chain algorithm (LZMA) compression and decompression, and support JPG re-compression and decompression. DEFLATE compression comprises a lossless data compression algorithm that uses a combination of a dictionary-based compression scheme performed by search block 206B and Huffman encoding performed by Huffman block 210B. For example, the dictionary-based compression scheme may comprise one of the LZ77, LZ78, LZW, LZ4, LZO, or LZS algorithms. The DEFLATE compression and decompression is described in more detail in P. Deutsch, "DEFLATE Compressed Data Format Specification version 1.3," IETF Network Working Group, RFC 1951, May 1996. LZMA compression comprises another lossless data compression algorithm that uses a combination of a dictionary-based compression scheme performed by search block 206B and range encoding performed by RED block 208B. JPG re-compression comprises lossy compression for digital images performed by JPG block 212B.

More details on data compression accelerator 200B, including further descriptions of accelerator 200B as illustrated in FIG. 5B, are available in U.S. patent application Ser. No. 16/195,209, filed Nov. 19, 2018, entitled "HISTORY-BASED COMPRESSION PIPELINE FOR DATA COMPRESSION ACCELERATOR OF A DATA PROCESSING UNIT," the entire content of which is incorporated herein by reference.

Figure 5C:
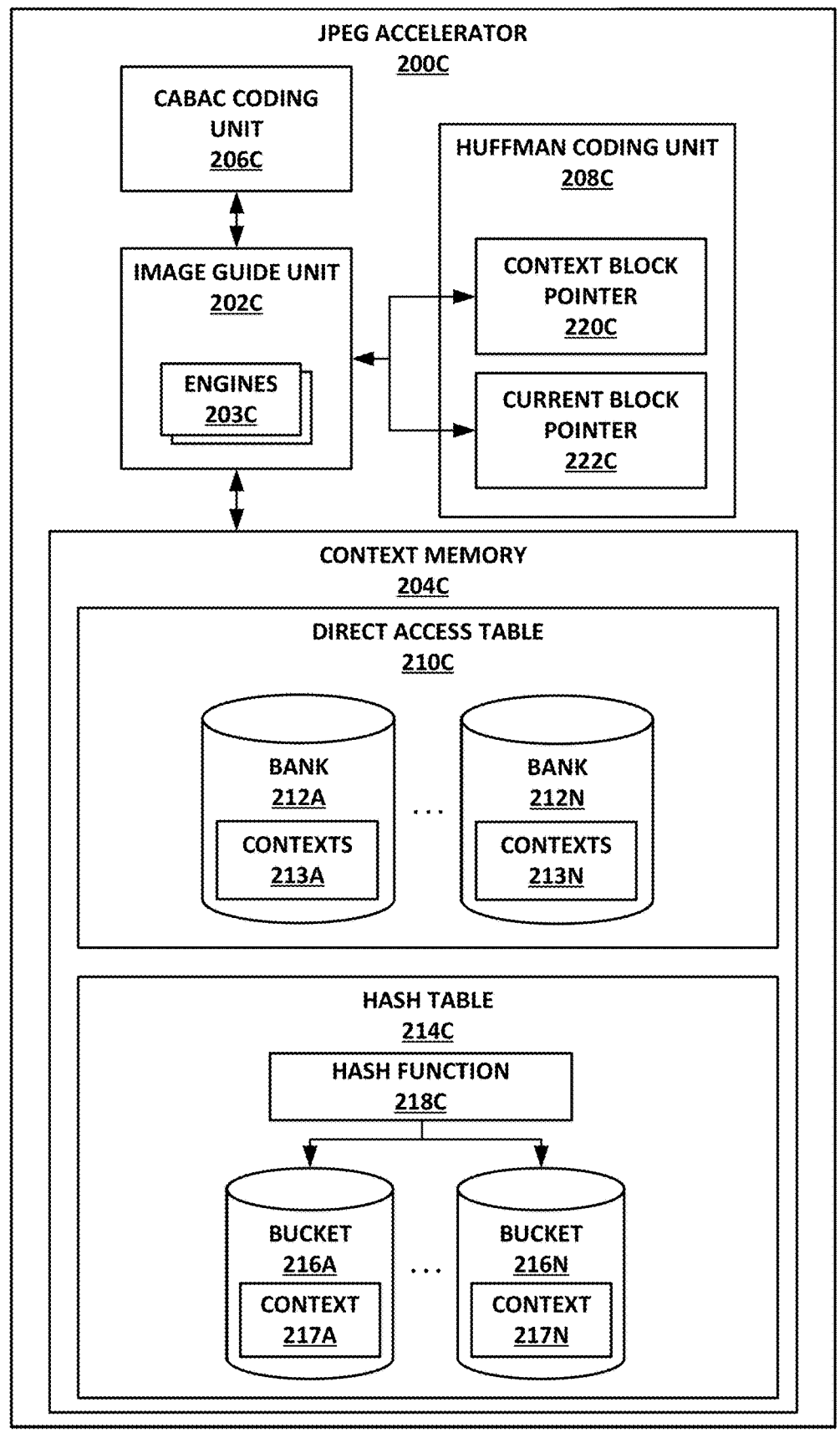
FIG. 5C block diagram illustrating an example Joint Picture Experts Group (JPEG) accelerator, in accordance with the techniques of this disclosure

FIG. 5C is a block diagram illustrating an example JPEG accelerator 200C used for tasks including image coding and/or compression. JPEG accelerator 200C may correspond to one of accelerators 148 of FIG. 2 or one of accelerators 189 of FIG. 4. While JPEG accelerator 200C is described herein as being configured for JPEG, in some examples, JPEG accelerator 200C may be configured to apply for other image compression techniques. For instance, JPEG accelerator 200C may be referred to as an example of an "image coding unit." In this example, JPEG accelerator 200C includes image guide unit 202C, MCU conversion unit 203C, context memory 204C, Context-Adaptive Binary Arithmetic Coding (CABAC) coding unit 206C, and Huffman coding unit 208C. While the example of FIG. 5C depicts CABAC coding unit 206C configured to perform CABAC coding, in other examples, other coding units may be used in place of CABAC coding unit 206C that are configured to apply other arithmetic coding techniques.

More details on JPEG accelerator 200C, including further descriptions of JPEG accelerator 200C as illustrated in FIG. 5C, are available in U.S. patent application Ser. No. 16/179,472, filed Nov. 2, 2018, entitled "PARALLEL CODING OF SYNTAX ELEMENTS FOR JPEG ACCELERATOR," the entire content of which is incorporated herein by reference.

Figure 5D:
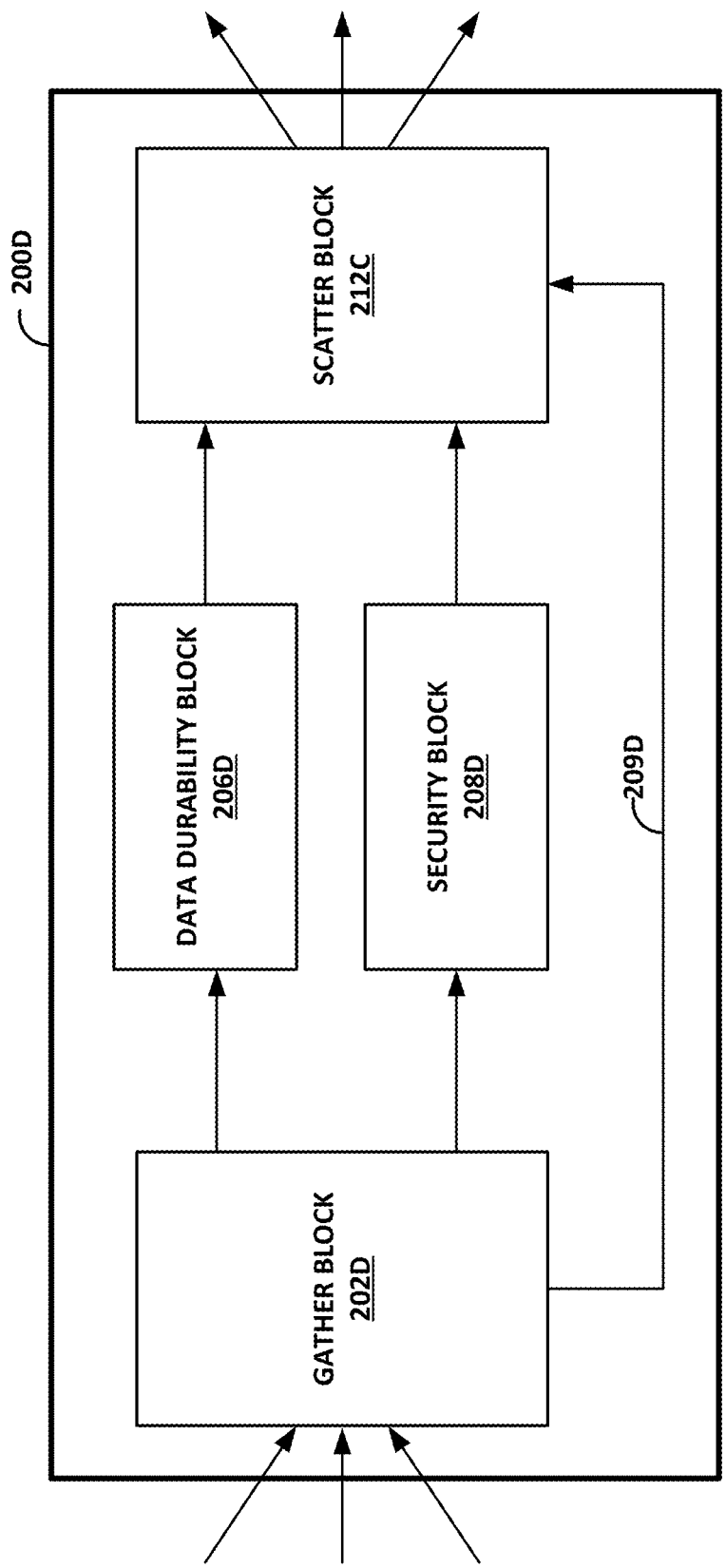
FIG. 5D is a block diagram illustrating example data durability and security blocks deployed within an example accelerator, in accordance with one or more aspects of the present disclosure.

FIG. 5D is a block diagram illustrating an example security and/or data durability accelerator, in accordance with one or more aspects of the present disclosure. In the example of FIG. 5D, accelerator 200D may be one of accelerators 148 of data processing unit 130 from FIG. 2, or one of accelerators 189 of processing cluster 180 from FIG. 4. In some examples, accelerator 200D may be included in some or all of processing clusters 156 of data processing unit 150 illustrated in FIG. 3.

In the example of FIG. 5D, accelerator 200D is configured to accelerate, improve, and/or perform operations relating to data durability, security, and/or reliability that might otherwise be performed by software executing on a general purpose processor. As illustrated in FIG. 5D, accelerator 200D may include one or more gather blocks 202D, one or more data durability blocks 206D, one or more security blocks 208D, and one or more scatter blocks 212D. Further, in some examples, other types of specific-function blocks, beyond data durability block 206D and security block 208D, may also be included within accelerator 200D. In addition, as illustrated in FIG. 5D, pass-through connection 209D may also be included within accelerator 200D.

Data durability block 206D and security block 208D (or other accelerator blocks described herein) may each be implemented as a DMA inline accelerator positioned between gather block 202D and scatter block 212D. For data durability block 206D, gather block 202D may read a coefficient matrix and data fragments through gather commands, and scatter block 212D may write data fragments and/or parity fragments back to system memory through scatter software commands. Accordingly, gather block 202D may provide data accessed from an external memory, and may serve as an ingress DMA device. Scatter block 212D may send data back to external memory, and may serve as an egress DMA device. Further details relating to techniques for storage of data (e.g., block storage) to support inline erasure coding are available in U.S. Provisional Patent Application No. 62/597,185, filed Dec. 11, 2017, entitled "Durable Block Storage in Data Center Access Nodes with Inline Erasure Coding," the entire content of which is incorporated herein by reference.

Through these components and/or others described herein, accelerator 200D may support multiple different data durability or erasure coding schemes (e.g., through data durability block 206D), enabling data to be reliably stored and retrieved from locations within data center 10. Accelerator 200D may also support security functions (e.g., through security block 208D), enabling data received from gather block 202D to be encrypted and/or decrypted before being provided to scatter block 212D.

Figure 5E:
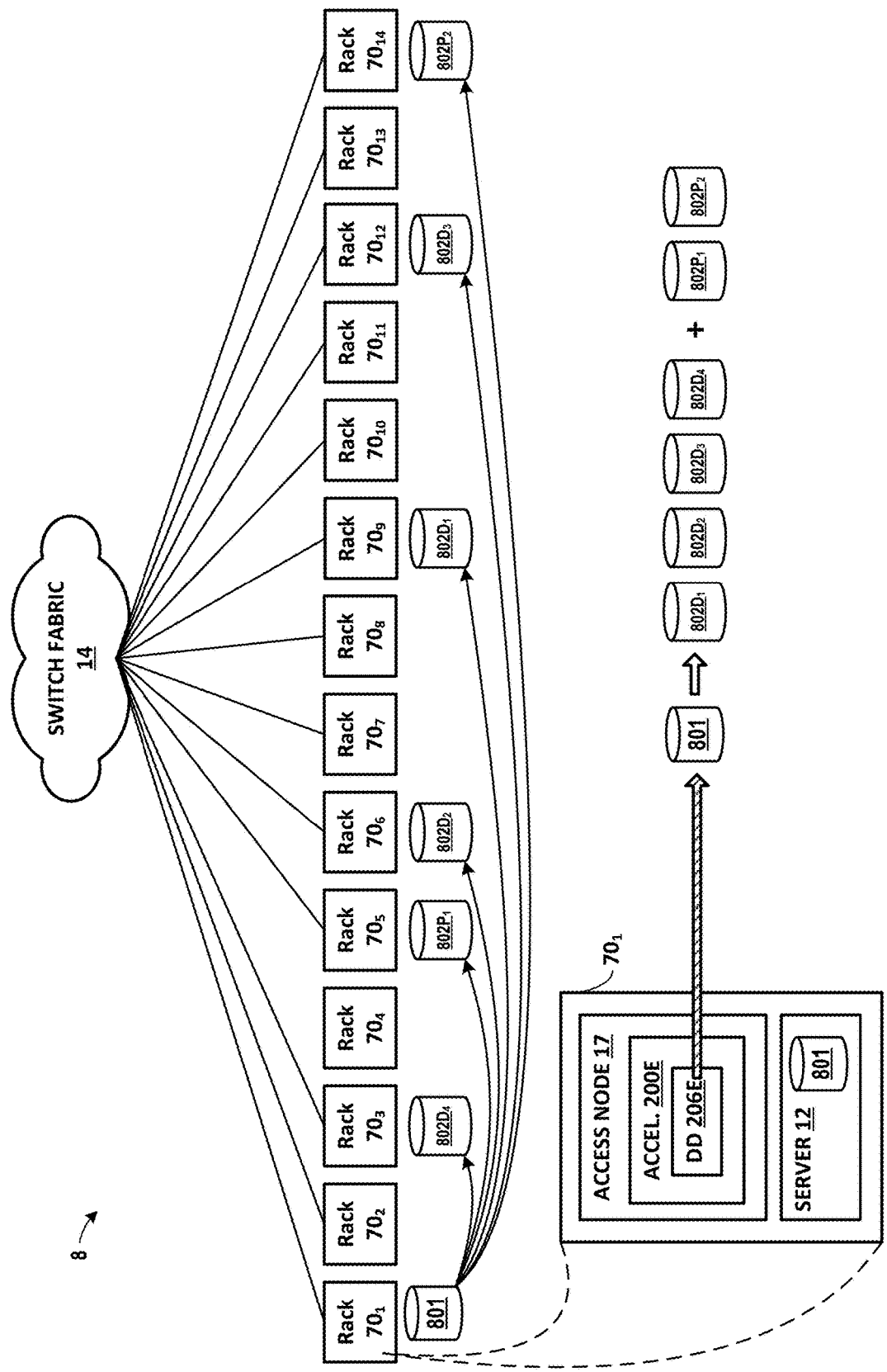
FIG. 5E is a block diagram illustrating an example data durability accelerator, in accordance with the techniques of this disclosure

FIG. 5E is a conceptual diagram illustrating an example write operation performed pursuant to an erasure coding data reliability scheme, in accordance with one or more aspects of the present disclosure. FIG. 5E illustrates erasure coding accelerator 200E included within access node 17, which is one of many access nodes that might be included within rack 70-1. In general, FIG. 5E illustrates a number of racks 70, each connected through switch fabric 14. In the example of FIG. 5E, each of racks 70 may be considered a separate failure domain. Each of racks 70 include one or more access nodes 17 and one or more servers 12. For example, as shown in FIG. 5E, rack 70-1 includes access node 17 and server 12, which may correspond to one of access nodes 17 within one of servers 12 of FIG. 1A. Further, in some examples, each of access nodes 17 may correspond to data processing unit 130 as illustrated in FIG. 2 or data processing unit 150 as illustrated in FIG. 3. Data durability block 206E, included within accelerator 200E, is configured to apply an erasure coding approach to data durability. Erasure coding is a method of data protection in which data is broken into fragments, expanded and encoded with redundant data pieces. Erasure codes enable data fragments that become corrupted at some point in the storage process to be reconstructed by using information about the data that is stored elsewhere. If some combination of one or more of the data fragments are erased or are otherwise unavailable, but the remaining data blocks are available, the erased or unavailable data blocks can be reconstructed from the available blocks.

In some examples, an erasure coding algorithm splits data blocks into "d" data blocks and "p" parity blocks. A Reed Solomon 4+2 erasure coding scheme, for example, uses d=4 data blocks to generate p=2 parity blocks. Many other Reed Solomon implementations are possible, including 12+3, 10+4, 8+2, and 6+3 schemes. Other types of erasure encoding schemes beyond Reed Solomon schemes include parity array codes (e.g., EvenOdd codes, X codes, HoVer codes, WEAVER codes), Low Density Parity Check (LDPC) codes, or Local Reconstruction Codes (LRC). In some cases, such for parity array codes, reliability schemes may be more restrictive in terms of an ability to recover from failure for a given set of unavailable data fragments or data blocks. Further, data recovery for parity array codes may be iterative if more than one data fragment or data block is unavailable; such iterative data recovery may involve time-consuming and/or inefficient processing, thereby leading to latency and/or poor performance.

In the example of FIG. 5E, an in accordance with one or more aspects of the present disclosure, access node 17 may store, across network 8, data fragments generated pursuant to an erasure encoding scheme. For instance, with reference to FIG. 5E, access node 17 receives data 801 from server 12. Access node 17 outputs data 801 to accelerator 200E. Accelerator 200E feeds data 801 through data durability block 206E, which splits data 801 into data fragments 802D-1, 802D-2, 802D-3, 802D-4, and 802D-5 (collectively "data fragments 802D"). Data durability block 206 applies an erasure coding encoding algorithm to generate data fragment 802P-1 and data fragment 802P-2 (collectively "data fragments 802P") from data fragments 802D. Access node 17 stores data fragments 802D and data fragments 802P within different failure domains (e.g., racks 70) across network 8. If one or more of data fragments 802D or data fragments 802P become unavailable, access node 17 may recover data 801 by reading from the remaining available data fragments (which may be a combination of data fragments 802D and/or data fragments 802P) stored on the network.

More details on accelerator 200E, including further descriptions of accelerator 200E as illustrated in FIG. 5E, are available in U.S. patent application Ser. No. 16/169,736, filed Oct. 24, 2018, entitled "INLINE RELIABILITY CODING FOR STORAGE ON A NETWORK," the entire content of which is incorporated herein by reference.

Figure 5F:
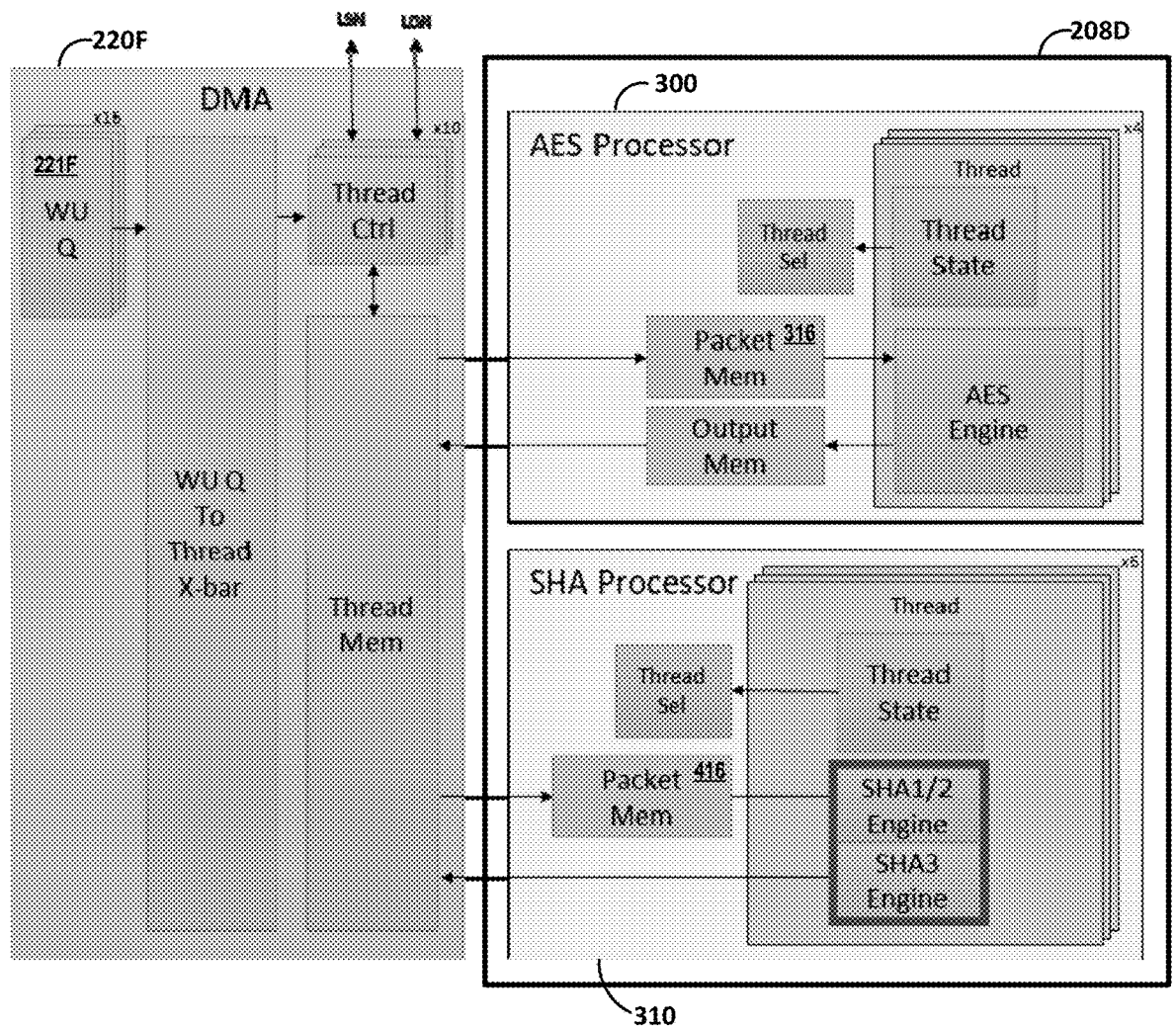
FIG. 5F is a conceptual diagram illustrating an example DMA block and an example security block in accordance with one or more aspects of the present disclosure.

FIG. 5F is a conceptual diagram illustrating an example DMA block and an example security block in accordance with one or more aspects of the present disclosure. In the example of FIG. 5F, DMA block 220F may generally correspond to and/or include functionality represented by gather block 202D and scatter block 212D of FIG. 5D, and may include a number of components, including work unit queue 221F. In FIG. 5F, security block 208D corresponds to security block 208D of FIG. 5D, and includes AES processor 300 and SHA processor 310.

In the example of FIG. 5F, DMA block 220F may provide a number of commands, parameters, and/or data for security block 208D through two interfaces. In general, security block 208D processes flits and returns the corresponding output to DMA block 220F where DMA block 220F then scatters the results to memory as appropriate. In some examples, the interface between DMA block 220F and AES processor 300 may be fed by multiple threads fetching data in parallel. The interface between DMA block 220F and SHA processor 310 may also be fed by multiple threads fetching data in parallel. Each interface and corresponding DMA threads may be dedicated to different algorithms or modes performed by AES processor 300 and/or SHA processor 310. In some examples, some or all AES traffic is directed through the interface to AES processor 300, and some or all SHA traffic is directed to the other interface to SHA processor 310. Further, each DMA thread may correspond directly to a thread executing on either AES processor 300 or SHA processor 310. DMA block 220F and security block 208D may, in the example illustrated, each have a total of 10 threads with 4 used for AES traffic processed by AES processor 300 and 6 used for SHA traffic processed by SHA processor 310.

In some examples, each interface is credit based per thread. As data is received by AES processor 300, the data is written into packet memory 316 used to implement an input FIFO/thread. AES processor 300 then reads from packet memory 316 when needed. Similarly, as data is received by SHA processor 310, the data is written into packet memory 416, and read when needed. DMA block 220F receives packet information through WUs sent to work unit queues 221F. Work unit queues 221F then issue the WUs to various threads for processing.

AES processor 300 performs cryptographic operations using multiple threads working on multiple packets that could each require different cipher modes. AES processor 300 further manages the interface with DMA block 220F. DMA block 220F performs operations relating to scheduling packets to appropriate threads. Each AES thread, for example, maintains an input credit interface with DMA block 220F, but they may all share a common 128-bit data and metadata interface. In some examples, each thread maintains its own 4-entry input FIFO in shared work unit queue 221F. This depth may, in some examples, be adequate to absorb the round-trip latency of returning a credit and receiving the next 128-bit flit, thereby allowing for a continuous stream of input flits to be processed if a thread is able to consume them. The output interface is analogous to the input interface except in reverse. Additionally, deeper per-thread FIFOs may be required (e.g., 16-entry) in order to avoid stalling the pipeline. In such an example, a thread might have to check that space exists in the output FIFO prior to requesting access to the pipeline.

More details on accelerator 200F, including further descriptions of accelerator 200F as illustrated in FIG. 5F, are available in U.S. patent application Ser. No. 16/157,265, filed Oct. 11, 2018, entitled "MULTIMODE CRYPTOGRAPHIC PROCESSOR," the entire content of which is incorporated herein by reference.

Figure 6:
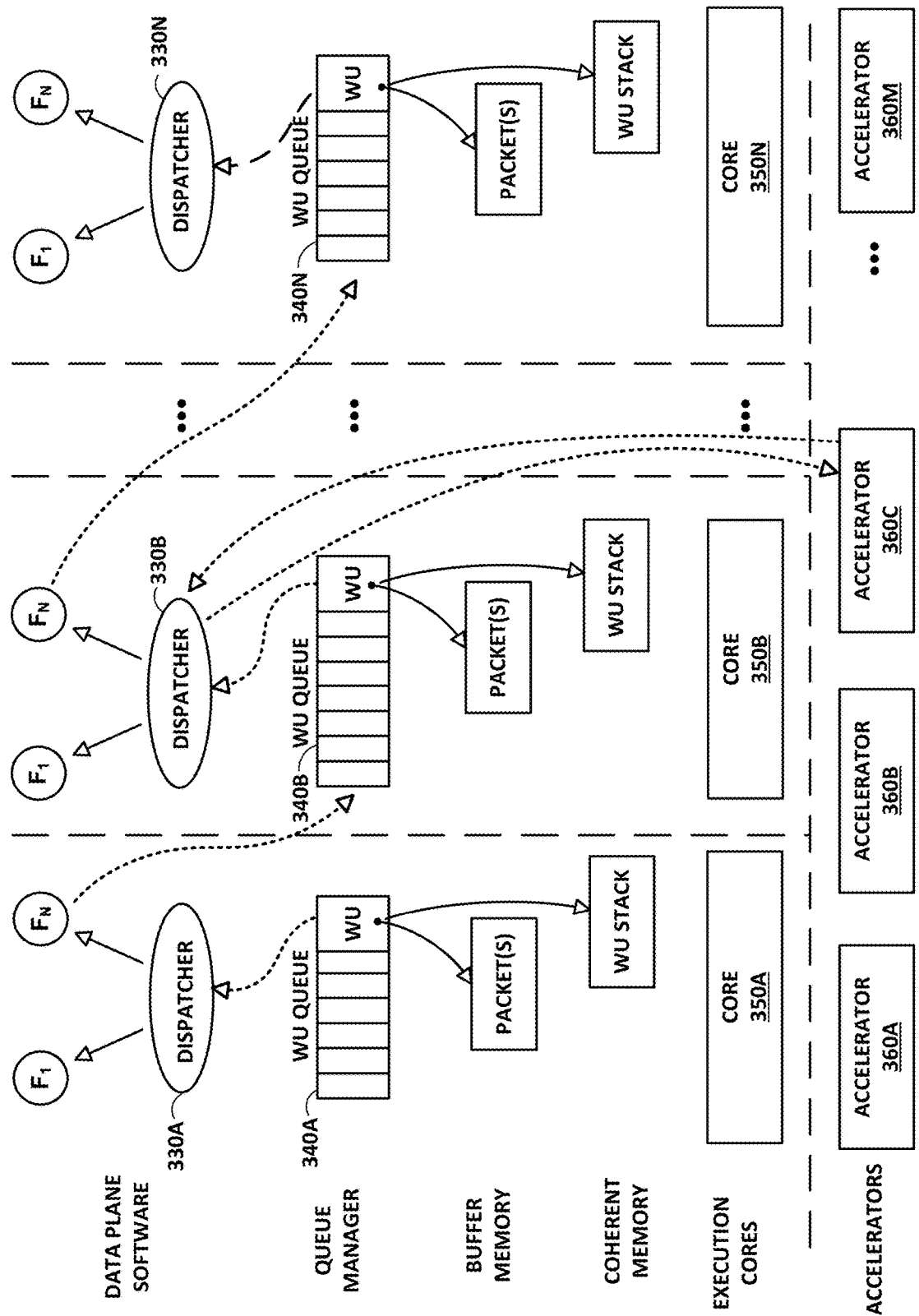
FIG. 6 is a flow diagram illustrating an example pipeline processing flow for processing stream data, such as packets, using work units.

FIG. 6 is a flow diagram illustrating an example pipeline processing flow (e.g., service chain) for processing stream data, such as a packet, within a system including multiple processing cores for executing software function and multiple hardware accelerators for performing optimized operations. FIG. 6 illustrates logical processing flow of a service chain in by a DPU integrated circuit having example multiple processing cores 350A-350N (which may correspond to cores 182 of FIG. 4A and include components similar to core 190 of FIG. 4B), one or multiple accelerators 360A-360M (which may correspond to accelerators 189 of FIG. 4A), non-coherent buffer memory (which may correspond to non-coherent buffer memory 186 of FIG. 4A and/or data stored off-chip, e.g., in external memory 170 of FIG. 3), and coherent memory (which may correspond to coherent cache memory 184 of FIG. 4A and/or data stored off-chip, e.g., in external memory 170 of FIG. 3). As shown in FIG. 6, in this example, each core 350 is associated with a queue of work units 340 (which may correspond to WU queues 143) to be processed by the core. WU queues 340 may, as one example, be hardware queues maintained by WU queue manager 187 of FIG. 4A.

In the example of FIG. 6, any of processing cores 350 may access any of accelerators 360, and there may be more processing cores 350 than accelerators 360, or less processing cores 350 than accelerators 360. Further, each of accelerators 360 may provide different functionality, or perform different operations than other accelerators 360.

As shown in FIG. 6, each processing core 350 and each accelerator 360 executes data plane software for processing stream data, such as packets. In the example of FIG. 6, each core 350 provides an execution environment for a set of software functions, shown generally as F-1-Fn, also referred to herein as event handlers or WU handlers. Similarly, each accelerator 360 provides functionality and/or an execution environment for a set of accelerator operations, such as those described in connection with FIG. 5A through FIG. 5F, which, as described, may include hardware implementations of lookup engines, matrix multipliers, cryptographic engines, compression engines, data durability encoders and/or decoders, regular expression interpreters, or the like.

In some example implementations, each software function or accelerator operation may be programmed in accordance with a run-to-completion programming model for applying one or more operations on stream data. Moreover, the various software functions and accelerator operations may represent different, discrete code portions for performing higher-level operations on a packet. For example, a group of software functions and/or accelerator operations may, when chained together for processing a common one or more work units, perform a high-level operation, such as encryption, authentication, deep-packet inspection, and the like. Each individual software function in the group may represent a different, run-to-completion code portion of the overall operation to be performed, and the software functions for the group may be executed on the same or different cores 350. Similarly, each individual accelerator operation in the group may represent a different, run-to-completion code portion of the overall operation to be performed, and accelerator operations to be performed for the group may be executed on the same or different accelerators 360.

As shown in the example of FIG. 6, each processing core 350 executes a corresponding one of dispatchers 330A-330N that services the respective WU queue 340 to be processed by the core. Each dispatcher 330 accesses the respective WU queue 340 for its core and, based on data structures within the work unit at the head of the queue, instantiates an instance of a software function (F) for processing the work unit, or alternatively (or in addition), performs an accelerator operation for processing the work unit.

As described herein, each work unit within WU queues 340 is associated with stream data to be processed by the respective core. In one example, each work unit includes an association with (e.g., a pointer to) one or more packets and may also include an association with (e.g., a pointer to) a work unit stack ("WU stack") that carries program state, cached data and other information needed for program execution when processing the corresponding packet(s). As further described herein, in various examples, each work unit within WU queues 340 specifies (e.g., by an identifier or index) a software function F to be instantiated by dispatcher 330 for processing the work unit. In addition, each work unit includes an identifier for the core 350 or other hardware unit that sent the work unit and an identifier of the core 350 or other hardware unit to receive the work unit once processing is complete by the invoked software function F.

Figure 8:
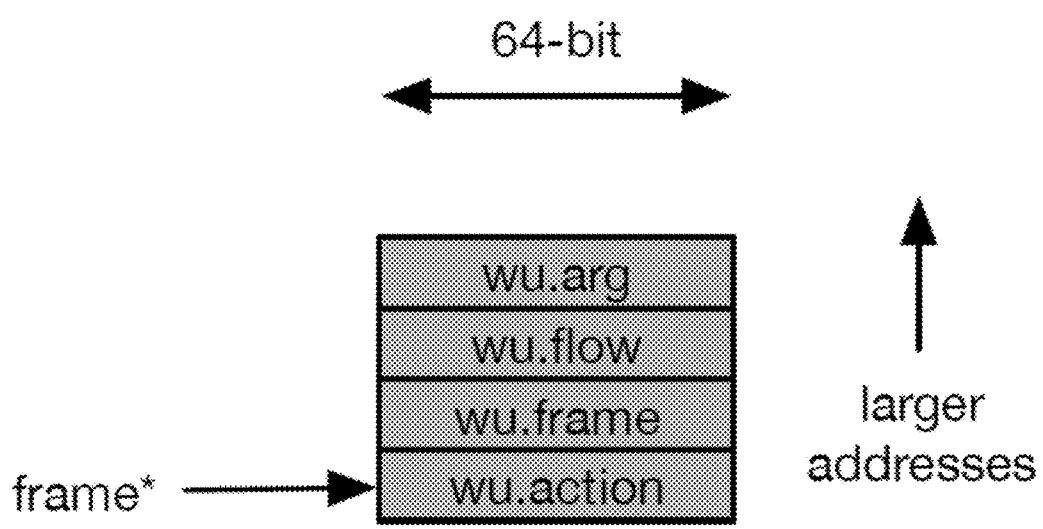
FIG. 8 is a conceptual diagram illustrating an example WU stack frame.

Further, one or more frames within the WU stack may include hardware commands as arguments, corresponding to references to one or more of accelerators 360, as further illustrated below with respect to FIG. 11. In some examples, rather than call a software function F-1-Fn, dispatcher 330 initiates an accelerator operation using one or more of accelerators 360. Further, the location of the frame pointer argument in the WU and the structure of the continuation and arguments in the WU stack frame, as shown in FIG. 8, may remain the same for use on hardware units. In this way, software constructs may call and operate on hardware units similar to software.

Upon instantiation by a dispatcher, the invoked software function F or the initiated accelerator operation effectively provides seamless program execution to operate on the packet data associated with the work unit using the program state, cached data and other information specified within the corresponding WU stack. During execution, the software function F (or accelerator operation) may, for example, execute as a run-to-completion event handler for performing one or more particular operations on the stream data. Moreover, continuity of program execution is maintained via the program state and cached data carried by the corresponding WU stack. While processing the work unit, the software function F may further manipulate the corresponding WU stack associated with the particular stream data object, e.g., packet, by performing stack-like operations on the WU stack for the packet and, optionally, directing the queue manager to create additional work units for further processing the packet.

As illustrated in FIG. 6, accelerator operations performed by one or more of accelerators 360 may be initiated by a dispatcher 330 associated with a processing core 350. In some examples, once the accelerator operation is completed, control returns to the dispatcher for instantiation of the next invoked software function F (e.g., see control returned by accelerator 360 to dispatcher 330B in the example of FIG. 6). In some examples, a service chain may call for multiple accelerator operations to be performed in a series. In such an example, the dispatcher may initiate each accelerator operation after the prior accelerator operation is completed. In still other examples, each accelerator may initiate later accelerator operations directly, without involving dispatcher 330 (or alternatively, by involving a dispatcher associated with the next accelerator in the chain of operations).

In FIG. 6, each core is illustrated as having a single dispatcher 330. In other examples, however, each core may have multiple dispatchers. In such an example, each core 350 may have a dispatcher for each virtual processor within each core, and each of accelerators 360 may have one or more dispatchers for initiating operations performed by each respective accelerator 360.

As further described herein, when processing a work unit, the corresponding instance of the software function (or accelerator operation) invoked by the dispatcher may perform stack-like operations on the WU stack flowing along with the packet in the processing pipeline. In other words, the WU stack may be viewed as a set of work units that collectively implement an overall logical function, where the work units have not been yet been enqueued for processing. The work units are arranged in the WU stack in a stack format and may be manipulated (inserted, removed, etc.) by software functions F or accelerator operations using stack operations to specify future work units for the overall logical function. A software function F or one or more of the accelerators 360 may, for example, access a current frame within the WU stack for program state, cached data and any input or output variables for performing the corresponding function on the packet. In addition, the software function may effectively 'pop' the current frame from the WU stack, push additional work unit frames on the WU stack, and/or cause additional work units to be created and enqueued within WU queues 340 for performing additional code portions (functions) on the work unit. In this way, the WU stack may be used to facilitate program execution and pipelining of an overall logical function using multiple software functions, where it is undesirable to execute all operations in a single run-to-completion event on a single core.

The following illustrates an example application programming interface (API) that may be utilized by software functions (F) for interacting with and manipulating the WU stacks associated with stream data (e.g., packets) being processed by the multiple processing cores. In this example, a software function (F) can manipulate a WU stack by performing stack-like operations, such as allocating a WU stack, freeing a WU stack, pushing new frames onto an existing WU stack. In addition, as shown below, the API further allows a software function to send a continuation in association with a specific frame pushed on a WU stack, which in turn causes a work unit having a pointer to the frame to be enqueued in a WU queue for processing. The example API is set forth below:

```
// Send the continuation on the top of stack
extern void ws_send_continuation(struct frame *);
// Push a new item on the stack
extern struct frame *ws_push_continuation(wuid_t, faddr_t dest, struct frame *, uintptr_t arg1, uintptr_t arg2);
// Free the WU stack
extern void ws_free(struct frame *frame);
// Allocate a new WU stack
extern struct frame *ws_alloc(void);
// Reserve space on the WU stack to store state void *ws_malloc_on_stack(struct frame **, size_t);
// Push an exception
extern struct frame *ws_push_exception_continuation(wuid_t, faddr_t dest, struct frame *frame, uintptr_t arg1);
// Raise an exception
extern void ws_raise_exception(struct frame *);
```

The following example pseudo code illustrates an example software function interacting with the WU stack when processing a work unit. In this example, a WU stack is constructed to stitch together processing of a first frame of the WU stack using WU handler_A to perform a first operation, processing of a second frame of the WU stack using WU handler_B to perform a second operation, and then processing a third frame of the WU stack using WU handler_C to perform a third operation. Moreover, in this example the entire WU stack is created prior to starting the processing pipeline by performing stack operations to sequentially push the frames in reverse order. The example pseudocode is set forth below:

```
//Allocate a new WU stack for a logical operation of
//performing function A then function B then function C
//on a stream data object, such as a packet
struct frame *frame = ws_alloc( );
// First, push the last function to be performed, which is
// to free (release) this WU stack
frame = ws_push_continuation(WU_FREE_FRAME, DEST_AUTO, frame, 0, 0);
// Push frame for performing function C
frame = ws_push_continuation(WU_C, destC, frame, arg1, arg2);
// Push frame for performing function B
frame = ws_push_continuation(WU_B, destB, frame, arg1, arg2);
// Push frame for performing function A
frame = ws_push_continuation(WU_A, destA, frame, arg1, arg2);
// Start the pipeline by launching (enqueuing) a work unit in
// association with the most recently pushed frame.
ws_send_continuation(frame);
```

Once the WU stack is created, the processing pipeline is initiated by sending a continuation in association with the most recently pushed frame, thus causing a work unit to be enqueued having a pointer to the top frame of the WU stack. At this point, processing of the pipeline commences and, when the work unit reaches the head of the WU queue in which it was queued, the dispatcher for the core instantiates an instance of WU handler_A for performing the first operation. After performing the operation and prior to termination, WU handler_A initiates the next stage in the processing pipeline by sending a continuation in association with the next frame of the WU stack (now the top frame), thus causing a second work unit to be enqueued, where this work unit has a pointer to the second frame that was originally pushed to the WU stack. The processing pipeline continues in this manner so as to execute WU handler_B and then, in like manner, WU handler C, which completes the example processing pipeline.

Figure 7A:
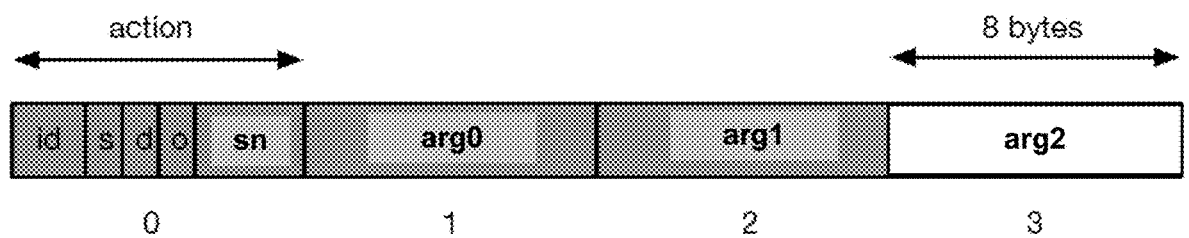
FIG. 7A is a conceptual diagram illustrating an example untyped work unit (WU) binary format.

FIG. 7A is a conceptual diagram illustrating an example untyped work unit (WU) binary format. In the example illustrated in FIG. 7A, the WU is 32 bytes and composed of four 64-bit (8-byte) words, an action and three arguments (arg0, arg1, arg2). As illustrated, the action field is further subdivided into an identifier (id), source (s), destination (d), and opcode (o) fields, as well as signaling network (sn) routing information.

In this example, the fields of a WU are defined as follows:

| Field | Width (bits) | Description |
| --- | --- | --- |
| id | 16 | WU handler ID; Index into table of WU functions to dispatch |
| source | 16 | Source ID of the processor or other hardware unit that sent the WU |
| destination | 16 | Destination queue ID of the processor or other hardware unit to receive the WU |
| opcode | 6 | Hint for the WU dispatch engine; Encodes which fields are pointers to be prefetched |
| sn | 10 | SN routing information, if any |
| arg0 | 64 | First argument register |
| arg1 | 64 | Second argument register |
| arg2 | 64 | Third argument register |

Figure 7B:
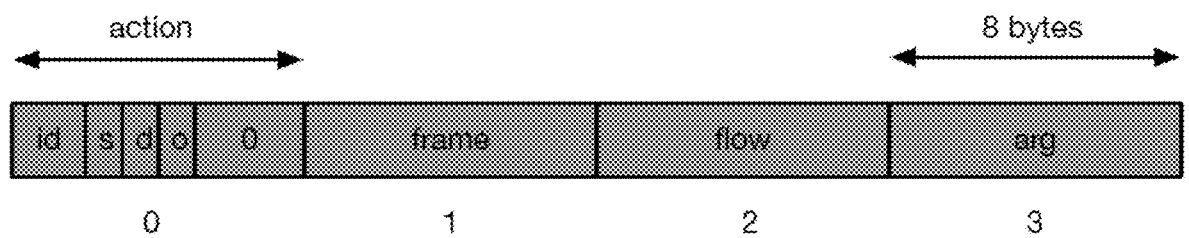
FIG. 7B is a conceptual diagram illustrating an example fully typed work unit (WU) binary format.

FIG. 7B is a conceptual diagram illustrating an example fully typed WU binary format in which each of the WU arguments is typed as a specific pointer used in various WU handlers. In this example, the first argument (arg0) is typed as a frame field to identify the corresponding WU stack for the work unit, the second argument (arg1) is typed as a flow field, and the third argument (arg2) is typed as a packet field to identify the corresponding packet(s) associated with the work unit. The action field remains unchanged. In the illustrated example, the sn routing information is set to 0. Any WU handler may use any or all untyped or typed arguments.

The typed fields of the example WU of FIG. 7B are defined as follows:

| Field | Width (bits) | Description |
| --- | --- | --- |
| frame | 64 | Pointer to a WU stack frame |
| flow | 64 | Pointer to a WU handler state |
| arg/packet | 64 | Input argument/packet pointer for WU handler |

The typed arguments may be placed in specific argument slots to ensure regularity of WU handler typing. For example, to participate in a WU stack, a WU stores a WU stack frame pointer in one of its arguments. In this example, the first argument register (arg0) is typed as the frame argument used to store the WU stack frame pointer. The flow argument is primarily used to identify a prefetch location for data specific to the WU handler. Other pointer types may be placed in any argument of a WU, but if one of the above types is used, it should be placed in the specified WU argument.

FIG. 8 is a conceptual diagram illustrating an example minimal WU stack frame, i.e., a WU stack, pointed to by a work unit, such as by arg0 of the example work units of FIG. 7A and FIG. 7B. As described herein, the WU stack is a data structure to help manage the event driven, run-to-completion programming model for software functions or event handlers executed by a device (e.g., access nodes 17, 130, or 150), which may be components for processing packets of information within network devices, compute nodes, storage devices and the like.

The example WU stack frame illustrated in FIG. 8 includes each of the 64-bit (8-byte) words of a WU (e.g., wu.action, wu.frame, wu.flow, and wu.arg) arranged in a 64-bit wide stack with larger addresses arranged in ascending order. In a basic form, the WU stack frame is a continuation WU in which a portion of the WU, e.g., the frame argument, is used to identify a subsequent processing stage for the WU once the WU is executed. The WU stack may be used in addition to a typical program stack of the operating system executed by an access node (or other device) as an efficient means of moving program execution between processing cores for processing stream data. More specifically, the program stack may control code points for execution of computations, while the WU stack helps facilitate flow of the program execution between processing cores. The run-to-completion execution model of the operating system may thus be viewed as an underlying environment for execution of a chain of WU event handlers making use of the WU stack. To provide dynamic composition of WU handlers, continuations from one handler to the next are resolved at runtime rather than statically. Moreover, a frame pointer argument of a WU handler function points directly to the continuation WU in order to invoke the subsequent handler. This construct may be used to simplify implementation of a number of familiar, higher level semantics, including pipelining and call/return.

Figure 9:
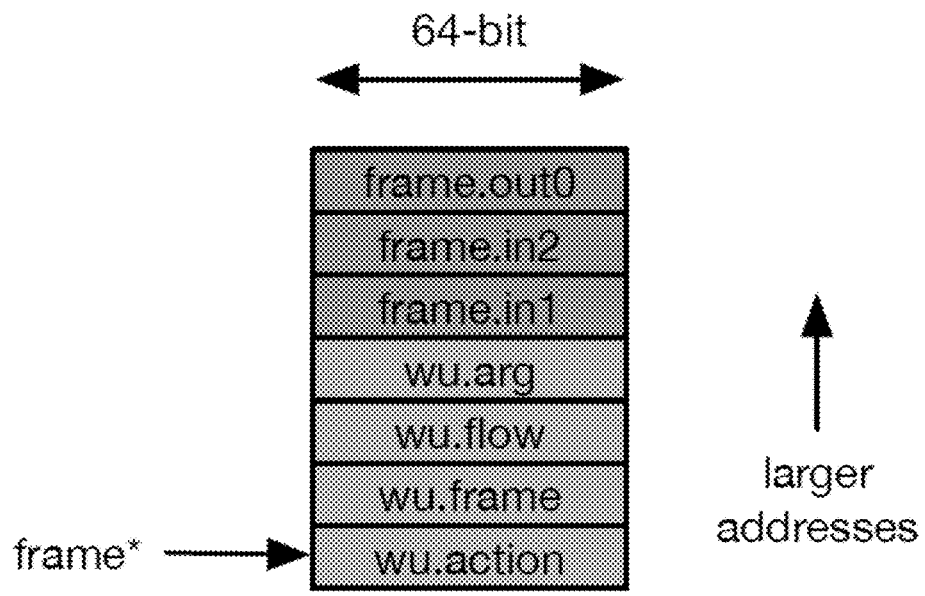
FIG. 9 is a conceptual diagram illustrating an example WU stack frame with input and output parameters.

FIG. 9 is a conceptual diagram illustrating an example WU stack frame having input and output parameters. A WU dispatch is sufficient to invoke an event handler function, however it may also be desirable to provide extra inputs or return outputs from an event handler (software function) tasked with processing the work unit. In one example implementation, the WU stack format provides a common binary format for interoperability between components. As illustrated in FIG. 9, input and output values are placed on the end of the basic continuation WU stack frame. The illustrated example shows a WU stack frame layout for a handler function that takes two 64-bit input values (frame.in1 and frame.in2) and provides a 64-bit output value (frame.out0).

In general, output values are pointers to actual storage locations provided by the processor or hardware device that created the WU stack input frame. These pointers may reference other portions of the same or other WU stacks, including arguments of continuation WUs. It may be desirable to avoid passing output values by overriding continuation WU arguments at WU send time, because it implies knowledge of the continuation WU inputs and thus breaks interposition of handlers. It is also not desirable to write output values directly to the WU stack, unless pointed to by an input argument, in order to ensure WU stacks can be constructed in a read-only fashion.

The example WU stack frame supports an arbitrary number of input and output variables, with no requirement that the number of inputs and outputs of a handler be constant for a given handler. In other words, handlers may support a variable number of parameters or dynamically sized structures/arrays.

Figure 10:
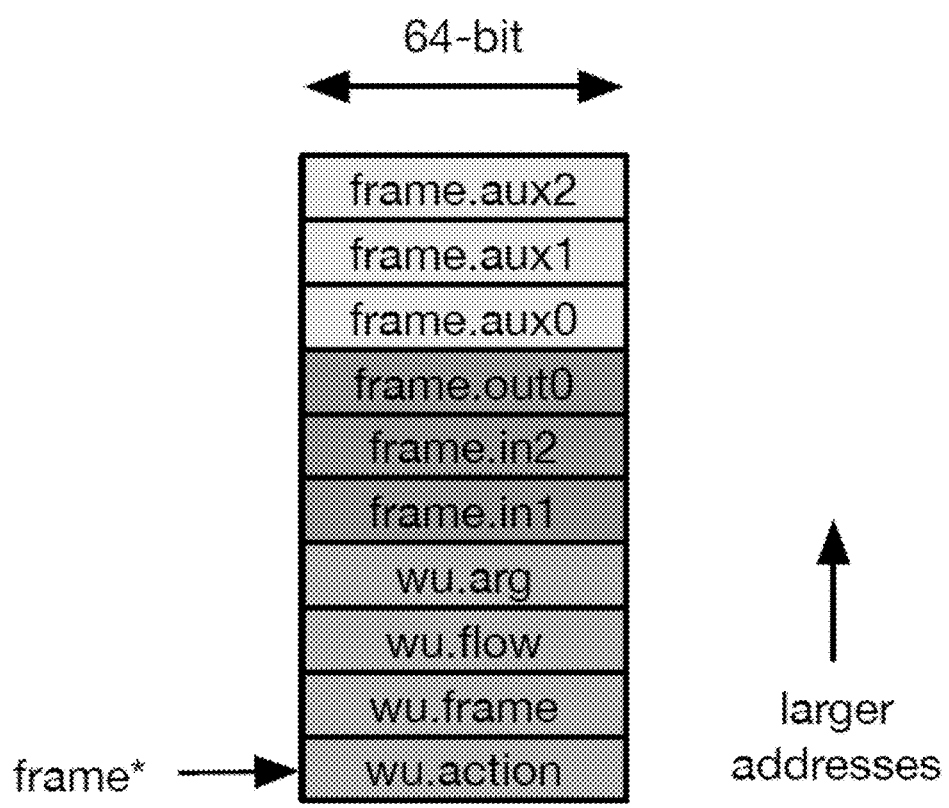
FIG. 10 is a conceptual diagram illustrating an example WU stack frame with auxiliary variables.

FIG. 10 is a conceptual diagram illustrating a more detailed example of a WU stack frame with auxiliary variables in addition to input and output values. In the run-to-completion programming model of the data plane software stack, logical units of work, typically functions, may be decomposed into smaller event handlers. The WU stack may be used to bring the convenience of long-lived stack-based variables to run-to-completion event handler chains, which may seamlessly execute on any of the processing cores. In some examples, a WU handler may increase the size of the current WU stack frame in order to create an arbitrary amount of space for auxiliary storage. As illustrated in FIG. 10, the WU stack frame includes the input and output parameters described with respect to FIG. 9 and includes three auxiliary variables (frame.aux0, frame.aux1, and frame.aux2).

Figure 11:
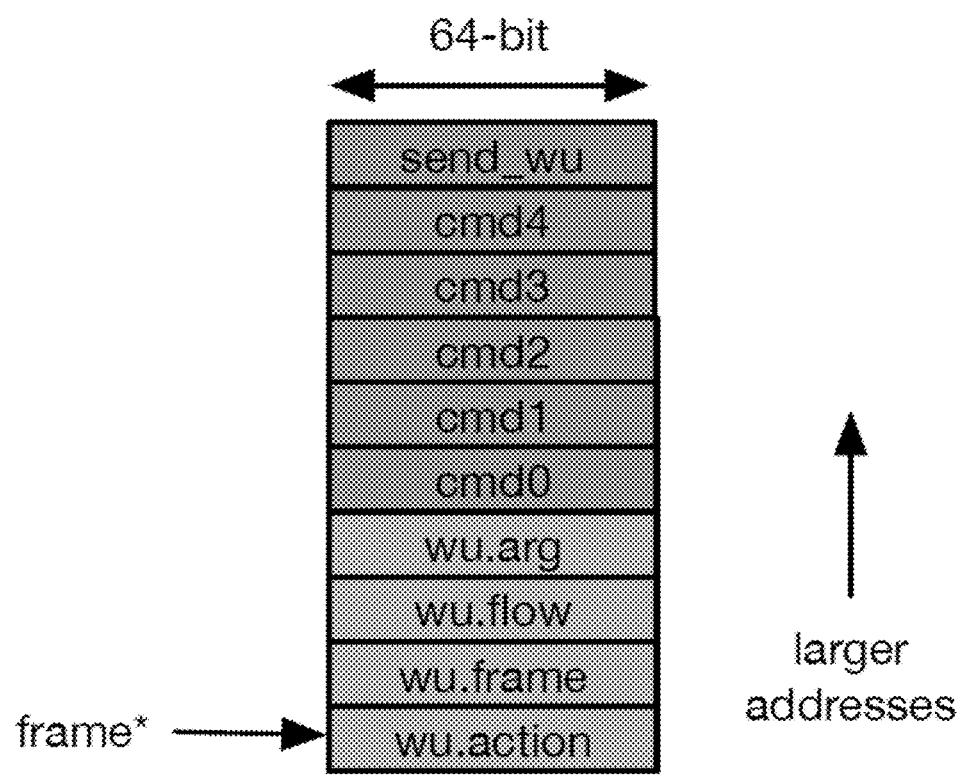
FIG. 11 is a conceptual diagram illustrating an example WU stack frame with hardware commands as arguments.

FIG. 11 is a conceptual diagram illustrating an example WU stack frame with hardware commands as arguments. For the above described access nodes, it may be desirable for hardware, e.g., accelerators 189 in processing cluster 180 from FIG. 4A, to adopt the fundamentals of the data plane software stack of the operating system. A general adaptation of the calling process for the data plane software stack may provide maximum flexibility in software. To adapt the calling process, the location of the frame pointer argument in the WU and the structure of the continuation and arguments in the WU stack frame, as shown in FIG. 9, may remain the same for use on hardware units. In this way, software constructs may call and operate on hardware units similar to software.

An example of an input to a hardware unit accepting commands is illustrated in FIG. 11. In the example, software may be able to send a WU stack with a frame argument pointing to a structure. In this case, hardware commands may be passed as WU stack input variables (cmd0 -cmd4). In some examples, one command (send_wu) at the end of a command queue may send the continuation WU that is in the regular frame location. In other examples, the hardware might not need an explicit command and will send the continuation WU on completion by default. Error cases may be handled with other WUs programmed into the hardware directly for generic handlers, or other WUs passed as input parameters for per-operation error handling.

By adopting the standard WU stack frame layout in hardware, standard WU stack software may be employed transparently between hardware, e.g., the chaining process described below. In this way, a stack chain may be configured with multiple software and/or hardware operations in sequence. As described above, each stage of the chain sends the continuation WU in the frame to the next stage. No handler in the chain need know nor care whether the next handler is a software or hardware operation; it only needs to know to send the continuation WU.

Similar to chaining, parallelism, aspects of which are described below with respect to FIG. 13, may also work transparently between software and hardware if both use compatible WU stack frame formats. In some examples, there might be no need for each parallel handler to be implemented in software. Some or all parallel handlers might be hardware units. A continuation WU from a parallel handler's frame pointer will send a WU to the appropriate joiner handler, and software will handle the join and notification regardless of whether the parallel handler is software or hardware. This may allow hardware units to be first class citizens in the WU compiler and runtime language/compiler.

Figure 12A:
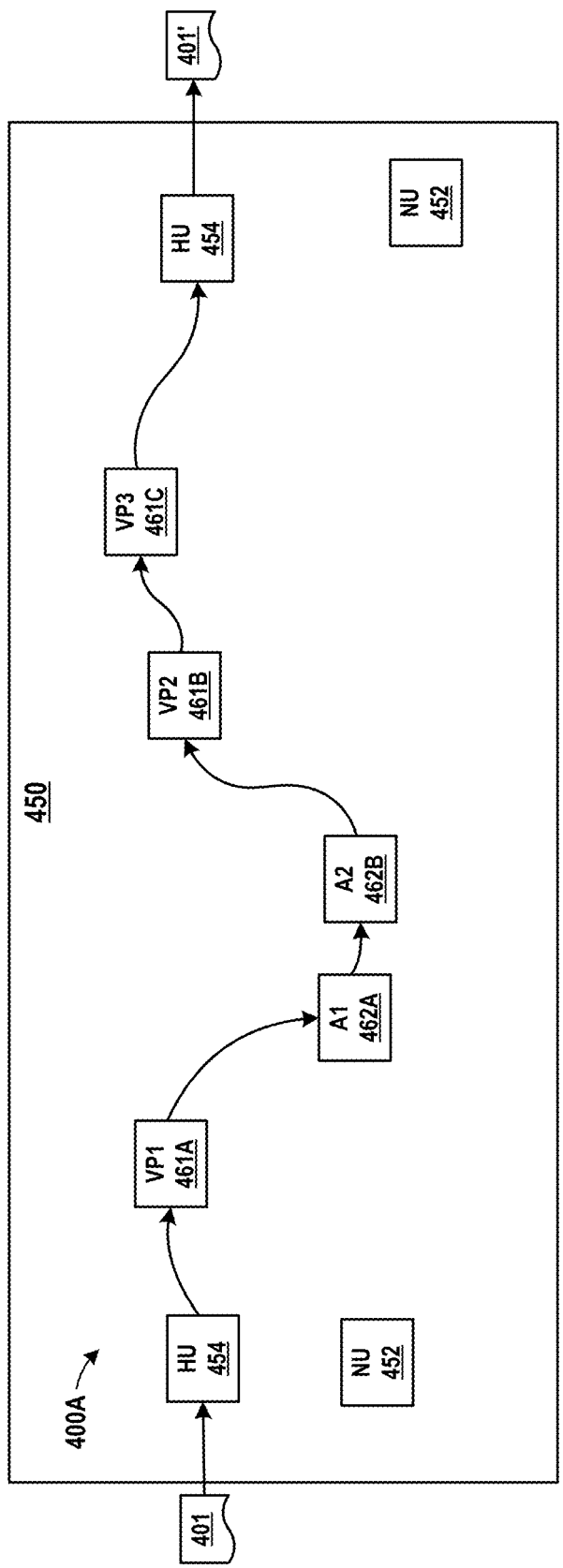
FIG. 12A is a conceptual diagram illustrating an example WU stack execution model for processing a service chain of operations.
Figure 12A:
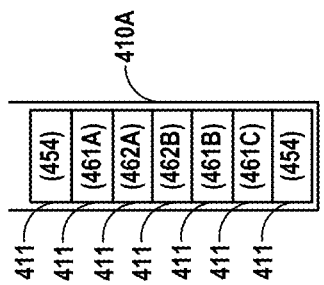

FIG. 12A is a conceptual diagram illustrating an example WU stack execution model for processing a service chain of operations within the DPU. FIG. 12A depicts processing of packet 401, i.e. an example of a stream data unit, through a set of various processing nodes defining an overall service chain 400A within the DPU. In this example, the nodes included within service chain 400A include a mixture of virtual processor nodes 461A through 461D (collectively "virtual processor nodes 461"), which may represent processing cores and/or VPs for executing software instructions, and accelerator nodes 462A through 462D (collectively "accelerator nodes 462"), which represent specialized, hardware-based processing units within the DPU integrated circuit, as described above. Nodes included within service chain 400A also include one or more networking unit nodes 452 and one or more host unit nodes 454.

Each of the nodes illustrated in FIG. 12A may correspond to one or more operations performed by components of access node 17 of FIG. 1A, access node 130 of FIG. 2, or access node 150 of FIG. 3, for example. Therefore, access node 450 as illustrated in FIG. 12A may conceptually correspond to access node 17 of FIG. 1A, access node 130 of FIG. 2, or access node 150 of FIG. 3. For example, networking unit nodes 452 may correspond to operations performed by one or more networking units 152 of FIG. 3, and host unit nodes 454 may correspond to operations performed by one or more host units 154 of FIG. 3. Although two networking unit nodes 452 are illustrated in FIG. 12A, operations performed by each of networking unit nodes 452 may be performed by the same networking unit 152. Similarly, although two host unit nodes 454 are illustrated in FIG. 12A, operations performed by each of host unit nodes 454 may be performed by the same host unit 154.

Virtual processor nodes 461 included within service chain 400A may correspond to operations performed by one or more virtual processors 192 of FIG. 4B, which are included within processing cores 182 illustrated in FIG. 4A. Similarly, accelerator nodes 462 included within service chain 400A may correspond to operations performed by one or more accelerators 189 of FIG. 4A and/or one or more accelerators 200 illustrated in FIG. 5A through FIG. 5F.

In some examples, including in the example of FIG. 12A, the WU stack execution model described herein seamlessly blends hardware (e.g., accelerator nodes 462) and software functions (e.g., virtual processor nodes 461) to perform call chaining, pipelining, parallelization, and continuation processing. The WU stack enables standardization of a pipeline and service execution model. The WU stack also provides familiar call/return semantics for operations on streams of work units (e.g., packets), and enables optional bundling of state carried with a work unit (packet). Furthermore, the WU stack allows stream processing model and a more traditional computational model to be integrated in a two-dimensional execution model, as illustrated in FIG. 12A, thereby providing significant technical advantages during software development as well as execution at run-time.

In accordance with one or more aspects of the present disclosure, access node 450 may establish, at compile time based on source code, a pipeline of operations that are performed on a packet. For instance, with reference to FIG. 12A, access node 450 creates WU stack 410A (e.g., stored in memory unit 134), and arranges WU frames 411 on WU stack 410A based on the programmed sequence of operations. In example of FIG. 12A, the service chain includes operations performed by host unit node 454, then by virtual processor node 461A, then by accelerator node 462A, then by accelerator node 462B, then by virtual processor node 461B, then by virtual processor node 461C, and then by host unit node 454. Accordingly, WU stack 410A is constructed with WU frames 411 that correspond to each of the nodes included within the service chain, as shown in FIG. 12A. Since WU stack 410A may operate as a last-in-first-out stack, WU frames 411 associated with nodes that are performed first (e.g., host unit node 454 followed by virtual processor node 461A) are stored at the top of WU stack 410A, and those that are performed last (e.g., virtual processor node 461C followed by host unit node 454) are stored at the bottom of WU stack 410A.

Access node 450 may process the service chain associated with WU stack 410A. For instance, still referring to FIG. 12A, access node 450 causes host unit node 454 to perform operations on packet 401. In some examples, operations performed by host unit node 454 are operations performed by one or more of host units 154 of FIG. 3.

After host unit node 454 completes processing, access node 450 pops WU frames 411 corresponding to host unit node 454 off the top of WU stack 410A. Access node 450 causes virtual processor node 461A to perform operations on packet 401, using WU frames 411 associated with virtual processor node 461A, which are at the top of WU stack 410A after WU frames 411 associated with host unit node 454 are popped off the top of WU stack 410A. In some examples, operations performed by virtual processor node 461A are operations performed by one or more of processing clusters 156 of FIG. 3.

Continuing with the example illustrated in FIG. 12A, after virtual processor node 461A completes processing of packet 401, access node 450 pops WU frames 411 corresponding to virtual processor node 461A off the top of WU stack 410A. Access node 450 causes accelerator node 462A to perform operations on packet 401 based on a command stored in WU stack 410A (or using one or more WU frames 411 associated with accelerator node 462A), now at the top of WU stack 410A. After accelerator node 462A completes processing, access node 450 continues the service chain illustrated in FIG. 12A by working through operations specified in WU stack 410A. In the example illustrated, access node 450 completes the service chain involving packet 401 when all of the WU frames 411 within WU stack 410A have been processed.

Figure 12B:
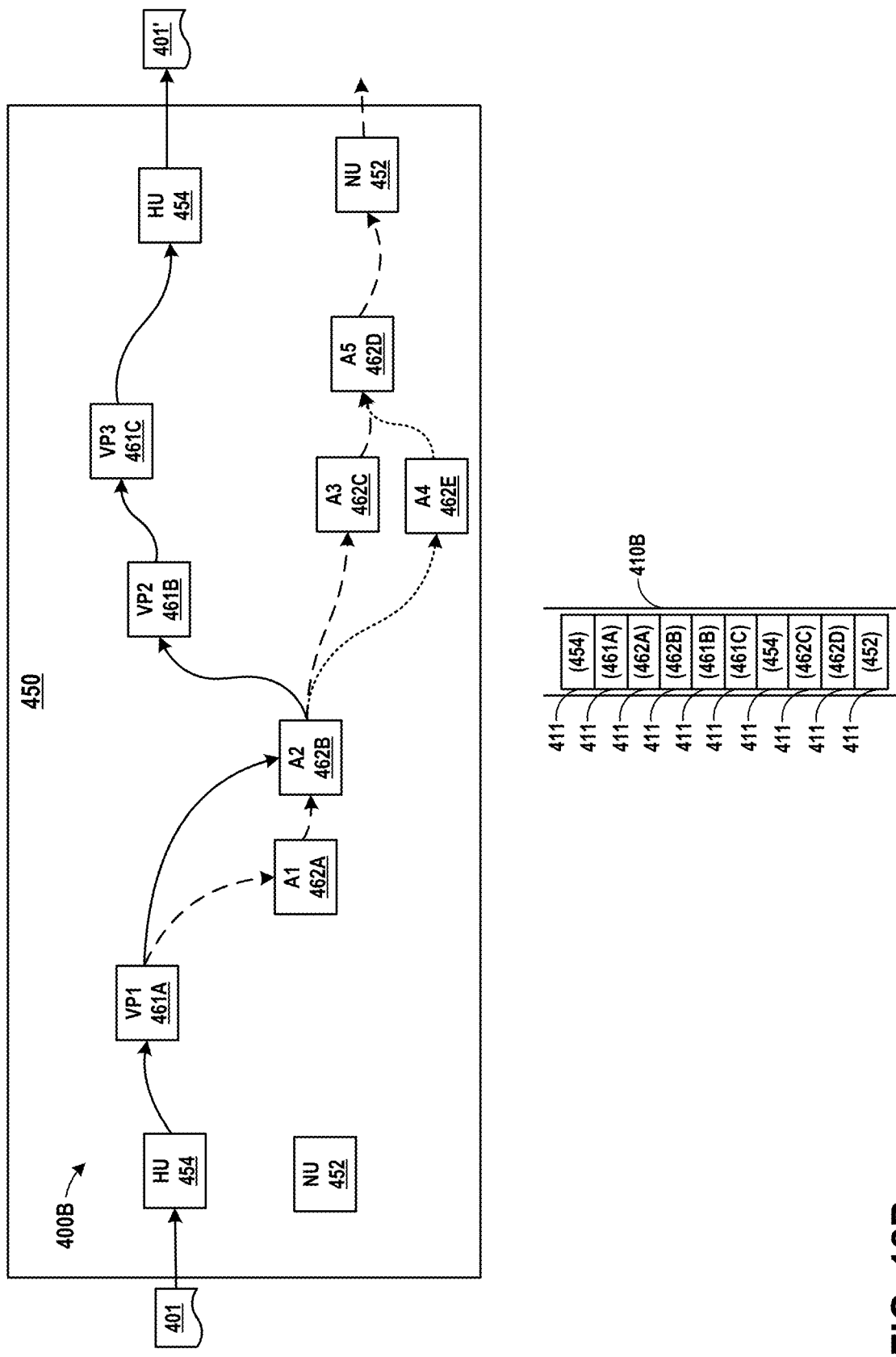
FIG. 12B is a conceptual diagram illustrating another example WU stack execution model for processing a service chain of operations.

FIG. 12B is a conceptual diagram illustrating another example WU stack execution model for processing a service chain of operations. FIG. 12B is similar to FIG. 12A, but includes multiple paths representing alternative processing paths that may be performed when service chain 400B is processed for a given packet 401. As in FIG. 12A, nodes included within service chain 400B include virtual processor nodes 461A through 461D (collectively "virtual processor nodes 461") and accelerator nodes 462A through 462D (collectively "accelerator nodes 462"). Nodes included within service chain 400B also include one or more networking unit nodes 452 and one or more host unit nodes 454. Also as in FIG. 12A, each of the nodes illustrated in FIG. 12B may correspond to one or more operations performed by components of access node 17 of FIG. 1A, access node 130 of FIG. 2, or access node 150 of FIG. 3.

In accordance with one or more aspects of the present disclosure, access node 450 may modify the sequence, order, or other aspects of the pipeline of operations during runtime. For instance, access node 450 may skip one or more nodes in service chain 400B, or follow an alternative path through service chain 400B, based on the results of processing performed by other nodes. In the example of FIG. 12B, access node 450 causes host unit node 454 to process packet 401, and then causes virtual processor node 461A to process packet 401. Based on the results of the processing performed by virtual processor node 461A, however, access node 450 determines that processing of packet 401 by accelerator node 462A is not necessary. Access node 450 may make such a determination based on handler data generated by virtual processor node 461A. Accordingly, rather than causing accelerator node 462A to process packet 401, access node 450 skips accelerator node 462A and causes the next node in the service chain (accelerator node 462B in the example of FIG. 12B) to process packet 401.

Further, access node 450 may route packet 401 along different branches of the service chain, based on the results of processing performed by other nodes (e.g., handler data or data generated by one or more accelerators). For instance, in the example of FIG. 12B, after accelerator node 462B processes packet 401, access node 450 may route packet 401 along service chain 400B to virtual processor node 461B, then to virtual processor node 461C, and then to host unit node 454 as in FIG. 12A. However, in the example of FIG. 12B, after accelerator node 462B processes packet 401, access node 450 may determine, based on data generated by and/or the results of processing performed by accelerator node 462B (or an earlier node), that processing along a different path in service chain 400B (e.g., the path that includes accelerator node 462C, accelerator node 462D, and networking unit node 452) is more appropriate. Accordingly, in such an example, access node 450 may cause accelerator node 462C, accelerator node 462D, and networking unit node 452 to perform the final operations performed by service chain 400B, rather than the branch of operations that includes virtual processor node 461B, virtual processor node 461C, and host unit node 454. As a result of the operations performed by service chain 400B, access node 450 generates packet 401'.

In some examples, access node 450 may skip one or more nodes or route packet 401 along different branches of the service chain, based on other considerations. For instance, still referring to the example of FIG. 12B, after access node 450 causes accelerator node 462B to process packet 401, access node 450 may route packet 401 to accelerator node 462C, as previously described. However, in some scenarios, access node 450 may determine that while accelerator node 462C is an appropriate next node in service chain 400B for processing packet 401, access node 450 may nevertheless route packet 401 to accelerator node 462E instead of accelerator node 462C. In such an example, access node 450 may determine that, based on resource, performance, and/or load balancing considerations, that it is appropriate to route packet 401 to accelerator node 462E rather than accelerator node 462C. After accelerator node 462D processes packet 401, access node 450 continues processing pursuant to service chain 400B by causing accelerator node 462D to process packet 401. In other words, in some examples, access node 450 may route packet 401 to accelerator node 462E, but not based (solely) on the results of processing, but instead, based on other considerations, such as resource availability. Accordingly, some packets being processed by service chain 400B might be routed to accelerator node 462C, while other packets being processed by service chain 400B may be routed to accelerator node 462E, depending on the resource available at the time a given packet is being processed by service chain 400B.

In the example of FIG. 12B, WU stack 410B may include each of the frames associated with each of the operations that might be performed by service chain 400B, but where one or more stages in service chain 400B are skipped, WU frames 411 corresponding to the skipped stages may be popped from WU stack 410B without processing by access node 450. For instance, in FIG. 12B, WU stack 410B includes WU frames 411 corresponding to accelerator node 462A, but if access node 450 skips accelerator node 462A, as described above, access node 450 may pop WU frames 411 associated with accelerator node 462A off of WU stack 410B without processing accelerator node 462A. Similarly, WU frames 411 associated with accelerator node 462C, accelerator node 462D, and networking unit node 452 may be included within WU stack 410B, but access node 450 may pop those WU frames 411 off WU stack 410B without processing those nodes if access node 450 chooses, at runtime, the path represented by virtual processor node 461B, virtual processor node 461C, and host unit node 454. Alternatively, WU frames 411 associated with virtual processor node 461B, virtual processor node 461C, and host unit node 454 may be included within WU stack 410B, but access node 450 may pop those WU frames 411 off WU stack 410B without processing those nodes if access node 450 chooses the path represented by accelerator node 462C, accelerator node 462D, and 452 at runtime.

In the example WU stack 410B described above in connection with FIG. 12B, WU stack 410B includes a number of WU frames 411 that access node 450 may pop off of WU stack 410B without processing the corresponding node, depending on the results of processing service chain 400B. In other examples, however, rather than including, at compile time, WU frames 411 that might not be needed if the corresponding node is not processed, access node 450 might add WU frames 411 to WU stack 410B at runtime. In other words, if processing requires a different path in service chain 400B, access node 450 might add to WU stack 410B WU frames 411 associated with nodes on that different path at runtime. In such an example, access node 450 might be able to reduce or eliminate the number of WU frames 411 that are popped off WU stack 410B without processing a corresponding node.

Similarly, where access node 450 determines that packet 401 is to be processed by accelerator node 462E rather than accelerator node 462C (e.g., based on available resource or other considerations, as described above), access node 450 may, at runtime, pop WU frames 411 associated with accelerator node 462C off of WU stack 410B, and push one or more WU frames 411 corresponding to accelerator node 462E onto WU stack 410B for processing.

One example of a pipeline of operations performed by access node 450 might involve scanning a packet for virus signatures. In such an example, the following operations might be performed by the pipeline: (1) receive next packet from stream, (2) if the packet payload is encrypted, decrypt the payload using an appropriate decryption key to generate unencrypted data, (3) if the unencrypted data is compressed (.gz/.zip), then decompress the data to generate uncompressed data, and then (4) scan the uncompressed data for virus signatures using appropriate signature set (http/mail/ftp, depending on stream type). In an example where this process identifies data signatures associated with a virus, the pipeline might take further actions as appropriate based on the results of the processing by the pipeline (e.g., drop the packet, close connection, scrub the data etc.). Accordingly, the service chain may involve a chain of operations performed by virtual processors and accelerators. Such a service chain might involve the following stages:

1. receive packet (performed by a virtual processor)
2. decrypt data included within packet (performed by security accelerator)
3. check integrity of data (performed by a virtual processor)
4. decompress data unencrypted data (performed by zip accelerator)
5. check integrity of data (performed by a virtual processor)
6. scan for virus signatures (performed by regex accelerator)
7. drop packet or allow it to pass through, based on the results of virus scanning (performed by a virtual processor)

In some examples, the intermediate integrity checks performed by the virtual processor (e.g., stages 3 & 5) might be removed from the service chain if such checks are not needed (in such an example, operations by accelerators might be performed back-to-back). Further, if a packet is encrypted but not compressed, then stage 4 can be avoided at runtime. Similarly, stage 2 can be avoided if packet is not encrypted and both stages 2 and 4 can be avoided if the payload is plain data. Still further, two packets belonging to the same stream can submitted to an accelerator node in parallel. In other words, in one such example, while packet N is in stage 4 of the service chain, packet N+1 might be in stage 2 or stage 3.

Pseudocode for defining the service chain described above for execution by the DPU might take the following form:

```
receive(packet, stream) {
    if (packet is encrypted) {
        push(decryption_done)
        send_to(crypto accel)
    } else if (packet is compressed) {
        push(decompression_done)
        send_to(zip accel)
```

```
    } else {
        push(scanning done)
        send_to(regex accel)
    }
}
decryption_done(packet, stream) {
    if (packet integrity passes) {
        if (packet is compressed) {
            push(decompression_done)
            send_to(zip accel)
        } else {
            push(scanning_done)
            send_to(regex accel)
        }
    }
    else {
        drop(packet)
        close(stream)
    }
}
decompression_done(packet, stream) {
    if (packet integrity passes) {
        push(scanning_done)
        send_to(regex accel)
    }
    else {
        drop(packet)
        close(stream)
    }
}
scanning_done(packet, stream) {
    if (packet contains virus) {
        drop (packet)
        close (stream)
    } else {
        allow(packet to next hop)
    }
}
```

Figure 13:
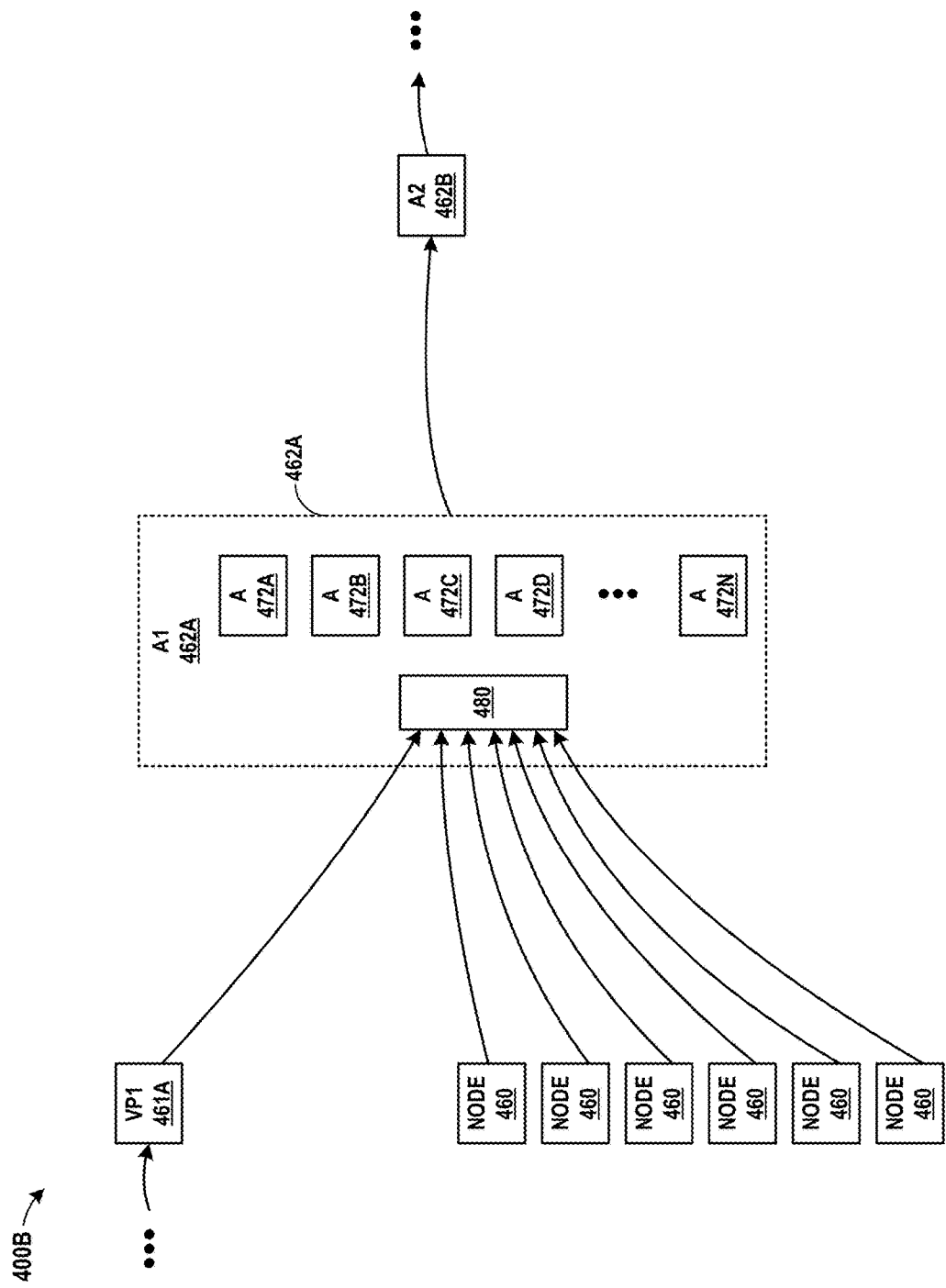
FIG. 13 is a conceptual diagram of a service chain illustrating an accelerator node capable of performing operations in parallel.

FIG. 13 is a conceptual diagram of a service chain illustrating an accelerator node capable of performing operations in parallel. In FIG. 13, a portion of service chain 400B from FIG. 12B is illustrated, including virtual processor node 461A accelerator node 462A, and virtual processor node 461B from FIG. 12A and FIG. 12B. FIG. 13 further includes other nodes 460, which may include one or more virtual processor nodes 461 and one or more accelerator nodes 462 that may be part of other processing paths along service chain 400B, or part of other service chains.

In FIG. 13, accelerator node 462A includes scheduler 480 and any number of accelerator node instances 472A through 472N ("accelerator node instances 472"). In some examples, each of accelerator node instances 472 may correspond to a different hardware thread within accelerator node 462A. In other examples, each of accelerator node instances 472 may correspond to a separate accelerator device. Scheduler 480 schedules operations performed at accelerator node 462A by allocating tasks to one or more of accelerator node instances 472. Scheduler 480 may include one or more queues for use in performing scheduling for one or more of accelerator node instances 472 for service chain 400B and for other service chains (e.g. those involving nodes 460). Multiple accelerator node instances 472, as illustrated in FIG. 13, may be used to achieve higher throughput for operations than might be achieved through a single accelerator node instance 472 or a single-threaded accelerator node 462A. For instance, if each of accelerator node instances 472 is capable of achieving throughput at a rate of 1 Gb/s, ten accelerator node instances 472 may be able to achieve throughput on the order of 10 Gb/s.

Accelerator node 462A may process packet 401 using multiple accelerator node instances 472. For instance, in the example of FIG. 13, virtual processor node 461A processes packet 401 and outputs packet 401 and/or a request to process packet 401 to accelerator node 462A. Scheduler 480 of accelerator node 462A queues the request from virtual processor node 461A within one or more queues, which might include requests received from other nodes 460 associated with other packets and/or service chains. Scheduler 480 schedules the requests held in the queues based on the priority of the queue and/or based on a queue scheduling algorithm (e.g., first-come, first-served, shortest job first, priority, round-robin, etc.). When scheduled, scheduler 480 allocates one or more of accelerator node instances 472 for processing packet 401.

In some examples, scheduler 480 may allocate accelerator node instances 472 based on resource availability, desired throughput, and/or based the number of accelerator node instances 472 that might be optimal for performing the task to be performed by accelerator node 462A. Scheduler 480 may schedule an operation corresponding to the request by allocating accelerator node instances 472 that are optimal for performing the task to be performed by accelerator node 462A. However, in scenarios in which resources (i.e., accelerator node instances 472) might not be available due to other demands on accelerator node 462A, scheduler 480 may schedule the operation by allocating less accelerator node instances 472 to the request than are optimal for performing the task. Once scheduled and queued for execution, accelerator node instances 472 process packet 401 concurrently and/or in parallel, and if necessary, any results of processing are merged by accelerator node 462A. Accelerator node 462A outputs the results of processing to accelerator node 462B. Access node 450 may thereafter cause accelerator node 462B to continue processing of packet 401 along service chain 400B, as described in FIG. 12B.

Figure 14:
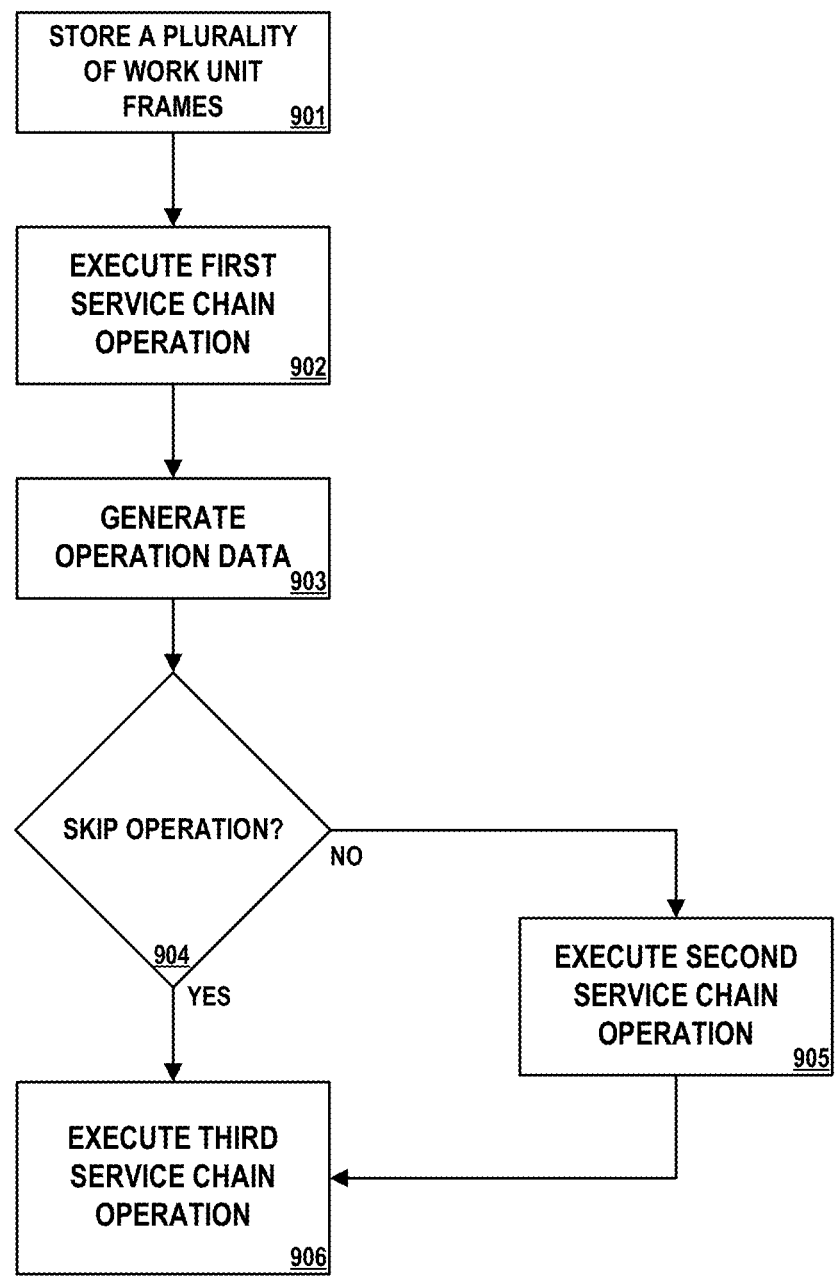
FIG. 14 is a flow diagram illustrating operations performed by an example access node in accordance with one or more aspects of the present disclosure.

FIG. 14 is a flow diagram illustrating operations performed by an example access node in accordance with one or more aspects of the present disclosure. FIG. 14 is described below within the context of access node 450 of FIG. 12A and/or FIG. 12B. In other examples, operations described in FIG. 14 may be performed by one or more other components, modules, systems, or devices. Further, in other examples, operations described in connection with FIG. 14 may be merged, performed in a difference sequence, omitted, or may encompass additional operations not specifically illustrated or described.

In the process illustrated in FIG. 14, and in accordance with one or more aspects of the present disclosure, access node 450 may store a plurality of work unit frames representing a plurality of service chain operations (901). For example, with reference to FIG. 12B, access node 450 may establish a pipeline of operations that are to be performed on a packet. Access node 450 may arrange a set of WU frames 411 on WU stack 410B based on a programmed sequence of operations, each operation corresponding to one or more WU frames 411 that make up one or more work units. In the example illustrated in FIG. 12B, the operations include a sequence where access node 450 is scheduled to perform operations associated with virtual processor node 461A (e.g., a first service chain operation), accelerator node 462A (a second service chain operation), and accelerator node 462B (a third service chain operation). In one example, accelerator node 462A (the second service chain operation) corresponds to a decryption operation, and accelerator node 462B (the third service chain operation) corresponds to a decompression operation.

Access node 450 may execute the first service chain operation (902). For example, in the example of FIG. 12B, access node 450 causes virtual processor node 461A to perform operations on packet 401. Access node 450 may generate operation data (903). In some examples, access node 450 generates operation data as a result of virtual processor node 461A performing operations on packet 401. The operation data includes data indicating that packet 401 is unencrypted compressed data.

Access node 450 may determine, based on the operation data, whether to perform the second service chain operation (904). In some examples, access node 450 performs the second service chain operation to decrypt data (905). However, in the example being described, access node 450 analyzes the operation data and determines that the second service chain (which corresponds to a decryption operation), need not be performed, since the data is already in unencrypted form.

Accordingly, access node 450 may skip the second service chain operation and execute the third service chain operation (906). In such an example, access node 450 may pop work unit frames corresponding to accelerator node 462A off WU stack 410B, and may cause accelerator node 462A to not process packet 401. Access node 450 then causes accelerator node 462B to perform operations on packet 401. Since accelerator node 462B is a decompression operation in the example being described, 462B performs a decompression operation.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., servers 12, access nodes 17, storage devices 62, host networking units 13, host networking units 18, host networking units 63, as well as others) are shown within the Figures and/or in other illustrations referenced herein. However, techniques in accordance with one or more aspects of the present disclosure may be performed with many more of such systems, and collective references to components, devices, modules, and/or systems may represent any number of such components, devices, modules, and/or systems.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, 1B, 1C, FIG. 2, FIG. 3, and others) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A data processing unit integrated circuit comprising:
a plurality of processing cores, each of the cores configured to execute one or more of a plurality of software work unit handlers;
an accelerator unit, implemented in circuitry, configured to execute one or more data processing operations; and
a memory configured to store a plurality of work units arranged as a work unit stack, each of the work units associated with a network packet, each work unit specifying one of the plurality of software work unit handlers for processing the network packet and specifying one of the cores for executing the specified software work unit handler, and at least one of the plurality of work units specifying one of the data processing operations to be performed by the accelerator unit, wherein the work unit stack specifies a set of service chain operations to be performed on the network packet, and wherein the set of operations include:

processing the network packet by the plurality of software work unit handlers by executing run-to-completion software handlers invoked on a data plane operating system on at least one of the plurality of processing cores, and performing the one of the data processing operations.

2. The data processing unit integrated circuit of claim 1, wherein the plurality of processing cores includes a first processing core, wherein the plurality of work units includes a first work unit specifying a first software work unit handler, the first work unit further specifying the first processing core for executing the first software work unit handler, and wherein to execute the service chain of operations, the data processing unit integrated circuit is configured to:

cause the first processing core to execute the first software work unit handler.

3. The data processing unit integrated circuit of claim 2, wherein executing the first software work unit handler generates handler data, and wherein to execute the service chain of operations, the data processing unit integrated circuit is further configured to:

determine, based on the handler data, whether to cause the accelerator unit to perform the data processing operation.

4. The data processing unit of claim 3, wherein determining whether to cause the accelerator unit to perform the data processing operation includes:

determining an error occurred when executing the first software work unit handler, and terminating the set of service chain operations based on the error.

5. The data processing unit of claim 3, wherein determining whether to cause the accelerator unit to perform the data processing operation includes:

inserting an additional operation into the service chain of operations, wherein the additional operation is scheduled to be performed before the data processing operation.

6. The data processing unit integrated circuit of claim 3, wherein to execute the service chain of operations, the data processing unit integrated circuit is further configured to:

cause the accelerator unit to perform the data processing operation.

7. The data processing unit integrated circuit of claim 6, wherein the accelerator unit includes a scheduler for prioritizing data processing operations performed by the accelerator, and wherein causing the accelerator unit to perform the data processing operation includes:

queueing, by the scheduler, the data processing operation to be performed by the accelerator.

8. The data processing unit integrated circuit of claim 7, wherein causing the accelerator to perform the data processing operation includes:

determining information about processing requirements for the network packet; and processing, based on the information about the processing requirements of the network packet, the network packet using one or more of a plurality of threads within the accelerator unit.

9. The data processing unit integrated circuit of claim 7, wherein the accelerator unit includes a plurality of accelerator devices, and causing the accelerator to perform the data processing operation includes:

determining information about processing requirements for the network packet; and processing, based on the information about the processing requirements of the network packet, the network packet using each of the plurality of accelerator devices.

10. The data processing unit integrated circuit of claim 9, wherein processing the network packet using each of the plurality of accelerator devices includes:

coordinating a processing order by which the plurality of accelerator devices processes the network packet.

11. The data processing unit integrated circuit of claim 9, wherein determining information about processing requirements for the network packet includes:

identifying a time-consuming service chain operation from among the set of service chain operations, and determining an appropriate number of accelerator devices to process the time-consuming service chain operation.

12. The data processing unit integrated circuit of claim 2, wherein performing the one of the data processing operations generates accelerator data, and wherein to execute the service chain of operations, the data processing unit integrated circuit is further configured to:

determine, based on the accelerator data, whether to perform an additional operation.

13. The method of claim 12, wherein the additional operation is at least one of:

executing another software work unit handler, and performing another data processing operation.

14. The data processing unit of claim 12, wherein determining whether to perform the additional operation includes:

determining an error occurred when performing the one of the data processing operations, and terminating the set of service chain operations based on the error.

15. The data processing unit of claim 12, wherein determining whether to perform the additional operation includes:

inserting a further operation into the service chain of operations, wherein the further operation is scheduled to be performed before executing the additional operation.

16. The data processing unit integrated circuit of claim 2, wherein the plurality of processing cores includes a second processing core, wherein executing the first software work unit handler generates handler data, and wherein to execute the service chain of operations, the data processing unit integrated circuit is further configured to:

determine, based on the handler data, whether to cause the second processing core to execute a second software work unit handler after the first processing core executes the first software work unit handler.

17. The data processing unit integrated circuit of claim 16, wherein to execute the service chain of operations, the data processing unit integrated circuit is further configured to:

cause the second processing core to execute the second software work unit handler.

18. The data processing unit integrated circuit of claim 2, further comprising:

a networking unit configured to manage input and output of data between a network and the data processing unit integrated circuit; and a host unit configured to manage input and output of data between a host and the data processing unit integrated circuit.

19. The data processing unit integrated circuit of claim 18, wherein to execute the service chain of operations, the data processing unit integrated circuit is further configured to:
receive, by the networking unit, a network packet over the network; and
cause the networking unit to process the network packet.

20. The data processing unit integrated circuit of claim 18, wherein to execute the service chain of operations, the data processing unit integrated circuit is further configured to:
receive, by the host unit, data from the host; and
cause the host unit to process the network packet.

21. The data processing unit integrated circuit of claim 1, wherein for at least one of the plurality of software work unit handlers, processing the network packet includes:
determining information about processing requirements for the network packet; and
processing, based on the information about the processing requirements of the network packet, the network packet using more than one of the plurality of processing cores.

22. The data processing unit integrated circuit of claim 21, wherein processing the network packet using more than one of processing cores includes:
coordinating a processing order by which the more than one of the plurality of processing cores processes the network packet.

23. The data processing unit integrated circuit of claim 21, wherein determining information about processing requirements for the network packet includes:
identifying a time-consuming service chain operation from among the set of service chain operations, and
determining an appropriate number of processor cores to process the time-consuming service chain operation.

24. The data processing unit of claim 1, wherein the data processing integrated circuit includes a plurality of accelerator units, wherein the accelerator unit is a first accelerator unit included within the plurality of accelerator units, and wherein to perform the set of operations, any of the plurality of work units may be processed by one or more of the plurality of accelerator units.

25. The data processing unit of claim 1, wherein to specify one of the data processing operations to be performed by the accelerator unit, the at least one of the plurality of work units includes a destination identifier of the accelerator unit to perform the data processing operations.

26. A system comprising:
a compiler for processing software defining a service chain; and
a data processing unit integrated circuit comprising:
a plurality of processing cores, each of the cores configured to execute one or more of a plurality of software work unit handlers,
an accelerator unit, implemented in circuitry, configured to execute one or more data processing operations, and
a memory configured to store a plurality of work units arranged as a work unit stack, each of the work units associated with a network packet, each work unit specifying one of the plurality of software work unit handlers for processing the network packet and specifying one of the cores for executing the specified software work unit handler, and at least one of the plurality of work units specifying one of the data processing operations to be performed by the accelerator unit, wherein the work unit stack specifies a set of operations to be performed on the network packet in the service chain, and wherein the set of operations include:
processing the network packet by the plurality of software work unit handlers by executing run-to-completion software handlers invoked on a data plane operating system on at least one of the plurality of processing cores, and
performing the one of the data processing operations.

27. A method comprising:
storing, by a data processing unit integrated circuit, a plurality of work unit frames in a work unit stack representing a plurality of service chain operations, including a first service chain operation, a second service chain operation, and a third service chain operation;
executing, by the data processing unit integrated circuit, the first service chain operation, wherein executing the first service chain operation generates operation data;
determining, by the data processing unit integrated circuit and based on the operation data, whether to perform the second service chain operation; and
executing, by the data processing unit integrated circuit, the third service chain operation after skipping the second service chain operation,
wherein executing the first service chain operation and executing the third service chain operation includes executing run-to-completion software handlers invoked on a data plane operating system on at least one of a plurality of processing cores.

* * * * *